(12) United States Patent
Yasui et al.

(10) Patent No.: US 7,188,020 B2
(45) Date of Patent: Mar. 6, 2007

(54) CONTROL SYSTEM

(75) Inventors: Yuji Yasui, Saitama-ken (JP); Mitsunobu Saito, Saitama-ken (JP); Tadaharu Shoji, Saitama-ken (JP); Akiyuki Yonekawa, Saitama-ken (JP)

(73) Assignee: Honda Motor Co., Ltd., Tokyo (JP)

(*) Notice: Subject to any disclaimer, the term of this patent is extended or adjusted under 35 U.S.C. 154(b) by 14 days.

(21) Appl. No.: 11/087,674

(22) Filed: Mar. 24, 2005

(65) Prior Publication Data

US 2005/0216179 A1    Sep. 29, 2005

(30) Foreign Application Priority Data

Mar. 26, 2004  (JP) .............................. 2004-092563

(51) Int. Cl.
*B60T 7/12* (2006.01)
*F02B 75/02* (2006.01)

(52) U.S. Cl. .................... 701/103; 123/90.15; 123/316

(58) Field of Classification Search ........ 701/101–103, 701/110–115; 123/48 B, 78 B, 78 BA, 78 E, 123/78 F, 316, 90.15–90.18

See application file for complete search history.

(56) References Cited

U.S. PATENT DOCUMENTS

| 5,289,805 | A | 3/1994 | Quinn, Jr. et al. |
| 5,363,817 | A | 11/1994 | Ikeda et al. |
| 5,402,400 | A * | 3/1995 | Hamada et al. ......... 360/78.06 |
| 6,798,497 | B2 * | 9/2004 | Butler ......................... 355/72 |
| 6,813,227 | B2 * | 11/2004 | Cho et al. ................. 369/44.28 |
| 2005/0216179 | A1 * | 9/2005 | Yasui et al. ................ 701/115 |

FOREIGN PATENT DOCUMENTS

EP         1 312 774 A2    5/2003

* cited by examiner

*Primary Examiner*—John T. Kwon
(74) *Attorney, Agent, or Firm*—Arent Fox PLLC

(57) ABSTRACT

A control system which is capable of compensating for and suppressing the influence of a periodic disturbance on a controlled object more quickly, even when the controlled object is subjected to the periodic disturbance the amplitude of which periodically changes, thereby enhancing the stability and the accuracy of control. The control system includes an ECU. The ECU calculates disturbance compensation values for compensating for a periodic disturbance by searching maps and tables, in timing of generation of each pulse of a CRK signal. The ECU calculates control inputs at a predetermined control period, with predetermined control algorithms, according to the disturbance compensation values read in at the control period, respectively.

36 Claims, 41 Drawing Sheets

F I G. 5A
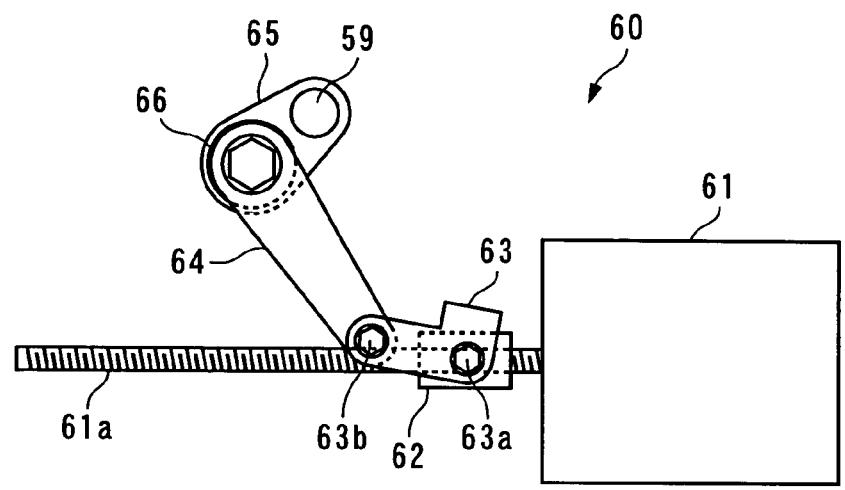
F I G. 5B
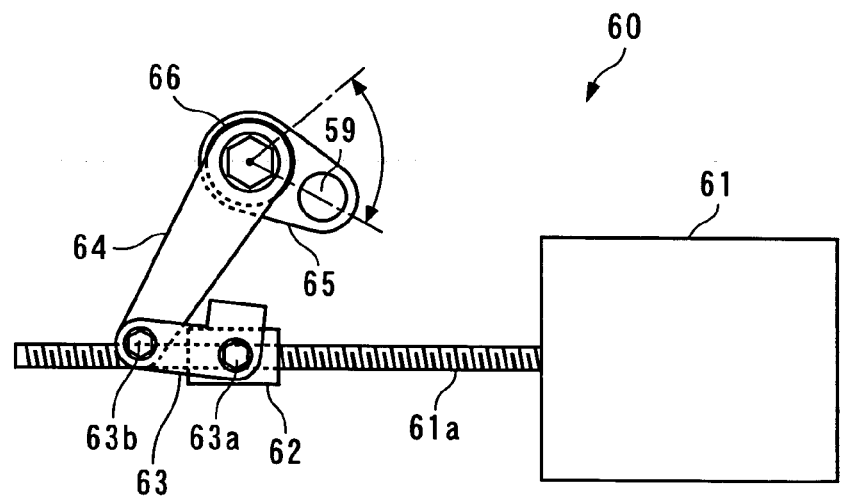

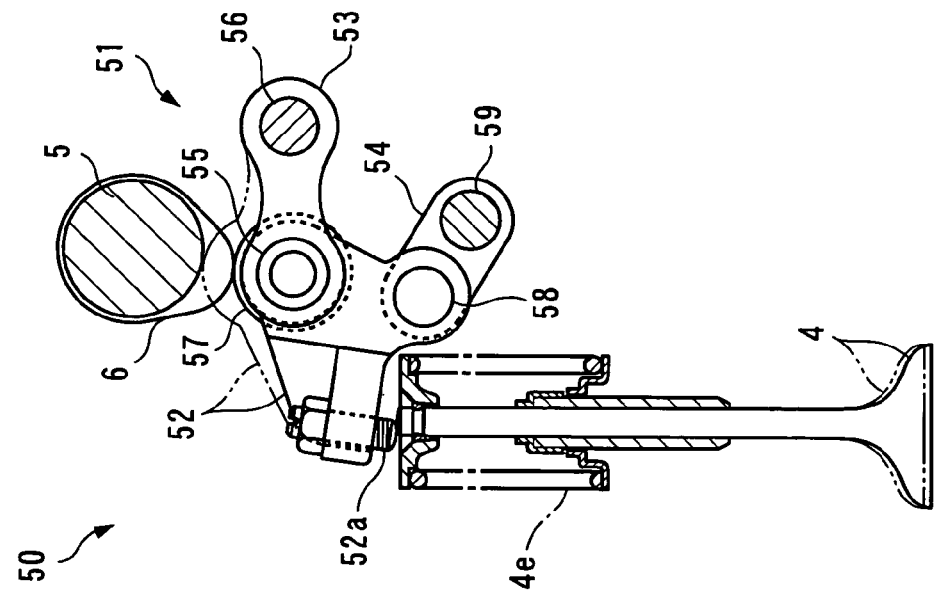
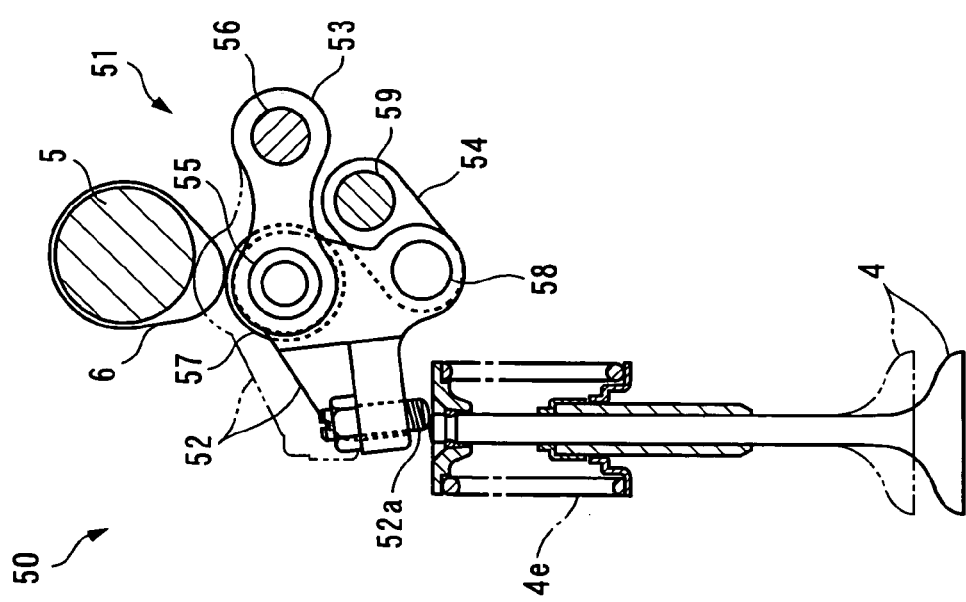

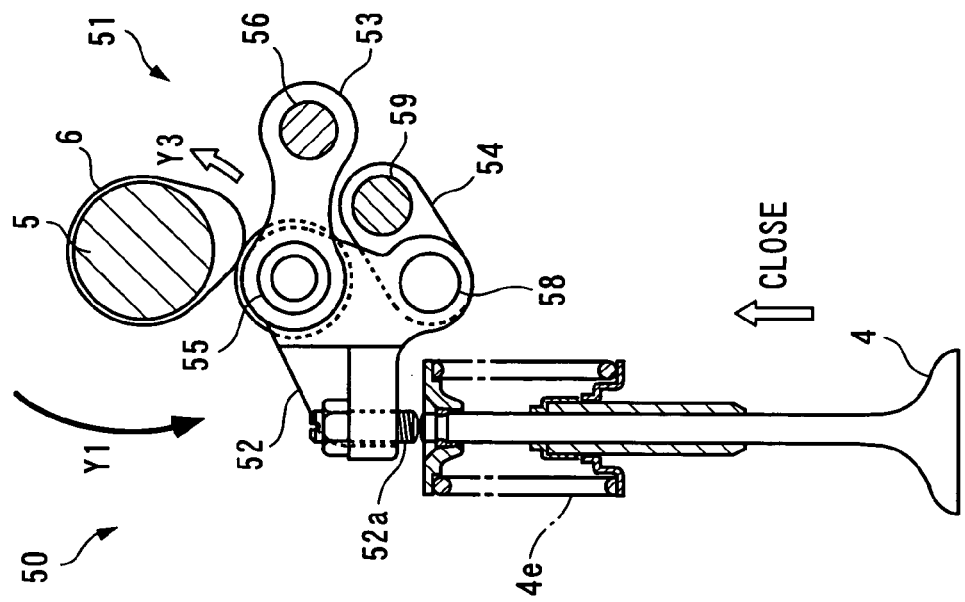
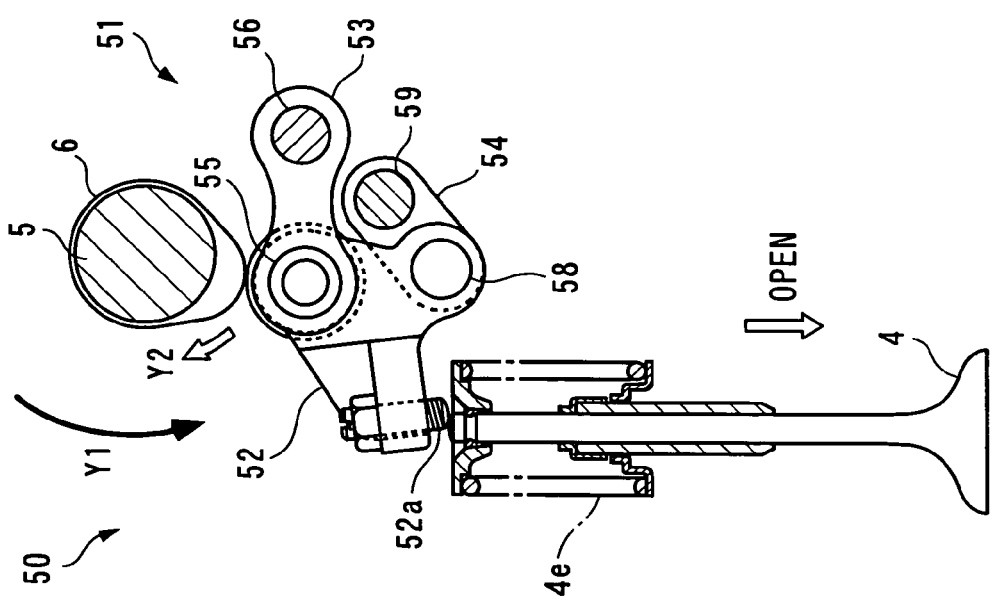

FIG. 20

$$\text{Cain\_cmd\_f}(k) = -\text{POLE\_f} \cdot \text{Cain\_cmd\_f}(k-1) + (1+\text{POLE\_f}) \cdot \text{Cain\_cmd}(k)$$

$$\cdots\cdots (1)$$

$$\text{Rsld}(k) = \text{Req}(k) + \text{Rrch}(k) + \text{Radp}(k) + \text{Rnl}(k) \qquad \cdots\cdots (2)$$

$$\begin{aligned}\text{Req}(k) = \frac{1}{b1}\{&(1-a1-\text{POLE})\cdot\text{Cain}(k)+(\text{POLE}-a2)\cdot\text{Cain}(k-1)\\ &-b2\cdot\text{Rsld}(k-1)+\text{Cain\_cmd\_f}(k)\\ &+(\text{POLE}-1)\cdot\text{Cain\_cmd\_f}(k-1)-\text{POLE}\cdot\text{Cain\_cmd\_f}(k-2)\}\end{aligned}$$

$$\cdots\cdots (3)$$

$$\text{Rrch}(k) = \frac{-\text{Krch}}{b1} \cdot \sigma s(k) \qquad \cdots\cdots (4)$$

$$\text{Radp}(k) = \frac{-\text{Kadp}}{b1} \cdot \sum_{i=0}^{k} \sigma s(i) \qquad \cdots\cdots (5)$$

$$\text{Rnl}(k) = \frac{-\text{Knl}}{b1} \cdot \text{sgn}(\sigma s(k)) \qquad \cdots\cdots (6)$$

$$\sigma s(k) = e(k) + \text{POLE} \cdot e(k-1) \qquad \cdots\cdots (7)$$

$$e(k) = \text{Cain}(k) - \text{Cain\_cmd\_f}(k-1) \qquad \cdots\cdots (8)$$

$$\text{Cain}(k+1) = a1 \cdot \text{Cain}(k) + a2 \cdot \text{Cain}(k-1) + b1 \cdot \text{Rsld}(k) + b2 \cdot \text{Rsld}(k-1)$$

$$\cdots\cdots (9)$$

F I G. 2 1

$$Rsld\_f(k) = Rsld(k) + Rcyc\_cin(k) \quad \cdots\cdots (10)$$

$$r1(k) = Lim(Rsld\_f(k)) \quad \cdots\cdots (11)$$

$$r2(k) = r1(k) - udsm\_oft \quad \cdots\cdots (12)$$

$$\delta(k) = r2(k) - u(k-1) \quad \cdots\cdots (13)$$

$$\sigma(k) = \sigma(k-1) + \delta(k) \quad \cdots\cdots (14)$$

$$u(k) = fnl(\sigma(k)) \quad \cdots\cdots (15)$$

$$Ucain(k) = udsm\_oft + u(k) \quad \cdots\cdots (16)$$

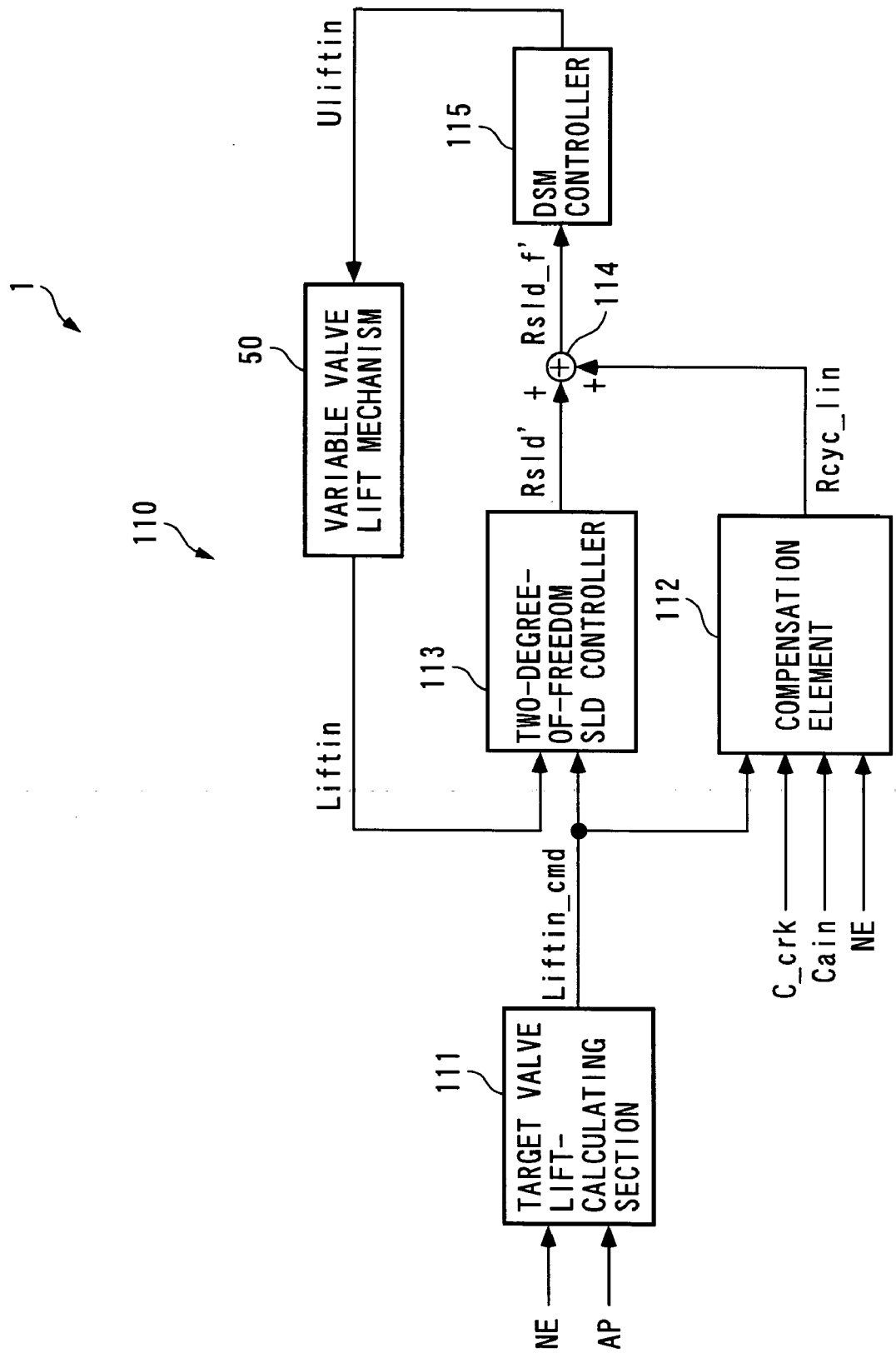

F I G. 25
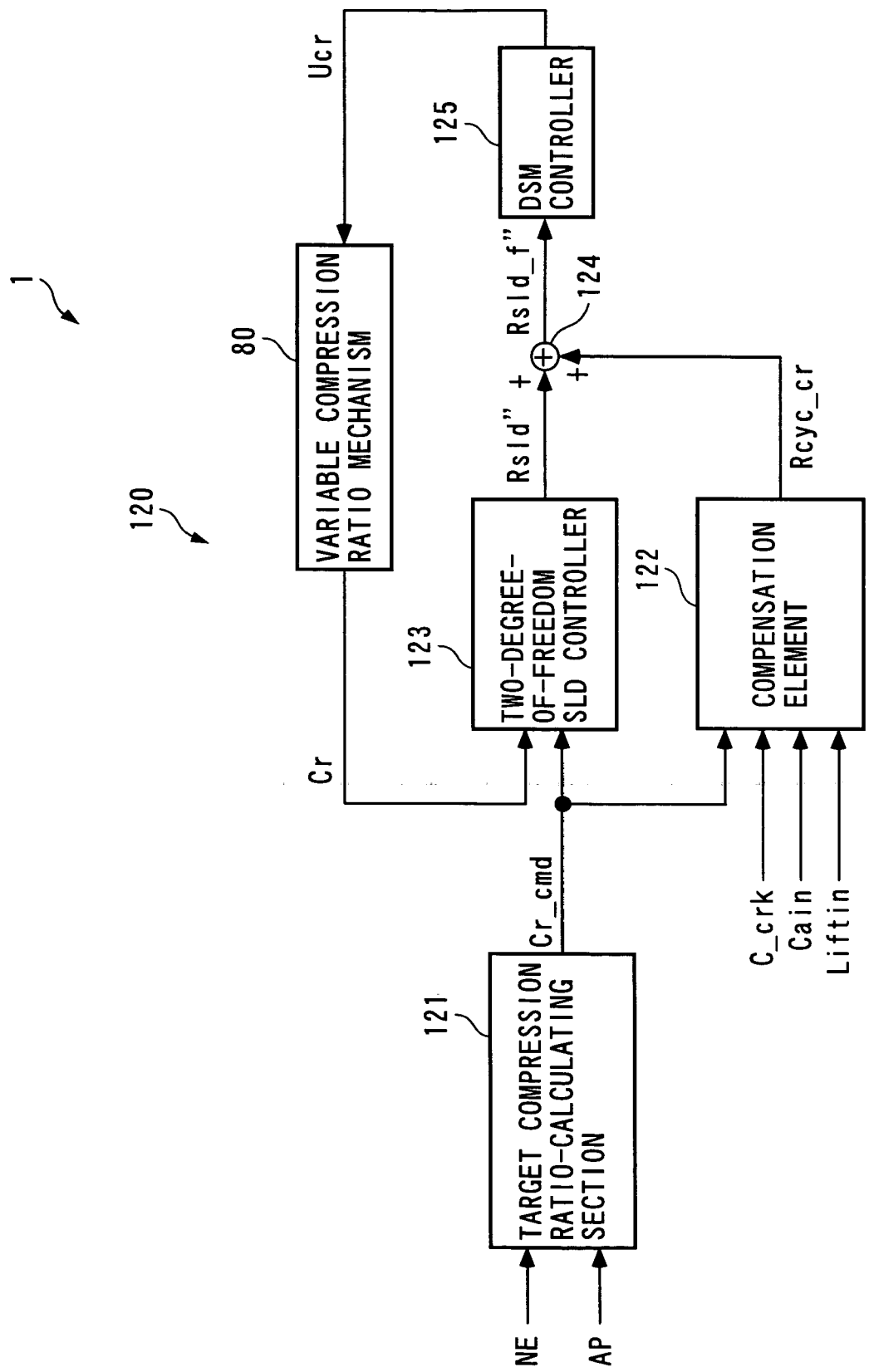

F I G. 3 7
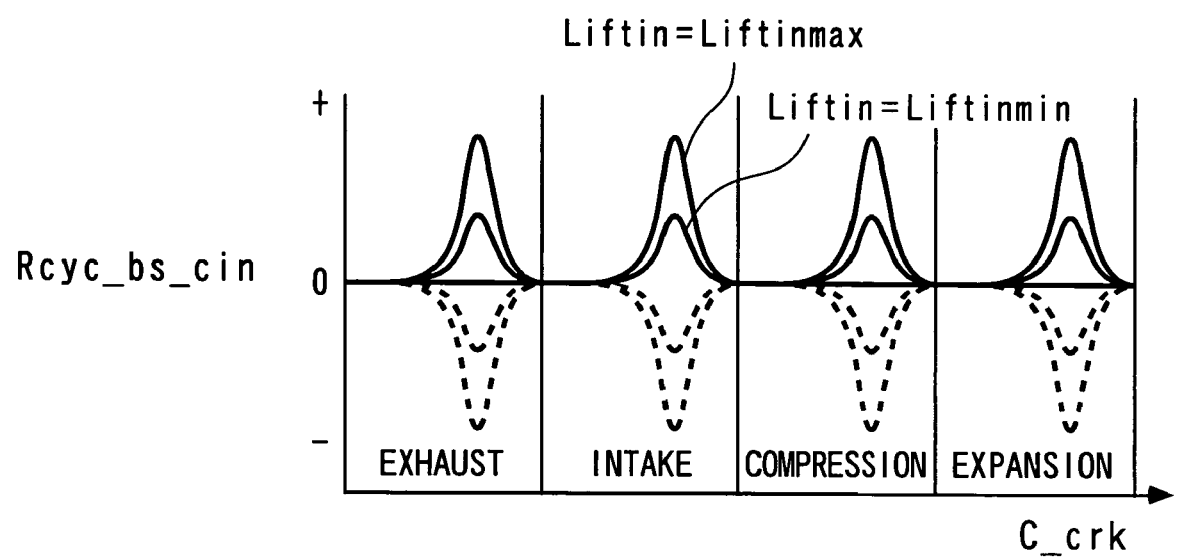

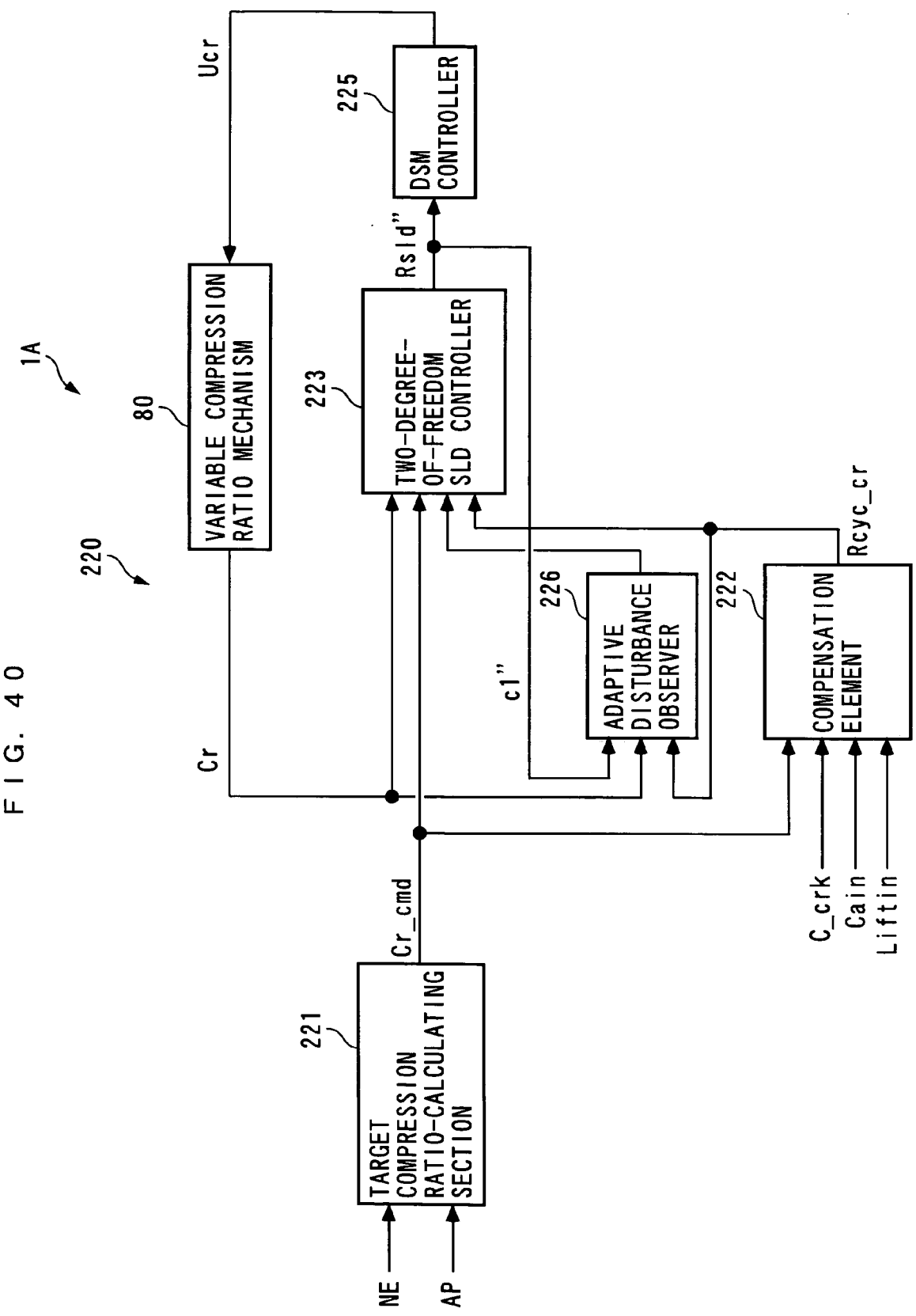

FIG. 41

$$\text{Cain\_hat}(k) = a1 \cdot \text{Cain}(k-1) + a2 \cdot \text{Cain}(k-2)$$
$$+ b1 \cdot \text{Rsld}(k-1) + b2 \cdot \text{Rsld}(k-2) + c1(k-1) - \text{Rcyc\_cin}(k)$$

$$\cdots \cdots (17)$$

$$e\_id(k) = \text{Cain}(k) - \text{Cain\_hat}(k) \quad \cdots \cdots (18)$$

$$c1(k) = c1(k-1) + \frac{P'}{1+P'} \cdot e\_id(k) \quad \cdots \cdots (19)$$

$$\text{Cain}(k+1) = a1 \cdot \text{Cain}(k) + a2 \cdot \text{Cain}(k-1)$$
$$+ b1 \cdot \text{Rsld}(k) + b2 \cdot \text{Rsld}(k-1) + c1 - \text{Rcyc\_cin} \quad \cdots \cdots (20)$$

FIG. 42

$$\text{Cain\_cmd\_f}(k) = -\text{POLE\_f} \cdot \text{Cain\_cmd\_f}(k-1) + (1+\text{POLE\_f}) \cdot \text{Cain\_cmd}(k)$$
$$\cdots (21)$$

$$\text{Rsld}(k) = \text{Req}(k) + \text{Rrch}(k) + \text{Rnl}(k) \qquad \cdots (22)$$

$$\text{Req}(k) = \frac{1}{b1}\{(1-a1-\text{POLE}) \cdot \text{Cain}(k) + (\text{POLE}-a2) \cdot \text{Cain}(k-1) - b2 \cdot \text{Rsld}(k-1)$$
$$+ \text{Cain\_cmd\_f}(k) + (\text{POLE}-1) \cdot \text{Cain\_cmd\_f}(k-1)$$
$$- \text{POLE} \cdot \text{Cain\_cmd\_f}(k-2) - c1(k) + \text{Rcyc\_cin}(k)\} \quad \cdots (23)$$

$$\text{Rrch}(k) = \frac{-\text{Krch}}{b1} \cdot \sigma s(k) \qquad \cdots (24)$$

$$\text{Rnl}(k) = \frac{-\text{Knl}}{b1} \cdot \text{sgn}(\sigma s(k)) \qquad \cdots (25)$$

$$\sigma s(k) = e(k) + \text{POLE} \cdot e(k-1) \qquad \cdots (26)$$

$$e(k) = \text{Cain}(k) - \text{Cain\_cmd\_f}(k-1) \qquad \cdots (27)$$

FIG. 43

$$r1(k) = Lim(Rsld(k)) \quad \cdots (28)$$

$$r2(k) = r1(k) - udsm\_oft \quad \cdots (29)$$

$$\delta(k) = r2(k) - u(k-1) \quad \cdots (30)$$

$$\sigma(k) = \sigma(k-1) + \delta(k) \quad \cdots (31)$$

$$u(k) = fnl(\sigma(k)) \quad \cdots (32)$$

$$Ucain(k) = udsm\_oft + u(k) \quad \cdots (33)$$

FIG. 47

$$W(k) = Cain(k) - a1 \cdot Cain(k-1) - a2 \cdot Cain(k-2) \quad \cdots (34)$$

$$\begin{aligned}W\_hat(k) &= \theta^T(k-1) \cdot \zeta(k) \\ &= b1(k-1) \cdot Rsld(k-1) + b2(k-1) \cdot Rsld(k-2) \\ &\quad + c1(k-1) - d1(k-1) \cdot Rcyc\_cin(k)\end{aligned} \quad \cdots (35)$$

$$e\_id'(k) = W(k) - W\_hat(k) \quad \cdots (36)$$

$$\theta(k) = \theta(k-1) + \frac{P'' \cdot \zeta(k)}{1 + \zeta(k)^T \cdot P'' \cdot \zeta(k)} \cdot e\_id'(k) \quad \cdots (37)$$

$$\theta^T(k) = [b1(k), \ b2(k), \ c1(k), \ -d1(k)] \quad \cdots (38)$$

$$\zeta^T(k) = [Rsld(k-1), \ Rsld(k-2), \ 1, \ Rcyc\_cin(k)] \quad \cdots (39)$$

$$\begin{aligned}Cain(k+1) &= a1 \cdot Cain(k) + a2 \cdot Cain(k-1) \\ &\quad + b1 \cdot Rsld(k) + b2 \cdot Rsld(k-1) + c1 - d1 \cdot Rcyc\_cin\end{aligned} \quad \cdots (40)$$

$$\begin{aligned}Cain(k) - a1 \cdot Cain(k-1) - a2 \cdot Cain(k-2) &= b1(k) \cdot Rsld(k-1) + b2(k) \cdot Rsld(k-2) \\ &\quad + c1(k) - d1(k) \cdot Rcyc\_cin(k)\end{aligned} \quad \cdots (41)$$

F I G. 4 8

$$\text{Cain\_cmd\_f}(k) = -\text{POLE\_f} \cdot \text{Cain\_cmd\_f}(k-1) + (1+\text{POLE\_f}) \cdot \text{Cain\_cmd}(k)$$

$$\cdots\cdots (4\,2)$$

$$\text{Rsld}(k) = \text{Req}(k) + \text{Rrch}(k) + \text{Rnl}(k) \quad\quad\quad \cdots\cdots (4\,3)$$

$$\text{Req}(k) = \frac{1}{b1(k)} \{(1-a1-\text{POLE}) \cdot \text{Cain}(k) + (\text{POLE}-a2) \cdot \text{Cain}(k-1)$$
$$-b2(k) \cdot \text{Rsld}(k-1) + \text{Cain\_cmd\_f}(k)$$
$$+(\text{POLE}-1) \cdot \text{Cain\_cmd\_f}(k-1) - \text{POLE} \cdot \text{Cain\_cmd\_f}(k-2)$$
$$-c1(k) + d1(k) \cdot \text{Rcyc\_cin}(k)\} \quad\quad\quad \cdots\cdots (4\,4)$$

$$\text{Rrch}(k) = \frac{-\text{Krch}}{b1(k)} \cdot \sigma s(k) \quad\quad\quad \cdots\cdots (4\,5)$$

$$\text{Rnl}(k) = \frac{-\text{Knl}}{b1(k)} \cdot \text{sgn}(\sigma s(k)) \quad\quad\quad \cdots\cdots (4\,6)$$

$$\sigma s(k) = e(k) + \text{POLE} \cdot e(k-1) \quad\quad\quad \cdots\cdots (4\,7)$$

$$e(k) = \text{Cain}(k) - \text{Cain\_cmd\_f}(k-1) \quad\quad\quad \cdots\cdots (4\,8)$$

F I G. 4 9

$r1(k) = Lim(Rsld(k))$ ·····(49)

$r2(k) = r1(k) - udsm\_oft$ ·····(50)

$\delta(k) = r2(k) - u(k-1)$ ·····(51)

$\sigma(k) = \sigma(k-1) + \delta(k)$ ·····(52)

$u(k) = fnl(\sigma(k))$ ·····(53)

$Ucain(k) = udsm\_oft + u(k)$ ·····(54)

US 7,188,020 B2

CONTROL SYSTEM

BACKGROUND OF THE INVENTION

1. Field of the Invention

This invention relates to a control system that controls a controlled object to which is applied periodic disturbance the amplitude of which periodically changes.

2. Description of the Related Art

Conventionally, a control system that controls a variable cam phase mechanism of an internal combustion engine has been disclosed in Patent Literature 1 (Japanese Laid-Open Patent Publication (Kokai) No. 2001-132482). This variable cam phase mechanism changes the phase of an intake camshaft, i.e. an intake cam, with respect to a crankshaft (hereinafter referred to as "the cam phase") as desired to thereby change the valve timing of intake valves, and is comprised of a hydraulically-driven variable cam phase mechanism, and a solenoid control valve for supplying hydraulic pressure from an oil pump to the variable cam phase mechanism. Further, the control system includes a crank angle sensor and a cam angle sensor which output signals indicative of the angle position of the crankshaft and that of the intake cam, respectively, and a controller to which are inputted the detection signals from the sensors.

The controller calculates an actual cam phase based on the detection signals from the crank angle sensor and the cam angle sensor, and a target cam phase depending on operating conditions of the engine, and as described hereinafter, controls the variable cam phase mechanism with a sliding mode control algorithm such that the cam phase is caused to converge to the target cam phase. In other words, the controller regards a system to which is inputted a control signal for the solenoid control valve as a control input and from which is outputted the cam phase, as a controlled object, and models the controlled object into a continuous-time system model. More specifically, the characteristic equation of the controlled object is set as a differential equation in which the first-order and second-order time derivative values of the cam phase are represented as state variables. Further, a switching function of the sliding mode control algorithm is set as a linear function in which the difference between the target cam phase and the cam phase and a time derivative value of the difference (i.e. the rate of change in the difference) are represented as state variables. Then, the control input is calculated such that the difference and the rate of change in the difference set as above as the state variables of the switching function are on a switching line. In other words, the control input is calculated such that the difference and the rate of change in the difference slide on the switching line to converge to a value of 0, whereby the cam phase is caused to converge to the target cam phase.

Further, a control system using the sliding mode control algorithm has been proposed in Patent Literature 2 (Japanese Laid-Open Patent Publication (Kokai) No. 2003-5804) by the present assignee. This control system controls a throttle valve-actuating mechanism for the engine, and includes an adaptive sliding mode controller, an onboard identifier, a state predictor, and so forth. Further, the throttle valve-actuating mechanism actuates a throttle valve to thereby change the degree of opening thereof, and includes a motor.

In the control system, a control input for control of the throttle valve-actuating mechanism is calculated as follows: A system to which is inputted the duty ratio of a control signal supplied to the motor as a control input and from which is outputted the difference between the degree of opening of the throttle valve and a target degree of opening thereof is regarded as a controlled object, and the controlled object is modeled into a discrete-time system model defining the relationships between the duty ratio, the difference between the degree of opening of the throttle valve and the target degree of opening thereof, and a compensation value. The compensation value is for compensating for modeling errors in modeling the controlled object, and disturbance.

Then, model parameters of the controlled object model and the compensation value are calculated for identification by the onboard identifier, and the control input is calculated by the adaptive sliding mode controller, using the above identified values, with the sliding mode control algorithm. In the control system, since the control input is calculated as above, it is possible to properly compensate for the modeling errors and the disturbance, thereby making it possible to ensure high accuracy of control.

The control system proposed in Patent Literature 1 suffers from the following problems: (f1) The influence of disturbance on the controlled object is not taken into account, and hence when the controlled object is a variable cam phase mechanism which is liable to be subjected to a steady-state disturbance, the stability and the accuracy of control is degraded by the steady-state disturbance. (f2) Further, the variable cam phase mechanism is provided for changing the phase of the intake cam with respect to the crankshaft, as desired, and hence when the intake cam actuates the intake valve to open and close the same, the intake cam is subjected to a periodic disturbance the amplitude of which periodically changes, due to the urging force and the reaction force of a valve spring of the intake valve (see FIG. 12, referred to hereinafter). When such a periodic disturbance is applied to the variable cam phase mechanism, the total valve open time period of the intake valve is shortened by the influence of the periodic disturbance (see FIGS. 14 and 15, referred to hereinafter), and the amount of intake air decreases when the intake valve is opened. This reduces torque generated by the engine to make unstable the combustion state of the engine.

(f3) Further, since the continuous-time system model is used as a controlled object model, it is difficult to directly identify model parameters of the controlled object model from experimental data of the controlled object. For this reason, it is necessary, more specifically, to approximately transform the continuous-time system model to a discrete-time system model to identify the model parameters based on the discrete-time system model. The use of such approximate transform degrades the accuracy of identification of the model parameters. Furthermore, it is required to approximately transform the discrete-time system model to the continuous-time system model again, which causes an increase in modeling errors occurring in modeling the controlled object. Consequently, to ensure a large margin of the stability of the control, it is necessary to reduce the controller gain, resulting in further degraded controllability. In short, the control system proposed in Patent Literature 1 cannot ensure the robustness and the response-specifying characteristics peculiar to the sliding mode control.

To solve the above described problems in Patent Literature 1, it is contemplated to apply the control method in Patent Literature 2 to the control system proposed in Patent Literature 1. In this case, although the above-described problems (f1) to (f3) in Patent Literature 1 can be solved, since the control method in Patent Literature 2 calculates the compensation value by the onboard identifier, it is impossible to solve the problem (f2) until the number of times of the calculation reaches a predetermined value. In short, it takes some time to compensate for and suppress the influence of the periodic disturbance, which can degrade the stability and the accuracy of the control during the time.

SUMMARY OF THE INVENTION

It is a first object of the invention to provide a control system which is capable of compensating for and suppressing the influence of a periodic disturbance on a controlled object more quickly, even when the controlled object is subjected to the periodic disturbance the amplitude of which periodically changes, thereby enhancing the stability and the accuracy of control.

It is a second object of the invention to provide a control system which is capable of compensating for and suppressing the influence of a periodic disturbance on a moving part-driving mechanism more quickly, thereby enhancing the stability and the accuracy of control.

To attain the first object, in a first aspect of the invention, there is provided a control system for controlling an output of a controlled object to which is applied a periodic disturbance an amplitude of which periodically changes, by a control input, comprising disturbance compensation value-storing means for storing a plurality of disturbance compensation values for compensating for the periodic disturbance, the disturbance compensation values having been set in advance in time series according to a result of prediction of a change in the amplitude of the periodic disturbance, disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values, and control input-calculating means for calculating the control input, with a predetermined control algorithm, according to the selected disturbance compensation value.

With the configuration of this control system, a plurality of disturbance compensation values for compensating for a periodic disturbance are set in advance in time series according to a result of prediction of a change in the amplitude of the periodic disturbance, and stored in disturbance compensation value-storing means. From the stored disturbance compensation values, in timing of selection at a repetition period corresponding to 1/n of a repetition period of occurrence of the periodic disturbance, one disturbance compensation value corresponding to the timing of selection is selected, and the control input is calculated, with a predetermined control algorithm, according to the selected disturbance compensation value. Thus, one disturbance compensation value is only selected in the timing of selection from the disturbance compensation values set in advance, and the control input is calculated according to the selected disturbance compensation value with the predetermined control algorithm. Therefore, the output of the controlled object is controlled by the control input thus calculated, whereby it is possible to compensate for and suppress the influence of the periodic disturbance on the output of the controlled object more quickly than the prior art. This makes it possible to enhance the stability and the accuracy of control. It should be noted throughout the specification, "to store the disturbance compensation values" includes not only to store the disturbance compensation values in a memory or the like but also to hold them within the control system. Further, "to calculate" e.g. in "to calculate the control input", and "to calculate the disturbance estimation value" includes not only to compute by a program but also to generate an electric signal indicative thereof by an electric circuit.

To attain the above object, in a second aspect of the invention, there is provided a control system for controlling an output of a controlled object to which is applied a periodic disturbance an amplitude of which periodically changes, by a control input, comprising disturbance compensation value-storing means for storing a plurality of disturbance compensation values for compensating for the periodic disturbance, the disturbance compensation values having been set in advance in time series according to a result of prediction of a change in the amplitude of the periodic disturbance, disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values, disturbance estimation value-calculating means for calculating a disturbance estimation value for compensating for a disturbance and modeling errors in the controlled object, with a predetermined estimation algorithm based on a model defining relationships between the disturbance estimation value, the control input, and the output of the controlled object, and control input-calculating means for calculating the control input, with a predetermined control algorithm, according to the selected disturbance compensation value.

With the configuration of this control system, a plurality of disturbance compensation values for compensating for a periodic disturbance are set in advance in time series according to a result of prediction of a change in the amplitude of the periodic disturbance, and stored in disturbance compensation value-storing means. From the plurality of stored disturbance compensation values, in timing of selection at a repetition period corresponding to 1/n of a repetition period of occurrence of the periodic disturbance, one disturbance compensation value corresponding to the timing of selection is selected, and a disturbance estimation value for compensating for the disturbance and modeling errors in the controlled object is calculated with a predetermined estimation algorithm based on a model defining relationships between the disturbance estimation value, the control input, and the output of the controlled object. Further, the control input is calculated with a predetermined control algorithm according to the selected disturbance compensation value and the calculated disturbance estimation value. Thus, one disturbance compensation value is only selected in the timing of selection from the disturbance compensation values set in advance, and the control input is calculated according to the selected disturbance compensation value. Therefore, as described above, the output of the controlled object is controlled by the control input thus calculated, whereby it is possible to compensate for and suppress the influence of the periodic disturbance on the output of the controlled object more quickly than the prior art. Moreover, since the control input is calculated further according to the disturbance estimation value, it is possible to properly compensate for the steady-state disturbance in the controlled object and the modeling errors, thereby making it possible to control the output of the controlled object such that the steady-state deviation is not produced. This makes it possible to markedly enhance the stability and the accuracy of the control.

To attain the above object, in a third aspect of the invention, there is provided a control system for controlling an output of a controlled object to which is applied a periodic disturbance an amplitude of which periodically changes, by a control input, comprising disturbance compensation value-storing means for storing a plurality of disturbance compensation values for compensating for the periodic disturbance, the disturbance compensation values having been set in advance in time series according to a result of prediction of a change in the amplitude of the periodic disturbance, disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values, model parameter-identifying means for identifying model parameters of a model defining relationships between the disturbance compensation value, the control input, and the output of the controlled object, with a predetermined identification algorithm, and control input-calculating means for calculating the control input, with a predetermined algorithm including a predetermined control algorithm based on the model, according to the identified model parameters and the selected disturbance compensation value.

With the configuration of this control system, a plurality of disturbance compensation values for compensating for a periodic disturbance are set in advance in time series according to a result of prediction of a change in the amplitude of the periodic disturbance, and stored in disturbance compensation value-storing means. From the stored disturbance compensation values, in timing of selection at a repetition period of selection, corresponding to 1/n of a repetition period of occurrence of the periodic disturbance, one disturbance compensation value corresponding to the timing of selection is selected, and model parameters of a model defining the relationships between the selected disturbance compensation value, the control input, and the output of the controlled object are identified with a predetermined identification algorithm. Then, the control input is calculated with a predetermined algorithm including a predetermined control algorithm based on the model, according to the identified model parameters and the selected disturbance compensation value. Thus, one disturbance compensation value is only selected in the timing of selection from the disturbance compensation values set in advance, and the control input is calculated according to the selected disturbance compensation value. Therefore, as described above, the output of the controlled object is controlled by the control input thus calculated, whereby it is possible to compensate for and suppress the influence of the periodic disturbance on the output of the controlled object more quickly than the prior art. Moreover, the control input is calculated further according to the identified values of model parameters of the model defining the relationships between the disturbance compensation value, the control input, and the output of the controlled object, and hence the control input can be calculated using the model parameters identified such that they are not adversely affected by the periodic disturbance, whereby even when the dynamic characteristics of the controlled object change, it is possible to control the output of the controlled object, while quickly absorbing the influence of the change. This makes it possible to markedly enhance the stability and the accuracy of the control.

To attain the above object, in a fourth aspect of the invention, there is provided a control system for controlling an output of a controlled object to which is applied a periodic disturbance an amplitude of which periodically changes, by a control input, comprising disturbance compensation value-storing means for storing a plurality of disturbance compensation values for compensating for the periodic disturbance, the disturbance compensation values having been set in advance in time series according to a result of prediction of a change in the amplitude of the periodic disturbance, disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values, amplitude correction value-calculating means for calculating an amplitude correction value for correcting an amplitude of the disturbance compensation value, with a predetermined algorithm based on a model defining relationships between the amplitude correction value, the disturbance compensation value, the control input, and the output of the controlled object, and control input-calculating means for calculating the control input, with a predetermined control algorithm, according to the calculated amplitude correction value and the selected disturbance compensation value.

With the configuration of this control system, a plurality of disturbance compensation values for compensating for a periodic disturbance are set in advance in time series according to a result of prediction of a change in the amplitude of the periodic disturbance, and stored in disturbance compensation value-storing means. From the stored disturbance compensation values, in the timing of selection at a repetition period corresponding to 1/n of a repetition period of occurrence of the periodic disturbance, one disturbance compensation value corresponding to the timing of selection is selected. Then, an amplitude correction value for correcting an amplitude of the disturbance compensation value is calculated with a predetermined algorithm based on a model defining the relationships between the amplitude correction value, the selected disturbance compensation value, the control input, and the output of the controlled object, and the control input is calculated with a predetermined control algorithm according to the calculated amplitude correction value and the selected disturbance compensation value. As described above, one disturbance compensation value is only selected in the timing of selection from the disturbance compensation values set in advance, and the control input is calculated according to the selected disturbance compensation value. Therefore, by controlling the output of the controlled object by the control input thus calculated, as described above, it is possible to compensate for and suppress the influence of the periodic disturbance on the output of the controlled object more quickly than the prior art. Moreover, the control input is calculated further according to the amplitude correction value, so that even when a difference occurs between the amplitude of the disturbance compensation value and the amplitude of an actual periodic disturbance, such a difference can be compensated for. From the above, it is possible to enhance the stability and the accuracy of the control.

Preferably, the control system further comprises target value-setting means for setting a target value of the output of the controlled object, and the predetermined control algorithm includes a response-specifying control algorithm for causing the output of the controlled object to converge to the target value.

With the configuration of this preferred embodiment, the control input is calculated with the predetermined control algorithm including a response-specifying control algorithm for causing the output of the controlled object to converge to a target value, and hence even when there occurs a large difference between the output of the controlled object and the target value, the output of the controlled object can be caused to converge to the target value quickly and accurately while avoiding overshooting due to the large difference. This makes it possible to further enhance the stability and the accuracy of the control.

Preferably, the control system further comprises target value-setting means for setting a target value of the output of the controlled object, and the predetermined control algorithm includes a two-degree-of-freedom control algorithm for causing the output of the controlled object to converge to the target value.

With the configuration of this preferred embodiment, the control input is calculated with the predetermined control algorithm including a two-degree-of-freedom control algorithm for causing the output of the controlled object to converge to a target value, and hence even when the target value is largely changed, the output of the controlled object can be caused to converge to the target value stably and accurately while avoiding overshooting due to the change. This makes it possible to further enhance the stability and the accuracy of the control.

Preferably, the controlled object includes a variable cam phase mechanism for changing a cam phase, the cam phase being defined as at least one of a phase of an intake camshaft and a phase of an exhaust camshaft of an internal combustion engine with respect to a crankshaft, the output of the controlled object being the cam phase changed by the variable cam phase mechanism, and the control input is inputted to the variable cam phase mechanism.

With the configuration of this preferred embodiment, it is possible to control the cam phase, while compensating for and suppressing the influence of the periodic disturbance on the cam phase more quickly than the prior art. This makes it possible to prevent the intake air amount from being changed due to the periodic disturbance when at least one of each intake valve and each exhaust valve is opened. This makes it possible to avoid a change in torque generated by the engine to ensure a stable combustion state of the engine.

Preferably, the controlled object includes a variable valve lift mechanism for changing a valve lift, the valve lift being defined as at least one of a lift of intake valves and a lift of exhaust valves of an internal combustion engine, and the output of the controlled object being the valve lift changed by the variable valve lift mechanism, and the control input is inputted to the variable valve lift mechanism.

Generally, when the variable valve lift mechanism is subjected to the periodic disturbance, at least one of the lift of intake valves and the lift of exhaust valves is changed by the influence of the periodic disturbance, to change the intake air amount when they are opened. This causes a change in torque generated by the engine to make unstable the combustion state of the engine. In view of this, with the configuration of this preferred embodiment, it is possible to control the lift of each intake valve and/or each exhaust valve, while compensating for and suppressing the influence of the periodic disturbance on the cam phase more quickly than the prior art. This makes it possible to prevent the intake air amount from being changed by the periodic disturbance when each intake valve and/or each exhaust valve are/is opened, thereby making it possible to avoid the change in torque generated by the engine to ensure a stable combustion state of the engine.

Preferably, the controlled object includes a variable compression ratio mechanism for changing a compression ratio of an internal combustion engine, the output of the controlled object being the compression ratio changed by the variable compression ratio mechanism, and the control input is inputted to the variable compression ratio mechanism.

Generally, when the variable compression ratio mechanism is subjected to the periodic disturbance, a compression ratio is changed due to the influence of the periodic disturbance, to thereby degrade compatibility between the compression ratio and the ignition timing. This can cause occurrence of knocking and degradation of combustion efficiency. In view of this, with the configuration of this preferred embodiment, it is possible to control the compression ratio, while compensating for and suppressing the influence of the periodic disturbance on the cam phase more quickly than the prior art. This makes it possible to prevent the compression ratio from being changed by the influence of the periodic disturbance, to thereby maintain excellent compatibility between the compression ratio and the ignition timing. As a result, it is possible to avoid occurrence of knocking and reduction of combustion efficiency.

To attain the second object, in a fifth aspect of the invention, there is provided a control system for a moving part-driving mechanism which changes at least one of operation timing and an operation amount of a moving part of an internal combustion engine, and to which is applied a periodic disturbance an amplitude of which periodically changes along with rotation of a crankshaft of the engine, comprising disturbance compensation value-storing means for storing a plurality of disturbance compensation values for compensating for the periodic disturbance, the disturbance compensation values having been set in advance according to a result of prediction of a change in amplitude of the periodic disturbance caused by the rotation of the crankshaft, disturbance compensation value-selecting means for selecting, in timing of selection corresponding to each rotation of the crankshaft of the engine through a predetermined angle, a disturbance compensation value corresponding to the timing of selection from the stored disturbance compensation values, and control input-calculating means for calculating a control input for control of the moving part-driving mechanism, with a predetermined control algorithm, according to the selected disturbance compensation value.

With the configuration of this control system, a plurality of disturbance compensation values for compensating for a periodic disturbance are set in advance according to a result of prediction of a change in amplitude of the periodic disturbance, and stored in disturbance compensation value-storing means, and from the disturbance compensation values in the timing of selection corresponding to each rotation of the crankshaft of the engine through a predetermined angle, a disturbance compensation value corresponding to the timing of selection is selected, so that by properly setting the predetermined angle, the disturbance compensation value can be selected as a value capable of compensating for the periodic disturbance properly and quickly. Further, it is only required to select a disturbance compensation value, and the control input for control of the moving part-driving mechanism is calculated with a predetermined algorithm according to the disturbance compensation value thus selected, and hence if the moving part-driving mechanism is controlled using the control input calculated as above, it is possible to compensate for and suppress the influence of the periodic disturbance on at least one of the operation timing and the operation amount of the moving part more quickly than the prior art. This makes it possible to enhance the stability and the accuracy of control of the moving part-driving mechanism.

Preferably, the moving part-driving mechanism includes a variable cam phase mechanism for changing a cam phase as the operation timing of the moving part, the camp phase being defined as at least one of a phase of an intake camshaft and a phase of an exhaust camshaft of the engine with respect to the crankshaft.

With the configuration of this preferred embodiment, the moving part-driving mechanism includes a variable cam phase mechanism for changing a cam phase as the operation timing of the moving part, and hence by controlling the variable cam phase mechanism using the control input calculated according to the disturbance compensation value, it is possible to compensate for and suppress the influence of the periodic disturbance on the variable cam phase mechanism more quickly than the prior art, thereby making it possible to enhance the stability and the accuracy of the control. When the variable cam phase mechanism is applied to a type for changing the cam phase of intake camshaft, differently from the prior art, it is possible to prevent the whole valve open time period of each intake valve from being shortened by the influence of the periodic disturbance, thereby making it possible to avoid the amount of intake air from being reduced when the intake valve is opened. This makes it possible to properly ensure torque generated by the engine to ensure a stable combustion state of the engine. Further, when the variable cam phase mechanism is applied to a type for changing the cam phase of the exhaust camshaft, it is possible to prevent the whole valve open time period of each exhaust valve from being shortened by the influence of the periodic disturbance, thereby making it possible to avoid reduction of the internal EGR amount. This makes it possible to ensure a stable combustion state of the engine.

Preferably, the disturbance compensation value-selecting means selects the disturbance compensation value further according to a cam phase parameter indicative of the cam phase.

Generally, when the variable cam phase mechanism is provided in the engine, when the cam phase is changed by the variable cam phase mechanism, the phase of the periodic disturbance applied to the variable cam phase mechanism is also changed. In view of this, with the configuration of this preferred embodiment, since the disturbance compensation value is selected further according to a cam phase parameter indicative of the cam phase, it is possible to select the disturbance compensation value as a value capable of properly compensating for a change in the cam phase of the periodic disturbance, caused by the change in the cam phase. This makes it possible to further enhance the stability and the accuracy of the control.

Preferably, the engine includes a variable valve lift mechanism for changing a valve lift, the valve lift being defined as at least one of a lift of intake valves and a lift of exhaust valves of the engine, and the disturbance compensation values being set further according to results being prediction of at least one of the change in the amplitude and a change in a behavior of the periodic disturbance, caused by a change in the valve lift by the variable valve lift mechanism, and the disturbance compensation value-selecting means selects the disturbance compensation value further according to a valve lift parameter indicative of the valve lift.

Generally, when the variable valve lift mechanism is provided in the engine, when the valve lift is changed by the variable valve lift mechanism, at least one of the amplitude and the behavior of the periodic disturbance applied to the variable cam phase mechanism is also changed. In view of this, with the configuration of this preferred embodiment, the disturbance compensation values are set further according to a result of prediction of at least one of a change in the amplitude and a change in the behavior of the periodic disturbance, caused by the change in the valve lift by the variable valve lift mechanism, and the disturbance compensation value is selected further according to a valve lift parameter indicative of the valve lift. Therefore, the disturbance compensation value can be selected as a value capable of properly compensating for at least one of the change in the amplitude and the change in the behavior of the periodic disturbance, caused by the change in the valve lift. This makes it possible to further enhance the stability and the accuracy of the control.

Preferably, the control input-calculating means corrects the disturbance compensation value according to a rotational speed of the engine, and calculates the control input according to the corrected disturbance compensation value.

Generally, when the rotational speed of the engine is changed, the frequency of the periodic disturbance applied to the variable cam phase mechanism is also changed. In view of this, with the configuration of this preferred embodiment, since the disturbance compensation value is corrected according to the rotational speed of the engine, the change in the frequency of the periodic disturbance, caused by the change in the rotational speed of the engine, can be reflected on the corrected disturbance compensation value. Further, since the control input is calculated according to the disturbance compensation value thus corrected, it is possible to control the variable cam phase mechanism, while properly compensating for the change in the frequency of the periodic disturbance, caused by the change in the rotational speed of the engine.

Preferably, the control input-calculating means calculates the control input irrespective of the disturbance compensation value, when the rotational speed of the engine is not lower than a predetermined rotational speed.

When the disturbance compensation value is selected in the timing of selection corresponding to each rotation of the crankshaft of the engine through the predetermined angle, if the rotational speed of the engine becomes high, an interval of the timing for selecting the disturbance compensation value, that is, a repetition period of selecting the disturbance compensation value becomes very short. When the control input is calculated using the disturbance compensation value selected at such a short repetition period, the disturbance cannot be properly compensated for due to low responsiveness of the variable cam phase mechanism, which can degrade controllability. In view of this, with the configuration of this preferred embodiment, the control input is calculated irrespective of the disturbance compensation value when the rotational speed of the engine is not lower than a predetermined rotational speed, so that by setting the predetermined rotational speed to an appropriate speed, it is possible to control the variable cam phase mechanism without degrading the controllability in a high rotational speed region.

Preferably, the control system further includes target cam phase-setting means for setting a target cam phase as a target of the cam phase, and the predetermined control algorithm includes a predetermined response-specifying control algorithm for causing the cam phase to converge to the target cam phase.

With the configuration of this preferred embodiment, the control input is calculated with the control algorithm including a response-specifying control algorithm for causing the cam phase to converge to a target cam phase, and hence even when there occurs a large difference between the cam phase and the target cam phase, the cam phase can be caused to converge to the target cam phase quickly and accurately while avoiding overshooting due to the large difference. This makes it possible to markedly enhance the stability and the accuracy of the control.

Preferably, the control system further includes disturbance estimation value-calculating means for calculating a disturbance estimation value for compensating for a disturbance and modeling errors in the variable cam phase mechanism, with a predetermined estimation algorithm based on a model defining relationships between the disturbance estimation value, the control input, and the cam phase, and the control input-calculating means calculates the control input further according to the calculated disturbance estimation value.

With the configuration of this preferred embodiment, a disturbance estimation value for compensating for the disturbance and modeling errors in the variable cam phase mechanism is calculated with a predetermined estimation algorithm based on a model defining the relationships between the disturbance estimation value, the control input, and the cam phase, and the control input is calculated further according to the calculated disturbance estimation value. Therefore, it is possible to properly compensate for a steady-state disturbance acting on the variable cam phase mechanism, and modeling errors in the cam phase control, thereby enabling the cam phase to be controlled such that a steady-state deviation is not produced. This makes it possible to markedly enhance the stability and the accuracy of the control.

Preferably, the control system further includes model parameter-identifying means for identifying model parameters of a model defining relationships between the disturbance compensation value, the control input, and the cam phase, with a predetermined identification algorithm, and the control input-calculating means calculates the control input with the predetermined control algorithm including a predetermined algorithm formed based on the model, according to the identified model parameters.

With the configuration of this preferred embodiment, model parameters of a model defining the relationships between the disturbance compensation value, the control input, and the cam phase are identified with a predetermined identification algorithm, and the control input is calculated with the predetermined control algorithm including a predetermined algorithm based on the model, according to the identified model parameters. Therefore, even when the dynamic characteristics of the variable cam phase mechanism change, it is possible to control the variable cam phase mechanism, while quickly absorbing the influence of the change in the dynamic characteristics of the variable cam phase mechanism. This makes it possible to markedly enhance the stability and the accuracy of the control.

Preferably, the moving part-driving mechanism includes a variable valve lift mechanism for changing a valve lift as the operation amount of the moving part, the valve lift being defined as at least one of a lift of intake valves and a lift of exhaust valves of the engine.

With the configuration of this preferred embodiment, since the moving part-driving mechanism includes a variable valve lift mechanism for changing a valve lift as the operation amount of the moving part, by controlling the variable valve lift mechanism using the control input calculated according to the disturbance compensation value, it is possible to compensate for and suppress the influence of the periodic disturbance on the variable valve lift mechanism more quickly than the prior art, thereby making it possible to enhance the stability and the accuracy of control of the variable valve lift mechanism. This makes it possible to prevent the lift of each intake valve and/or each exhaust valve from being changed by the influence of the periodic disturbance, thereby making it possible to prevent the intake air amount and/or the internal EGR amount from being changed when the valves are opened. As a result, it is possible to properly ensure torque generated by the engine to ensure a stable combustion state of the engine.

Preferably, the disturbance compensation value-selecting means selects the disturbance compensation value further according to a valve lift parameter indicative of the valve lift.

Generally, when the variable valve lift mechanism is provided in the engine, when the valve lift is changed by the variable valve lift mechanism, the amplitude of the periodic disturbance applied to the variable valve lift mechanism is also changed. In view of this, with the configuration of this preferred embodiment, the disturbance compensation value is selected further according to a valve lift parameter indicative of the valve lift, and hence the disturbance compensation value can be selected as a value capable of properly compensating for the change in the amplitude of the periodic disturbance, caused by the change in the valve lift. This makes it possible to further enhance the stability and the accuracy of the control of the variable valve lift mechanism.

Preferably, the engine includes a variable cam phase mechanism for changing a cam phase, the cam phase being defined as at least one of a phase of an intake camshaft and a phase of an exhaust camshaft of the engine with respect to the crankshaft, and the disturbance compensation value-selecting means selects the disturbance compensation value further according to a cam phase parameter indicative of the cam phase.

Generally, when the variable cam phase mechanism is provided in the engine, when the cam phase is changed by the variable cam phase mechanism, the phase of the periodic disturbance applied to the variable valve lift mechanism is also changed. In view of this, with the configuration of this preferred embodiment, the disturbance compensation value is selected further according to a cam phase parameter indicative of the cam phase, so that the disturbance compensation value can be selected as a value capable of properly compensating for the change in the phase of the periodic disturbance, caused by the change in the cam phase. This makes it possible to further enhance the stability and the accuracy of the control of the variable valve lift mechanism.

Preferably, the control input-calculating means corrects the disturbance compensation value according to a rotational speed of the engine, and calculates the control input according to the corrected disturbance compensation value.

Generally, when the rotational speed of the engine is changed, the frequency of the periodic disturbance applied to the variable valve lift mechanism is also changed. In view of this, with the configuration of this preferred embodiment, since the disturbance compensation value is corrected according to the rotational speed of the engine, the change in the frequency of the periodic disturbance, caused by the change in the rotational speed of the engine can be reflected on the corrected disturbance compensation value. Further, since the control input is calculated according to the disturbance compensation value thus corrected, it is possible to control the variable valve lift mechanism, while properly compensating for the change in the frequency of the periodic disturbance, caused by the change in the rotational speed of the engine.

Preferably, the control input-calculating means calculates the control input irrespective of the disturbance compensation value, when the rotational speed of the engine is not lower than a predetermined rotational speed.

When the disturbance compensation value is selected in the timing of selection corresponding to each rotation of the crankshaft of the engine through a predetermined angle, if the rotational speed of the engine becomes high, the interval of the timing for selecting the disturbance compensation value, that is, the repetition period of selecting the disturbance compensation value becomes very short. When the control input is calculated using the disturbance compensation value selected at such a short repetition period, the disturbance cannot be properly compensated for due to low responsiveness of the variable valve lift mechanism, which can degrade controllability of the control system. In view of this, with the configuration of this preferred embodiment, the control input is calculated irrespective of the disturbance compensation value, when the rotational speed of the engine is not lower than a predetermined rotational speed, and hence by setting the predetermined rotational speed to an appropriate speed, it is possible to control the variable valve lift mechanism without degrading the controllability in a high rotational speed region.

Preferably, the control system further includes target valve lift-setting means for setting a target valve lift as a target of the valve lift, and the predetermined control algorithm includes a predetermined response-specifying control algorithm for causing the valve lift to converge to the target valve lift.

With the configuration of this preferred embodiment, the control input is calculated with the predetermined control algorithm including a predetermined response-specifying control algorithm for causing the valve lift to converge to the target valve lift, and hence even when there occurs a large difference between the valve lift and the target valve lift, the valve lift can be caused to converge to the target valve lift quickly and accurately while avoiding overshooting due to the large difference. This makes it possible to markedly enhance the stability and the accuracy of the control.

Preferably, the control system further includes disturbance estimation value-calculating means for calculating a disturbance estimation value for compensating for a disturbance and modeling errors in the variable valve lift mechanism, with a predetermined estimation algorithm based on a model defining relationships between the disturbance estimation value, the control input, and the valve lift, and the control input-calculating means calculates the control input further according to the calculated disturbance estimation value.

With the configuration of this preferred embodiment, a disturbance estimation value for compensating for a disturbance and modeling errors in the variable valve lift mechanism is calculated with a predetermined estimation algorithm based on a model defining the relationships between the disturbance estimation value, the control input, and the valve lift, and the control input is calculated further according to the calculated disturbance estimation value. Therefore, it is possible to properly compensate for a steady-state disturbance acting on the variable valve lift mechanism, and modeling errors in the valve lift control, thereby enabling the valve lift to be controlled such that a steady-state deviation is not produced. This makes it possible to markedly enhance the stability and the accuracy of the control.

Preferably, the control system further includes model parameter-identifying means for identifying model parameters of a model defining relationships between the disturbance compensation value, the control input, and the valve lift, with a predetermined identification algorithm, and the control input-calculating means calculates the control input with the predetermined control algorithm including a predetermined algorithm formed based on the model, according to the identified model parameters.

With the configuration of this preferred embodiment, model parameters of a model defining the relationships between the disturbance compensation value, the control input, and the valve lift are identified with a predetermined identification algorithm, and the control input is calculated with the predetermined control algorithm including a predetermined algorithm based on the model, according to the identified model parameters. Therefore, even when the dynamic characteristics of the variable valve lift mechanism change, it is possible to control the variable valve lift mechanism, while quickly absorbing the influence of the change in the dynamic characteristics of the variable cam phase mechanism. This makes it possible to markedly enhance the stability and the accuracy of the control.

Preferably, the moving part-driving mechanism includes a variable compression ratio mechanism for changing a compression ratio of the engine by changing a stroke of pistons of the engine as the operation amount of the moving part.

Generally, in the case of a variable compression ratio mechanism, when the periodic disturbance is applied thereto, a compression ratio is changed by the influence of the periodic disturbance to thereby degrade compatibility between the compression ratio and the ignition timing, which can cause occurrence of knocking and degradation of combustion efficiency. In view of this, with the configuration of this preferred embodiment, by controlling the variable compression ratio mechanism using the control input calculated according to the disturbance compensation value, it is possible to compensate for and suppress the influence of the periodic disturbance on the variable compression ratio mechanism more quickly than the prior art. Therefore, it possible to prevent the compression ratio from being changed by the influence of the periodic disturbance, thereby making it possible to maintain excellent compatibility between the compression ratio and the ignition timing. This makes it possible to avoid occurrence of knocking and degradation of combustion efficiency to thereby ensure a stable combustion state of the engine.

Preferably, the disturbance compensation value-selecting means selects the disturbance compensation value further according to a compression ratio parameter indicative of the compression ratio.

Generally, when the variable compression ratio mechanism is provided in the engine, when the compression ratio is changed by the variable compression ratio mechanism, the amplitude of the periodic disturbance applied to the variable compression ratio mechanism is also changed. In view of this, with the configuration of this preferred embodiment, the disturbance compensation value is selected further according to a compression ratio parameter indicative of the compression ratio, and hence the disturbance compensation value can be selected as a value capable of properly compensating for the change in the amplitude of the periodic disturbance, caused by the change in the compression ratio. This makes it possible to further enhance the stability and the accuracy of control of the variable compression ratio mechanism.

Preferably, the control input-calculating means corrects the disturbance compensation value according to a rotational speed of the engine, and calculates the control input according to the corrected disturbance compensation value.

Generally, when the rotational speed of the engine is changed, the frequency of the periodic disturbance applied to the variable compression ratio mechanism is also changed. In view of this, with the configuration of this preferred embodiment, since the disturbance compensation value is corrected according to the rotational speed of the engine, the change in the frequency of the periodic disturbance, caused by the change in the rotational speed of the engine can be reflected on the corrected disturbance compensation value. Further, since the control input is calculated according to the disturbance compensation value thus corrected, it is possible to control the variable compression ratio mechanism, while properly compensating for the change in the frequency of the periodic disturbance, caused by the change in the rotational speed of the engine.

Preferably, the control input-calculating means corrects the disturbance compensation value according to load parameters indicative of load on the engine, and calculates the control input according to the corrected disturbance compensation value.

Generally, when load on the engine is changed, the amplitude of the periodic disturbance applied to the variable compression ratio mechanism is also changed. In view of this, with the configuration of this preferred embodiment, the disturbance compensation value is corrected according to a load parameter indicative of load on the engine, and hence the change in the frequency of the periodic disturbance, caused by the change in the load of the engine can be reflected on the corrected disturbance compensation value. Further, since the control input is calculated according to the disturbance compensation value thus corrected, it is possible to control the variable compression ratio mechanism while properly compensating for the change in the amplitude of the periodic disturbance, caused by the change in the load of the engine.

Preferably, the engine includes a variable cam phase mechanism for changing a cam phase, the cam phase being defined as at least one of a phase of an intake camshaft and a phase of an exhaust camshaft of the engine with respect to the crankshaft, and the load parameter include a cam phase parameter indicative of the cam phase.

Generally, when the variable cam phase mechanism is provided in the engine, when the cam phase is changed by the variable cam phase mechanism, the amplitude of the periodic disturbance applied to the variable cam phase mechanism is also changed. In view of this, with the configuration of this preferred embodiment, since the load parameter includes a cam phase parameter indicative of the cam phase, the disturbance compensation value is corrected according to the cam phase parameter, and hence the change in the amplitude of the periodic disturbance, caused by the change in the cam phase of the engine can be reflected on the corrected disturbance compensation value. This makes it possible to control the variable compression ratio mechanism while properly compensating for the change in the amplitude of the periodic disturbance.

Preferably, the engine includes a variable valve lift mechanism for changing a valve lift, the valve lift being defined as at least one of a lift of intake valves and a lift of exhaust valves of the engine, and the load parameter include a valve lift parameter indicative of the valve lift.

Generally, when the variable valve lift mechanism is provided in the engine, when the valve lift is changed by the variable valve lift mechanism, the amplitude of the periodic disturbance applied to the variable compression ratio mechanism is also changed. In view of this, with the configuration of this preferred embodiment, since the load parameter includes a valve lift parameter indicative of the valve lift, the disturbance compensation value is corrected according to the valve lift parameter, and hence the change in the amplitude of the periodic disturbance, caused by the change in the valve lift of the engine can be reflected on the corrected disturbance compensation value. This makes it possible to control the variable compression ratio mechanism, while properly compensating for the change in the amplitude of the periodic disturbance.

Preferably, the control input-calculating means calculates the control input irrespective of the disturbance compensation value, when the rotational speed of the engine is not lower than a predetermined rotational speed.

When the disturbance compensation value is selected in the timing of selection corresponding to each rotation of the crankshaft of the engine through a predetermined angle, if the rotational speed of the engine becomes high, the interval of the timing for selecting the disturbance compensation value, that is, the repetition period of selecting the disturbance compensation value becomes very short. When the control input is calculated using the disturbance compensation value selected at such a short repetition period, the disturbance cannot be properly compensated for due to low responsiveness of the variable compression ratio mechanism, which can degrade controllability. In view of this, with the configuration of this preferred embodiment, the control input is calculated irrespective of the disturbance compensation value when the rotational speed of the engine is not lower than a predetermined rotational speed, and hence by setting the predetermined rotational speed to an appropriate speed, it is possible to control the variable compression ratio mechanism without degrading the controllability in a high rotational speed region.

Preferably, the control system further includes target compression ratio-setting means for setting a target compression ratio as a target of the compression ratio, and the predetermined control algorithm includes a predetermined response-specifying control algorithm for causing the compression ratio to converge to the target compression ratio.

With the configuration of this preferred embodiment, the control input is calculated with the predetermined control algorithm including a predetermined response-specifying control algorithm for causing the compression ratio to converge to the target compression ratio. Therefore, even when there occurs a large difference between the compression ratio and the target compression ratio, the compression ratio can be caused to converge to the target compression ratio quickly and accurately while avoiding overshooting due to the large difference. This makes it possible to markedly enhance the stability and the accuracy of the control.

Preferably, the control system further includes disturbance estimation value-calculating means for calculating a disturbance estimation value for compensating for a disturbance and modeling errors in the variable compression ratio mechanism, with a predetermined estimation algorithm based on a model defining relationships between the disturbance estimation value, the control input, and the compression ratio, and the control input-calculating means calculates the control input further according to the calculated disturbance estimation value.

With the configuration of this preferred embodiment, a disturbance estimation value for compensating for a disturbance and modeling errors in the variable compression ratio mechanism is calculated with a predetermined estimation algorithm based on a model defining the relationships between the disturbance estimation value, the control input, and the compression ratio, and the control input is calculated further according to the calculated disturbance estimation value. Therefore, it is possible to properly compensate for a steady-state disturbance acting on the variable compression ratio mechanism, and modeling errors in the compression ratio control, thereby enabling the compression ratio to be controlled such that a steady-state deviation is not produced. This makes it possible to markedly enhance the stability and the accuracy of the control.

Preferably, the control system further includes model parameter-identifying means for identifying model parameters of a model defining relationships between the disturbance compensation value, the control input, and the compression ratio, with a predetermined identification algorithm, and the control input-calculating means calculates the control input with the predetermined control algorithm including the predetermined algorithm based on the model, according to the identified model parameters.

With the configuration of this preferred embodiment, model parameters of a model defining the relationships between the disturbance compensation value, the control input, and the compression ratio are identified with a predetermined identification algorithm, and the control input is calculated with the predetermined control algorithm including the predetermined algorithm formed based on the model, according to the identified model parameters. Accordingly, even when the dynamic characteristics of the variable compression ratio mechanism change, it is possible to control the variable compression ratio mechanism, while quickly absorbing the influence of the change in the dynamic characteristics of the variable compression ratio mechanism. This makes it possible to markedly enhance the stability and the accuracy of the control.

The above and other objects, features, and advantages of the present invention will become more apparent from the following detailed description taken in conjunction with the accompanying drawings.

BRIEF DESCRIPTION OF THE DRAWINGS

FIG. 5A is a diagram showing a lift actuator in a state in which a short arm thereof is in a maximum lift position;

FIG. 5B is a diagram showing the lift actuator in a state in which the short arm thereof is in a minimum lift position;

FIG. 6A is a diagram showing an intake valve placed in an open state when a lower link of the variable valve lift mechanism is in a maximum lift position;

FIG. 6B is a diagram showing the intake valve placed in an open state when the lower link of the variable valve lift mechanism is in a minimum lift position;

FIGS. 12A and 12B are diagrams useful in explaining a periodic disturbance, in which FIG. 12A is a diagram useful in explaining operation of an intake cam actuating the intake valve in the valve-opening direction, and FIG. 12B is a diagram useful in explaining operation of the intake cam actuating the intake valve in the valve-closing direction;

FIG. 20 is a diagram showing a control algorithm for a two-degree-of-freedom sliding mode controller, and a model used for deriving the control algorithm;

FIG. 21 is a diagram showing an arithmetic expression for an addition element, and a control algorithm for a DSM controller;

FIG. 22 s a block diagram schematically showing the configuration of a valve lift controller;

FIG. 25 is a block diagram schematically showing the configuration of a compression ratio controller;

FIG. 37 is a diagram showing a variation of the disturbance compensation value map for use in calculation of a map value of a disturbance compensation value for the cam phase control;

FIG. 40 is a block diagram schematically showing the configuration of a compression ratio controller of the control system according to the second embodiment;

FIG. 41 is a diagram showing an algorithm for calculation of a disturbance estimation value by an adaptive disturbance observer of the cam phase controller of the control system according to the second embodiment, and a model used for deriving the algorithm;

FIG. 42 is a diagram showing a control algorithm for a two-degree-of-freedom sliding mode controller of the cam phase controller of the control system according to the second embodiment;

FIG. 43 is a diagram showing a control algorithm for a DSM controller of the cam phase controller of the control system according to the second embodiment;

FIG. 47 is a diagram showing an identification algorithm for a partial parameter identifier of the cam phase controller of the control system according to the third embodiment, and a model used for deriving the identification algorithm;

FIG. 48 is a diagram showing a control algorithm for a two-degree-of-freedom sliding mode controller of the cam phase controller of the control system according to the third embodiment; and FIG. 49 is a diagram showing a control algorithm for a DSM controller of the cam phase controller of the control system according to the third embodiment.

DETAILED DESCRIPTION OF PREFERRED EMBODIMENTS

Figure 2:
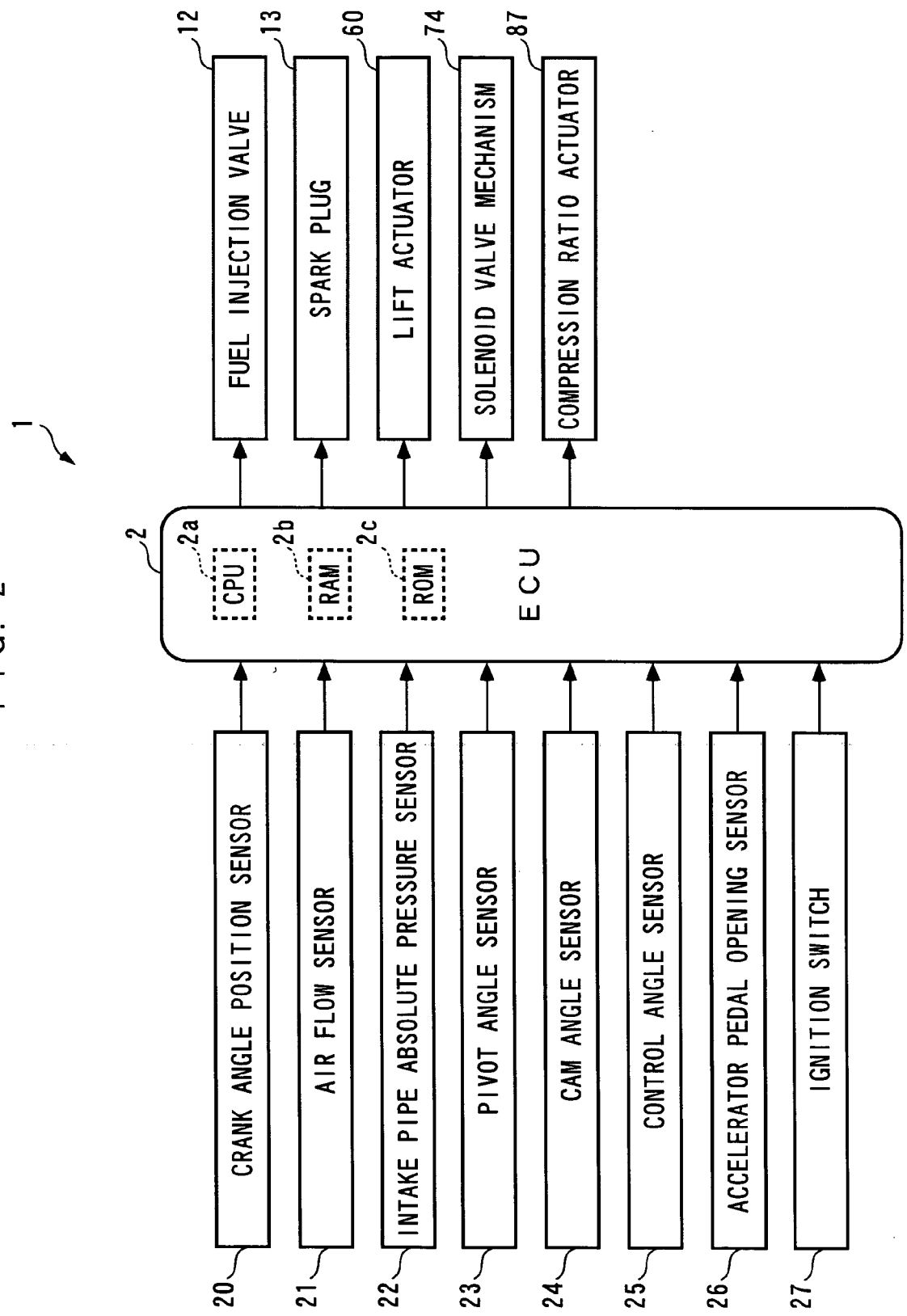
FIG. 2 is a block diagram schematically showing the arrangement of the control system.

Hereafter, a control system according to a first embodiment of the present invention will be described with reference to drawings. The control system 1 includes an ECU 2, as shown in FIG. 2. As described hereinafter, the ECU 2 carries out control processes, such as valve lift control, cam phase control, and compression ratio control, depending on operating conditions of an internal combustion engine (hereinafter simply referred to as "the engine") 3.

Figure 1:
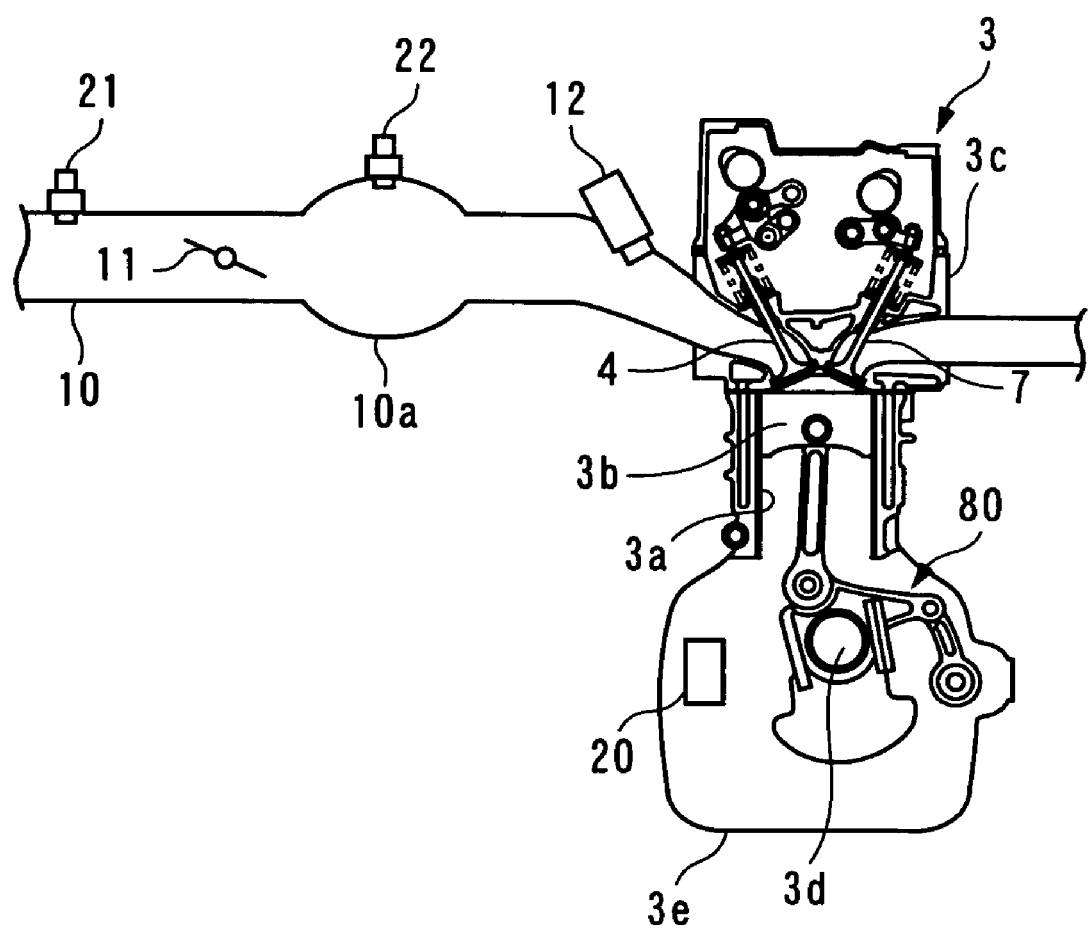
FIG. 1 is a diagram schematically showing the arrangement of an internal combustion engine to which is applied a control system according to a first embodiment of the present invention.
Figure 3:
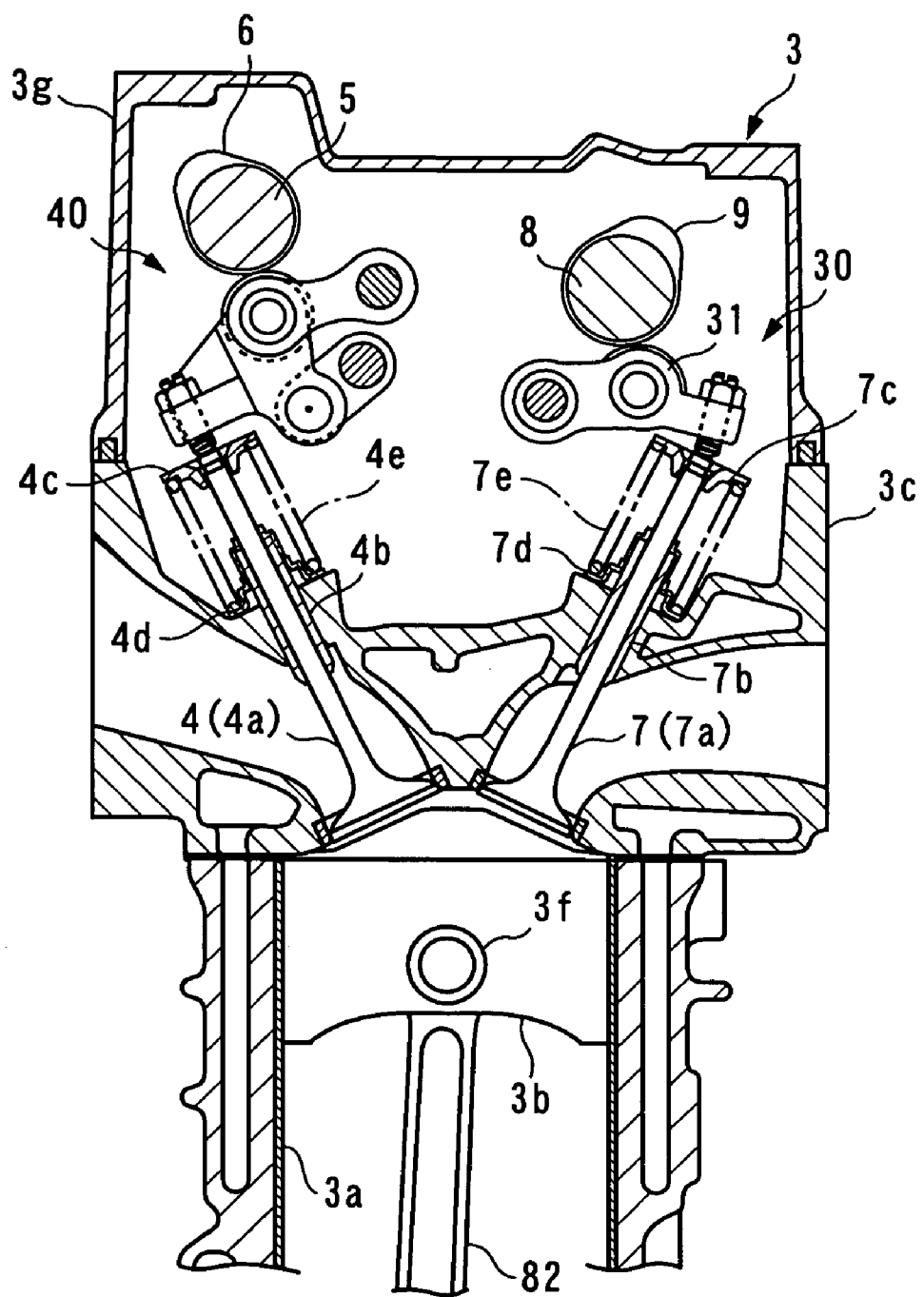
FIG. 3 is a cross-sectional view schematically showing the arrangement of a variable intake valve-actuating mechanism and an exhaust valve-actuating mechanism of the engine.

Referring to FIGS. 1 and 3, the engine 3 is an in-line four-cylinder gasoline engine having four pairs of cylinders 3a and pistons 3b (only one pair of which is shown), and installed on a vehicle, not shown. The engine 3 includes an intake valve 4 and an exhaust valve 7 provided for each cylinder 3a, for opening and closing an intake port and an exhaust port thereof, respectively, an intake camshaft 5 and intake cams 6 that actuate the intake valves 4, a variable intake valve-actuating mechanism 40 that actuates the intake valves 4 to open and close the same, an exhaust camshaft 8 and exhaust cams 9 that actuate the exhaust valves 7, an exhaust valve-actuating mechanism 30 that actuates the exhaust valves 7 to open and close the same, and a variable compression ratio mechanism 80 and so forth.

Figure 4:
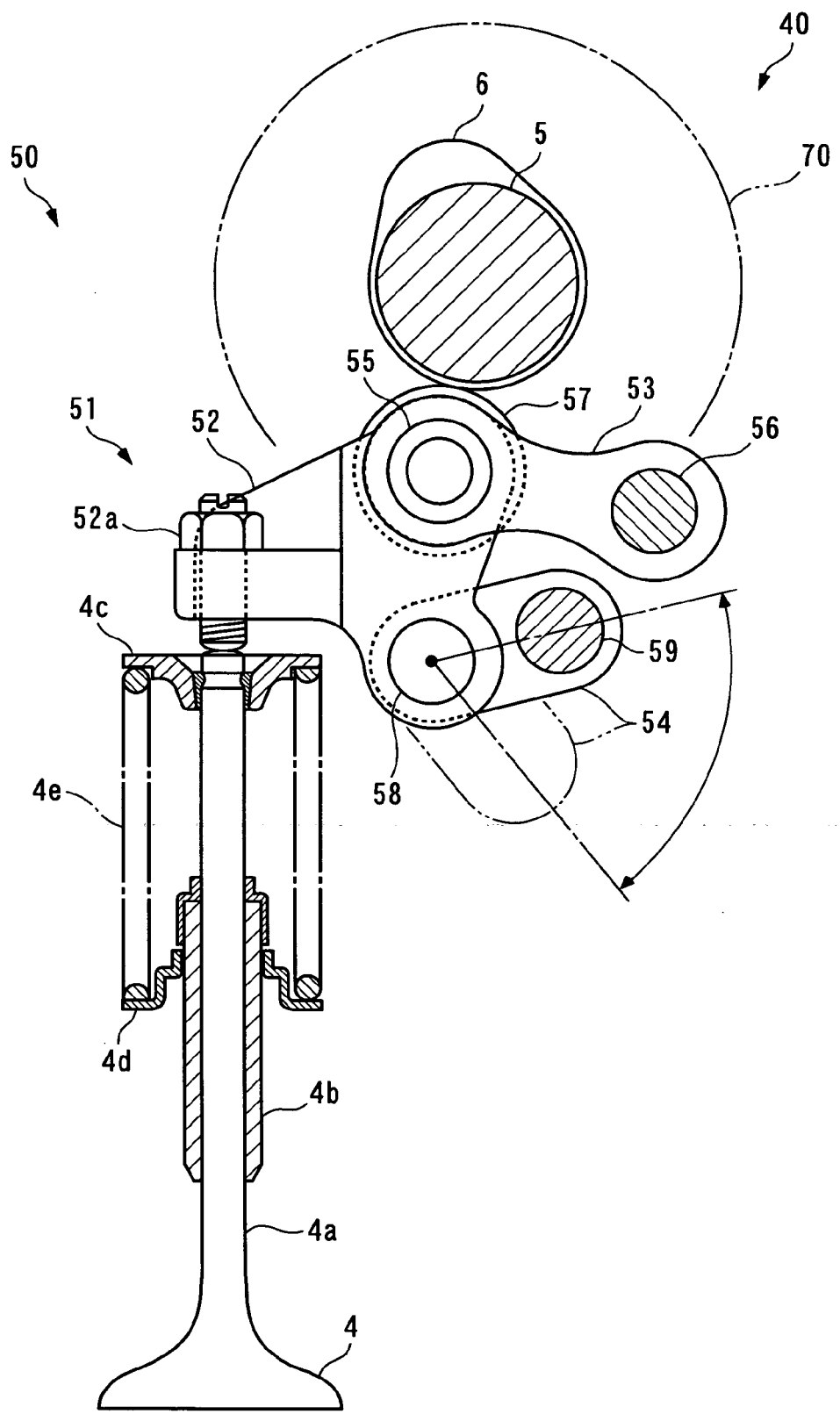
FIG. 4 is a cross-sectional view schematically showing the arrangement of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket (not shown) coaxially and rotatably fitted on one end thereof. The intake sprocket is connected to a crankshaft 3*d* via a timing belt, not shown, and connected to the intake camshaft 5 via a variable cam phase mechanism 70, described hereinafter. With the above configuration, the intake camshaft 5 performs one rotation per two rotations of the crankshaft 3*d*. Further, the intake cam 6 is provided on the intake camshaft 5 on each cylinder 3*a* such that the intake cam 6 rotates in unison with the intake camshaft 5.

Furthermore, the variable intake valve-actuating mechanism 40 is provided for actuating the intake valve 4 of each cylinder 3*a* so as to open and close the same, in accordance with rotation of the intake camshaft 5, and continuously changing the lift and the valve timing of the intake valve 4, which will be described in detail hereinafter. It should be noted that in the present embodiment, "the lift of the intake valve 4" (hereinafter referred to as "the valve lift") represents the maximum lift of the intake valve 4.

On the other hand, the exhaust valve 7 has a stem 7*a* thereof slidably fitted in a guide 7*b*. The guide 7*b* is rigidly fixed to the cylinder head 3*c*. Further, the exhaust valve 7 includes upper and lower spring sheets 7*c* and 7*d*, and a valve spring 7*e* disposed therebetween, and is urged by the valve spring 7*e* in the valve-closing direction.

Further, the exhaust camshaft 8 has an exhaust sprocket (not shown) integrally formed therewith, and is connected to the crankshaft 3*d* by the exhaust sprocket and a timing belt, not shown, whereby the exhaust camshaft 8 performs one rotation per two rotations of the crankshaft 3*d*. Further, the exhaust cam 9 is disposed on the exhaust camshaft 8 for each cylinder 3*a* such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7*e*.

The engine 3 is also provided with a crank angle position sensor 20. The crank angle position sensor 20 is comprised of a magnet rotor and an MRE (magnetic resistance element) pickup, and delivers a CRK signal and a TDC signal, which are both pulse signals, to the ECU 2 in accordance with rotation of the crankshaft 3d. Each pulse of the CRK signal is generated whenever the crankshaft 3*d* rotates through 10 degrees. The ECU 2 determines the rotational speed NE of the engine 3 (hereinafter referred to as "the engine speed NE") based on the CRK signal. Further, the TDC signal indicates that each piston 3*b* in the associated cylinder 3*a* is in a predetermined crank angle position slightly before the TDC position at the start of the intake stroke, and each pulse of the TDC signal is generated whenever the crankshaft 3*d* rotates through a predetermined crank angle.

Further, in an intake pipe 10 of the engine 3, there are arranged an air flow sensor 21, a throttle valve mechanism 11, an intake pipe absolute pressure sensor 22, a fuel injection valve 12, and so forth, from upstream to downstream in the mentioned order at respective locations of the intake pipe 10.

The air flow sensor 21 is formed by a hot-wire air flow meter, for detecting an amount GTH of intake air (hereinafter referred to as "the TH passing intake air amount GTH") flowing through the throttle valve 11, and delivers a signal indicative of the sensed TH passing intake air amount GTH to the ECU 2. Further, the throttle valve 11 is pivotally disposed across an intermediate portion of the intake pipe 10 such that the degree of opening thereof is changed by the pivotal motion thereof to thereby change the TH passing intake air amount GTH. Furthermore, the throttle valve 11 is held in a fully-open state during normal operation of the engine 3 by the ECU 2 via an actuator, not shown, and has the degree of opening thereof controlled by the ECU 2 via the actuator when the variable intake valve-actuating mechanism 40 is faulty, or when negative pressure is supplied to a master back (not shown).

A portion of the intake pipe 10 downstream of the throttle valve 11 forms a surge tank 10*a* into which is inserted an intake pipe absolute pressure sensor 22. The intake pipe absolute pressure sensor 22 is implemented e.g. by a semiconductor pressure sensor, and detects an absolute pressure PBA in the intake pipe 10 (hereinafter referred to as "the intake pipe absolute pressure PBA"), to deliver a signal indicative of the sensed intake pipe absolute pressure PBA to the ECU 2.

The fuel injection valve 12 is driven by a drive signal supplied from the ECU 2, and injects fuel into the intake pipe 10. Spark plugs 13 (see FIG. 2) are mounted through the cylinder head 3*c* of the engine 3. When a drive signal indicative of ignition timing is applied from the ECU 2, the spark plug 13 causes a spark discharge, thereby burning a mixture in a combustion chamber.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70.

The variable valve lift mechanism 50 (moving part-driving mechanism) is provided for actuating the intake valves 4 (moving part) to open and close the same, in accordance with rotation of the intake camshaft 5, and continuously changing the valve lift Liftin between a predetermined maximum value Liftinmax and a predetermined minimum value Liftinmin. The variable valve lift mechanism 50 is comprised of rocker arm mechanisms 51 of a four joint link type, provided for the respective cylinders 3*a*, and a lift actuator 60 (see FIGS. 5A and 5B) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3*c* via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52*a* is mounted to an end of the rocker arm 52 toward the intake valve 4. When the rocker arm 52 is vertically moved in accordance with rotation of the intake cam 6, the adjusting bolt 52*a* vertically drives the stem 4*a* to open and close the intake valve 4, against the urging force of the valve spring 4*e*.

Further, the lower link 54 has one end pivotally mounted to a lower end of the rocker arm 52 by a lower pin 58, and the other end of the lower link 54 has a connection pin 59 pivotally mounted thereto. The lower link 54 is connected to a short arm 65, described hereinafter, of the lift actuator 60 by the connection pin 59.

On the other hand, as shown in FIGS. 5A and 5B, the lift actuator 60 is comprised of a motor 61, a nut 62, a link 63, a long arm 64, and the short arm 65. The motor 61 is connected to the ECU 2, and disposed outside a head cover 3g of the engine 3. The rotational shaft of the motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection pin 59 pivotally extends through the other end of the short arm 65, whereby the short arm 65 is connected to the lower link 54 by the connection pin 59.

Next, a description will be given of operation of the variable valve lift mechanism 50 configured as above. In the variable valve lift mechanism 50, when a lift control input Uliftin, described hereinafter, is inputted from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

In the process, under the control of the ECU 2, the range of pivotal motion of the short arm 65 is restricted between a maximum lift position shown in FIG. 5A and a minimum lift position shown in FIG. 5B, whereby the range of pivotal motion of the lower link 54 is also restricted between a maximum lift position indicated by a solid line in FIG. 4 and a minimum lift position indicated by a two-dot chain line in FIG. 4.

The four joint link formed by the rocker arm shaft 56, the upper and lower pins 55 and 58, and the connection pin 59 is configured such that when the lower link 54 is in the maximum lift position, the distance between the center of the upper pin 55 and the center of the lower pin 58 becomes longer than the distance between the center of the rocker arm shaft 56 and the center of the connection pin 59, whereby as shown in FIG. 6A, when the intake cam 6 rotates, the amount of movement of the adjusting bolt 52a becomes larger than the amount of movement of a contact point where the intake cam 6 and the roller 57 are in contact with each other.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection pin 59, whereby as shown in FIG. 6B, when the intake cam 6 rotates, the amount of movement of the adjusting bolt 52a becomes smaller than the amount of movement of the contact point where the intake cam 6 and the roller 57 are in contact with each other.

Figure 7:
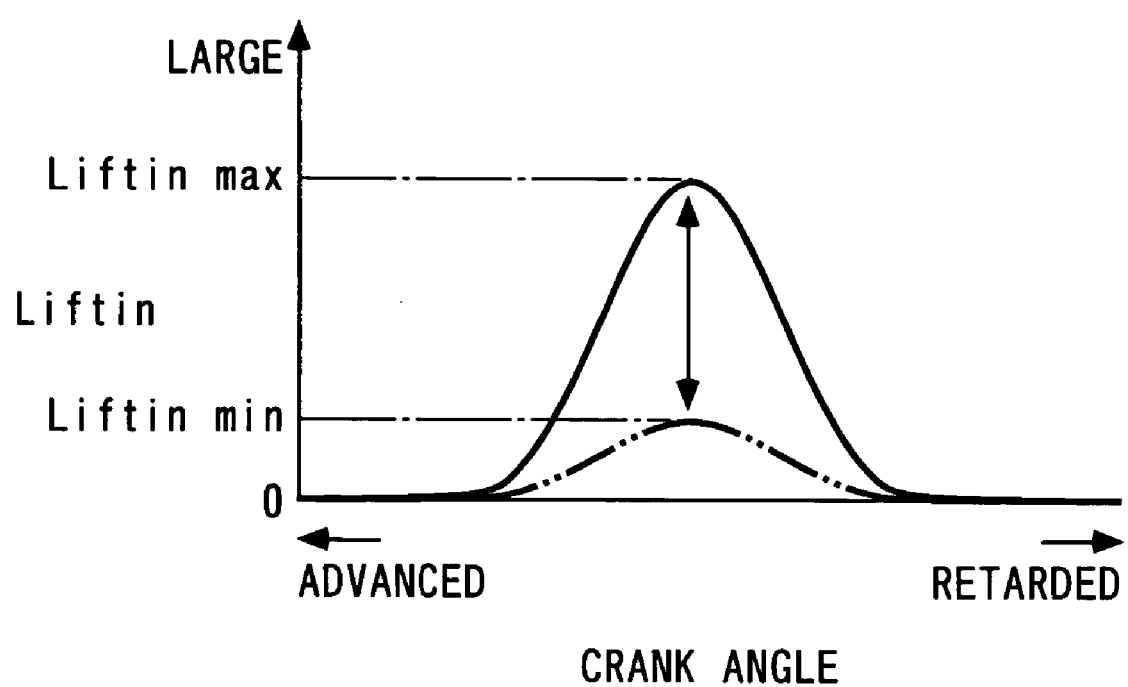
FIG. 7 is a diagram showing a valve lift curve (solid line) which the valve lift of the intake valve assumes when the lower link of the variable valve lift mechanism is in the maximum lift position, and a valve lift curve (two-dot chain line) which the valve lift of the intake valve assumes when the lower link of the variable valve lift mechanism is in the minimum lift position.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftinmax. On the other hand, when the lower link 54 is in the minimum lift position, the intake valve 4 is opened according to a valve lift curve indicated by a two-dot chain line in FIG. 7, and the valve lift Liftin assumes its minimum value Liftinmin.

Therefore, in the variable valve lift mechanism 50, the lower link 54 is pivotally moved by the lift actuator 60 between the maximum lift position and the minimum lift position, whereby it is possible to continuously change the valve lift Liftin between the maximum value Liftinmax and the minimum value Liftinmin.

The engine 3 is provided with a pivot angle sensor 23 (see FIG. 2). The pivot angle sensor 23 detects a pivot angle of the pivot shaft 66, i.e. the short arm 65, and delivers a signal indicative of the sensed pivot angle to the ECU 2. The ECU 2 calculates the valve lift Liftin based on the signal output from pivot angle sensor 23.

Figure 8:
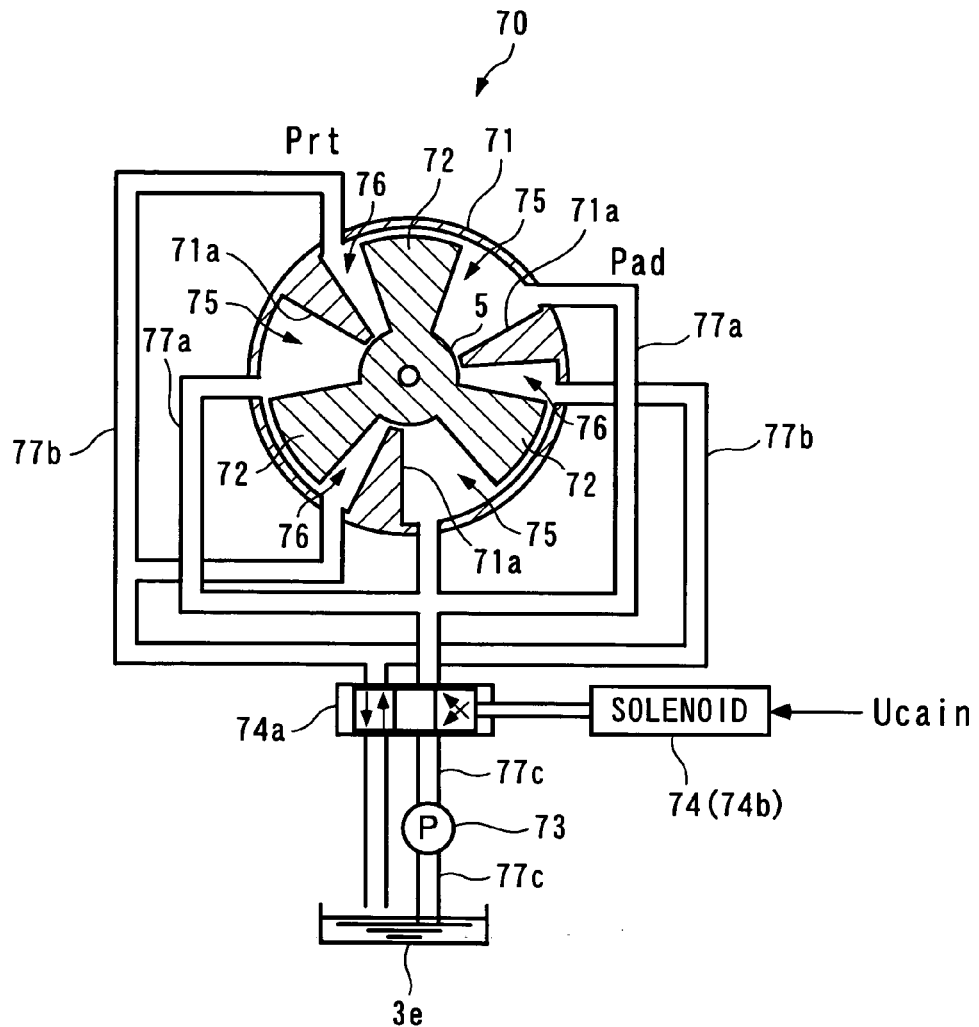
FIG. 8 is a diagram schematically showing the arrangement of a variable cam phase mechanism.

Next, a description will be given of the aforementioned variable cam phase mechanism 70 (moving part-driving mechanism). The variable cam phase mechanism 70 is provided for continuously advancing or retarding the relative phase Cain of the intake camshaft 5 as a moving part with respect to the crankshaft 3d (hereinafter referred to as "the cam phase Cain"), and mounted on an intake sprocket-side end of the intake camshaft 5. As shown in FIG. 8, the variable cam phase mechanism 70 includes a housing 71, a three-bladed vane 72, an oil pressure pump 73, and a solenoid valve mechanism 74.

The housing 71 is integrally formed with the intake sprocket on the intake camshaft 5d, and divided by three partition walls 71a formed at equal intervals. The vane 72 is coaxially mounted on the intake sprocket-side end of the intake camshaft 5, such that the vane 72 radially extends outward from the intake camshaft 5, and rotatably housed in the housing 71. Further, the housing 71 has three advance chambers 75 and three retard chambers 76 each formed between one of the partition walls 71a and one of the three blades of the vane 72.

The oil pressure pump 73 is a mechanical one connected to the crankshaft 3d. As the crankshaft 3d rotates, the oil pressure pump 73 draws lubricating oil stored in an oil pan 3e of the engine 3 via a lower part of an oil passage 77c, for pressurization, and supplies the pressurized oil to the solenoid valve mechanism 74 via the remaining part of the oil passage 77c.

The solenoid valve mechanism 74 is formed by combining a spool valve mechanism 74a and a solenoid 74b, and connected to the advance chambers 75 and the retard chambers 76 via an advance oil passage 77a and a retard oil passage 77b such that oil pressure supplied from the oil pressure pump 73 is outputted to the advance chambers 75 and the retard chambers 76 as advance oil pressure Pad and retard oil pressure Prt. The solenoid 74b of the solenoid valve mechanism 74 is electrically connected to the ECU 2. When a phase control input Ucain, referred to hereinafter, is inputted from the ECU 2, the solenoid 74b moves a spool valve element of the spool valve mechanism 74a within a predetermined range of motion according to the phase control input Ucain to thereby change both the advance oil pressure Pad and the retard oil pressure Prt.

Figure 9:
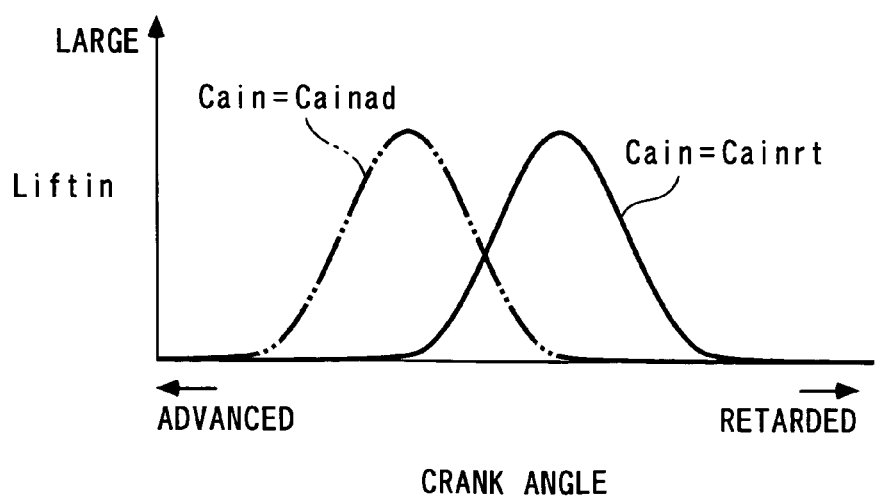
FIG. 9 is a diagram showing a valve lift curve (solid line) which the valve lift of the intake valve assumes when a cam phase is set to a most retarded value by the variable cam phase mechanism, and a valve lift curve (two-dot chain line) which the valve lift of the intake valve assumes when the cam phase is set to a most advanced value by the variable cam phase mechanism.

In the variable cam phase mechanism 70 constructed as above, during operation of the oil pressure pump 73, the solenoid valve mechanism 74 is operated according to the phase control input Ucain, to supply the advance oil pressure Pad to the advance chambers 75 and the retard oil pressure Prt to the retard chambers 76, whereby the relative phase between the vane 72 and the housing 71 is changed toward an advanced side or a retarded side. As a result, the cam phase Cain described above is continuously changed between a most retarded value Cainrt (e.g. a value corresponding to a cam angle of 0 degrees) and a most advanced value Cainad (e.g. a value corresponding to a cam angle of 55 degrees), whereby valve timing of the intake valve 4 is continuously changed between a most retarded timing indicated by a solid line in FIG. 9 and a most advanced timing indicated by a two-dot chain line in FIG. 9.

It should be noted that the variable cam phase mechanism 70 includes a lock mechanism, not shown, which locks operation of the variable cam phase mechanism 70 when oil pressure supplied from the oil pressure pump 73 is low. More specifically, the variable cam phase mechanism 70 is inhibited from changing the cam phase Cain, whereby the cam phase Cain is locked to a value suitable for idling or starting of the engine 3.

As described above, in the variable intake valve-actuating mechanism 40 according to the present embodiment, the valve lift Liftin is continuously changed by the variable valve lift mechanism 50, and the cam phase Cain, i.e. the valve timing of the intake valve 4 is continuously changed between the most retarded timing and the most advanced timing. Further, as described hereinafter, the valve lift Liftin and the cam phase Cain are controlled by the ECU 2 via the variable valve lift mechanism 50 and the variable cam phase mechanism 70, respectively.

On the other hand, a cam angle sensor 24 (see FIG. 2) is disposed at an end of the intake camshaft 5 opposite from the variable cam phase mechanism 70. The cam angle sensor 24 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. one degree). The ECU 2 calculates the cam phase Cain based on the CAM signal and the CRK signal described above.

Next the aforementioned variable compression ratio mechanism 80 (moving part-driving mechanism) will be described with reference to FIGS. 10A and 10B. The variable compression ratio mechanism 80 is provided for changing a top dead center position of each piston 3b as a moving part, that is, the stroke of the piston 3b, to thereby continuously change a compression ratio Cr between a predetermined maximum value Crmax and a predetermined minimum value Crmin, and comprised of a composite link mechanism 81 connected between the piston 3b and the crankshaft 3d, a control shaft 85 for controlling the motion of the composite link mechanism 81, a compression ratio actuator 87 for driving the control shaft 85, and so forth.

The composite link mechanism 81 is implemented by an upper link 82, a lower link 83, and a control link 84. The upper link 82 corresponds to a so-called connecting rod, and has an upper end thereof pivotally connected to the piston 3b via a piston pin 3f, and a lower end thereof pivotally connected to an end of the lower link 83 via a pin 83a.

The lower link 83 has a triangular shape. Two ends of the lower link 83 except for the end connected to the upper link 82 are pivotally connected to the crankshaft 3d via a crank pin 83b, and to an end of the control link 84 via a control pin 83c, respectively. With the above configuration, reciprocating motion of the piston 3b is transmitted to the crankshaft 3d via the composite link mechanism 81 such that it is converted into rotating motion of the crankshaft 3d.

Figure 10A:
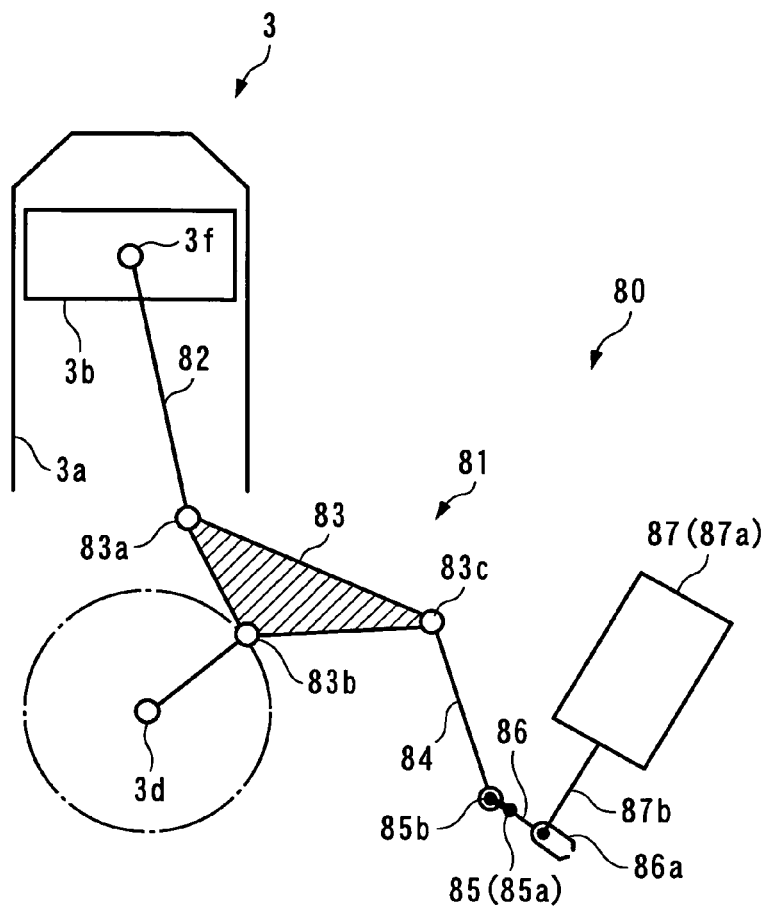
FIG. 10A is a diagram schematically showing the whole arrangement of a variable compression ratio mechanism in a state where a compression ratio is set to a low compression ratio.
Figure 10B:
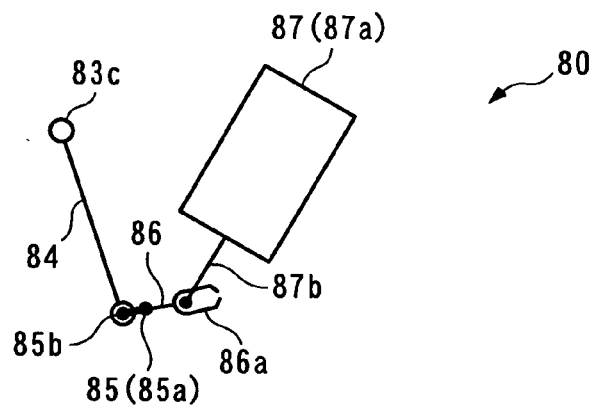
FIG. 10B is a diagram schematically showing the arrangement of a control shaft and a compression ratio actuator and their vicinity of the variable compression ratio mechanism in a state where the compression ratio is set to a high compression ratio.

Further, the control shaft 85 extends in the direction of depth (direction perpendicular to the sheet), as viewed in FIGS. 10A and 10B, similarly to the crankshaft 3d, and includes a pivot shaft part 85a pivotally supported by a cylinder block, an eccentric shaft part 85b integrally formed with the pivot shaft part 85a, and arm 86. A lower end of the control link 84 is pivotally connected to the eccentric shaft part 85b. Further, a distal end of the arm 86 is formed as a fork part 86a to which is pivotally connected an end of a drive shaft 87b of the compression ratio actuator 87.

The compression ratio actuator 87 is formed by combining a motor and a reduction mechanism (neither of which is shown), and includes a casing 87a for containing the motor and the reduction mechanism, and a drive shaft 87b movable into and out of the casing 87a. In the compression ratio actuator 87, when the motor is driven for normal or reverse rotation by a compression ratio control input Ucr, referred to hereinafter, from the ECU 2, the drive shaft 87b is moved between a low compression ratio position (position shown in FIG. 10A) where the drive shaft 87b is most protruded from the casing 87a, and a high compression ratio position (position shown in FIG. 10B) where the drive shaft 87b is most retracted toward the casing 87a.

With the above configuration, in the variable compression ratio mechanism 80, when the drive shaft 87b of the compression ratio actuator 87 is moved from the low compression ratio position to the high compression ratio position, the control shaft 85 is driven via the arm 86 such that it is pivotally moved counterclockwise as viewed in FIG. 10A about the pivot shaft part 85a, and the eccentric shaft part 85b is moved downward along with the pivotal motion of the control shaft 85. As the whole control link 84 is pressed downward by the downward movement of the eccentric shaft part 85b, the lower link 83 is pivotally moved clockwise as viewed in FIG. 10A about the crank pin 83b, while the upper link 82 is pivotally moved counterclockwise as viewed in FIG. 10A about the piston pin 3f. As a result, the shape formed by the piston pin 3f, the upper pin 83a, and the crank pin 83b are made closer to the shape of a straight line than when they are located at the low compression ratio position, whereby the straight-line distance between the piston 3f and the crank pin 83b, obtained when the piston 3b has reached the top dead center position is increased (which means that the stroke of the piston 3b is increased), to decrease the volume of the combustion chamber, whereby the compression ratio Cr is increased.

On the other hand, inversely to the above, when the drive shaft 87b of the compression ratio actuator 87 is moved from the high compression ratio position to the low compression ratio position, the pivot shaft part 85a is pivotally moved clockwise as viewed in FIG. 10A, and the eccentric shaft part 85b is moved upward along with the pivotal motion of the pivot shaft part 85a, whereby the whole control link 84 is pushed upward. Thus, quite inversely to the above operations, the lower link 83 is pivotally moved counterclockwise, whereas the upper link 82 is pivotally moved clockwise, as viewed in FIG. 10A. As a result, the straight-line distance between the piston 3f and the crank pin 83b, obtained when the piston 3b has reached the top dead center position is decreased (which means that the stroke of the piston 3b is shortened), to increase the volume of the combustion chamber, whereby the compression ratio Cr is reduced. As described above, in the variable compression ratio mechanism 80, by changing the pivot angle of the control shaft 85, the compression ratio Cr is changed between the predetermined maximum value Crmax and the predetermined minimum value Crmin.

Further, the engine is provided with a control angle sensor 25 in the vicinity of the control shaft 85 (see FIG. 2). The control angle sensor 25 detects a pivot angle of the control shaft 85, and delivers a signal indicative of the sensed control angle to the ECU 2. The ECU 2 calculates the compression ratio Cr based on the signal output from the control angle sensor 25.

Furthermore, as shown in FIG. 2, connected to the ECU 2 are an accelerator pedal opening sensor 26, and an ignition switch (hereinafter referred to as "the IG·SW") 27. The accelerator pedal opening sensor 26 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2. Further, the IG·SW 27 is turned on or off by operation of an ignition key, not shown, and delivers a signal indicative of the ON/OFF state thereof to the ECU 2.

The ECU 2 is implemented by a microcomputer including a CPU 2*a*, a RAM 2*b*, a ROM 2*c* (disturbance compensation value-storing means), and an I/O interface, not shown. The ECU 2 determines operating conditions of the engine 3, based on the detection signals delivered from the above-mentioned sensors 20 to 26, the ON/OFF signal from the IG·SW 27, and the like, and executes control processes. More specifically, as will be described in detail hereinafter, the ECU 2 controls the cam phase Cain and the valve lift Liftin via the variable cam phase mechanism 70 and the variable valve lift mechanism 50, respectively, and controls the compression ratio Cr via the variable compression ratio mechanism 80. Further, the ECU 2 controls the ignition timing of the spark plug 13 according to the operating conditions of the engine 3.

It should be noted that in the present embodiment, the ECU 2 implements disturbance estimation value-calculating means, model parameter-identifying means, amplitude correction value-calculating means, target value-setting means, disturbance compensation value-storing means, disturbance compensation value-selecting means, control input-calculating means, target cam phase-setting means, target valve lift-setting means, and target compression ratio-setting means. Further, in the present embodiment, the cam phase Cain corresponds to operation timing of the moving part, a cam phase parameter, and a load parameter, and the valve lift Liftin corresponds to the amount of operation of the moving part, and a valve lift parameter, and a load parameter.

Figure 11:
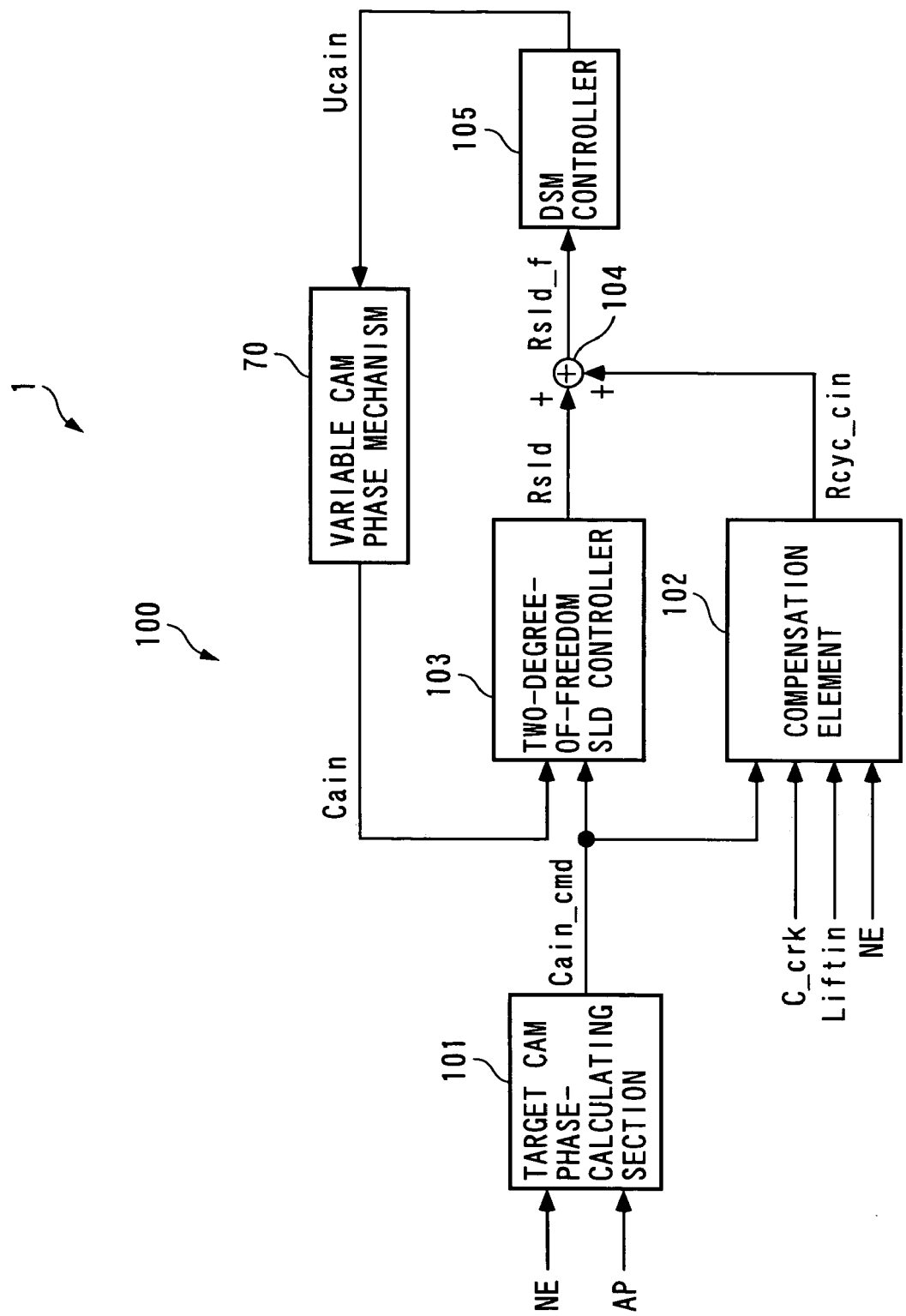
FIG. 11 is a block diagram schematically showing the arrangement of a cam phase controller.

Next, a description will be given of the control system 1 according to the present embodiment. The control system 1 includes a cam phase controller 100 (see FIG. 11), a valve lift controller 110 (see FIG. 22), and a compression ratio controller 120 (see FIG. 25), all of which are implemented by the ECU 2. First, a description will be given of the cam phase controller 100. Referring to FIG. 11, the cam phase controller 100 is comprised of a target cam phase-calculating section 101, a compensation element 102, a two-degree-of-freedom sliding mode controller 103 (hereinafter referred to as "the two-degree-of-freedom SLD controller 103"), an addition element 104, and a DSM controller 105.

In the cam phase controller 100, as described hereinafter, the phase control input Ucain is calculated, and is inputted to the variable cam phase mechanism 70, whereby the cam phase Cain is controlled to a target cam phase Cain_cmd.

First, the target cam phase-calculating section 101 (target value-setting means, target cam phase-setting means) calculates the target cam phase Cain_cmd (target value, cam phase parameter) by searching a map (see FIG. 33), described hereinafter, according to the engine speed NE and the accelerator pedal opening AP.

Further, the compensation element 102 (disturbance compensation value-storing means, disturbance compensation value-selecting means) calculates, as described hereinafter, a disturbance compensation value Rcyc_cin for the cam phase control based on the target cam phase Cain_cmd calculated by the target cam phase-calculating section 101, and other parameters.

Further, the two-degree-of-freedom SLD controller 103 (control input-calculating means) calculates an SLD control input Rsld for the cam phase control with a control algorithm, referred to hereinafter, according to the target cam phase Cain_cmd and the cam phase Cain.

On the other hand, the addition element 104 (control input-calculating means) calculates a reference input Rsld_f (control input) for the cam phase control as the sum of the disturbance compensation value Rcyc_cin for the cam phase control, calculated by the compensation element 102, and the SLD control input Rsld for the cam phase control, calculated by the two-degree-of-freedom SLD controller 103. Further, the DSM controller 105 (control input-calculating means) calculates the phase control input Ucain with a control algorithm, referred to hereinafter, according to the reference input Rsld_f for the cam phase control.

Next, a description will be given of the compensation element 102. As will be described in detail hereinafter, the compensation element 102 calculates the disturbance compensation value Rcyc_cin for the cam phase control according to the target cam phase Cain_cmd, a count C_crk of a crank angle counter, the valve lift Liftin, and the engine speed NE. It should be noted that the crank angle counter is an up counter for counting the crank angle, and as described hereinafter, the count C_crk is incremented by a value of 10 in synchronism with generation of each pulse of the CRK signal, and reset to a value of 0 when it has reached a value of 720.

The disturbance compensation value Rcyc_cin for the cam phase control is provided for compensating for a periodic disturbance which is expected to occur periodically in accordance with rotation of the intake camshaft 5, i.e. rotation of the intake cam 6 during operation of the engine 3. In the following, a description will be given of the periodic disturbance, -and a method of calculating the disturbance compensation value Rcyc_cin for compensating for the periodic disturbance. First, for ease of understanding, the periodic disturbance and the method of calculating the disturbance compensation value Rcyc_cin are described with reference to FIG. 12A to FIG. 17 by taking a case in which the periodic disturbance occurs in one cylinder 3*a* (in other words, a case in which the periodic disturbance occurs in a single-cylinder engine) as an example. Referring to FIG. 12A, in a state where the intake cam 6 rotates in a direction indicated by an arrow "Y1" to actuate the intake valve 4 in the valve-opening direction, the intake cam 6 is subjected to a disturbance acting as a rotation moment in a direction indicated by an arrow "Y2" due to the reaction force of the valve spring 4*e* of the intake valve 4.

On the other hand, as shown in FIG. 12B, in a state where the intake cam 6 actuates the intake valve 4 in the valve-closing direction, the intake cam 6 is subjected to a disturbance acting as a rotation moment in a direction indicated by an arrow "Y3" due to the urging force of the valve spring 4*e* of the intake valve 4. The disturbances described above periodically occur along with rotation of the intake camshaft 5, and an amplitude of the disturbances also periodically changes. Therefore hereinafter, the disturbances are referred to as "the periodic disturbance".

Figure 13:
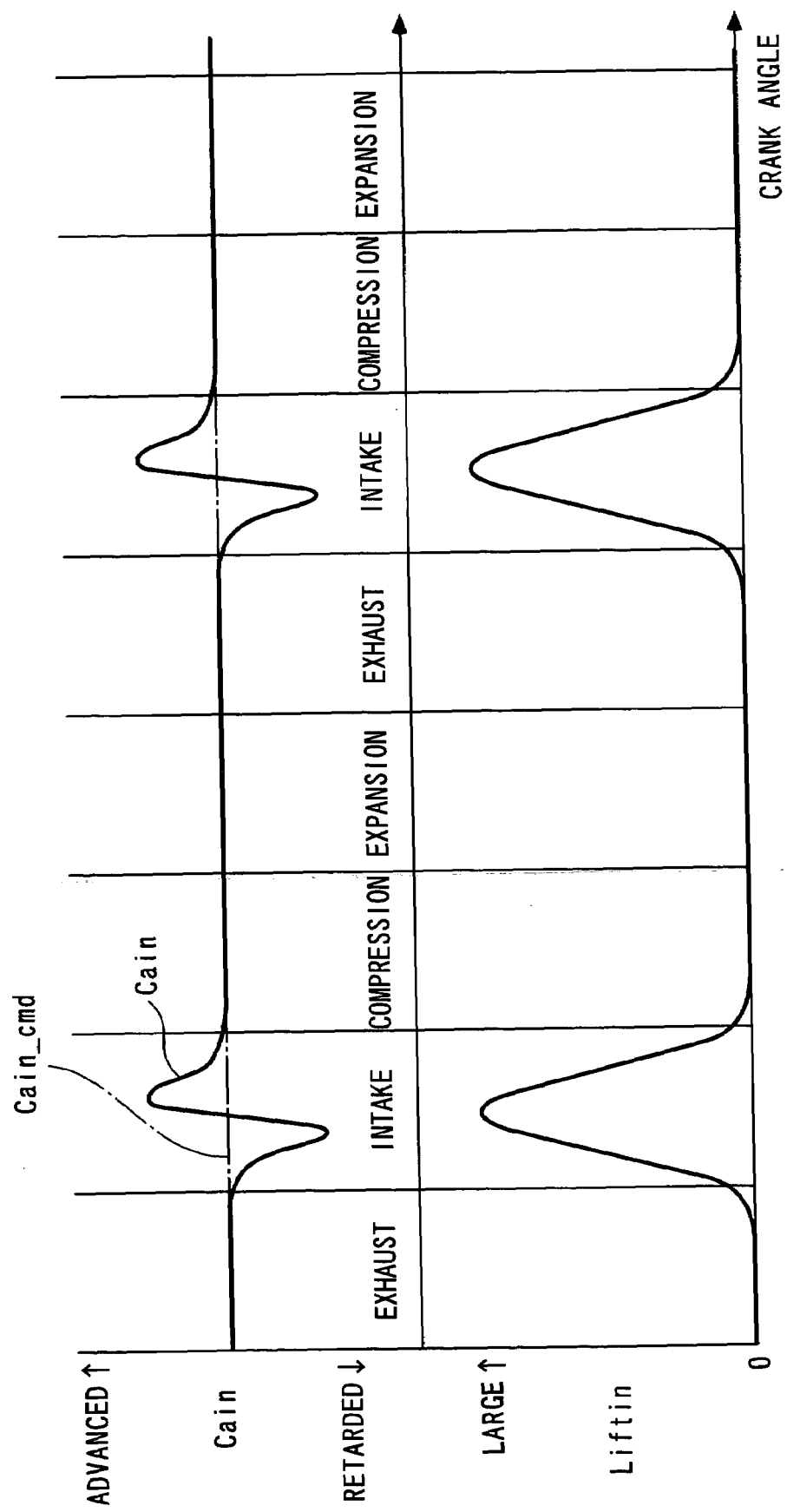
FIG. 13 is a timing diagram showing the influence of the periodic disturbance on cam phase control.

Now, assuming that the intake cam 6 is subjected to the periodic disturbance described above during feedback control performed so as to cause the cam phase Cain to converge to the target cam phase Cain_cmd, although the target cam phase Cain_cmd is held constant, the cam phase Cain deviates toward the retarded side during a time period over which the intake valve 4 is actuated in the valve-opening direction by the intake cam 6, and deviates toward the advanced side during a time period over which the intake valve 4 is actuated in the valve-closing direction, as shown in FIG. 13.

Figure 14:
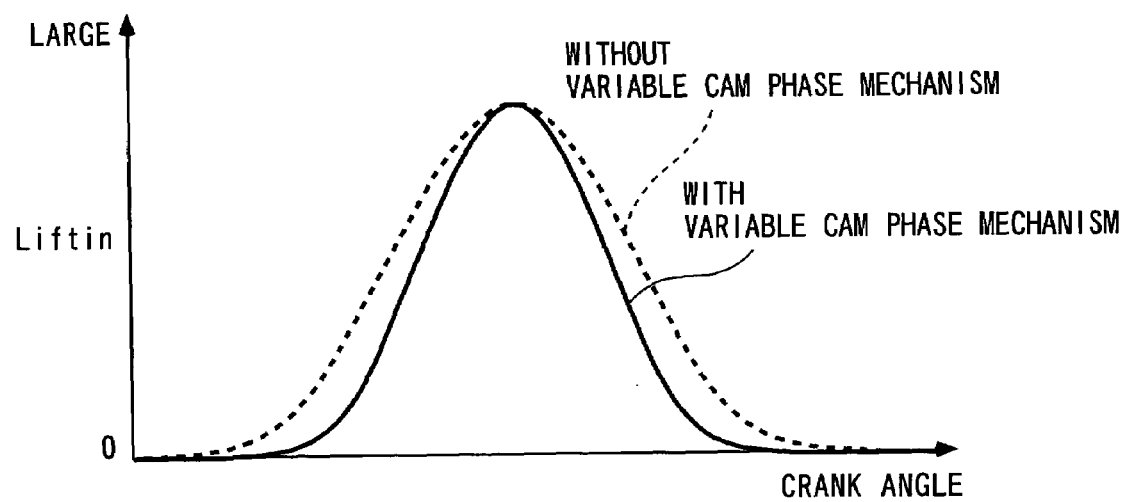
FIG. 14 is a diagram showing valve lift curves which the valve lift of the intake valve assumes when the valve lift is high, which is useful in comparing a case where a variable cam phase mechanism is provided and a case where the variable cam phase mechanism is not provided.
Figure 15:
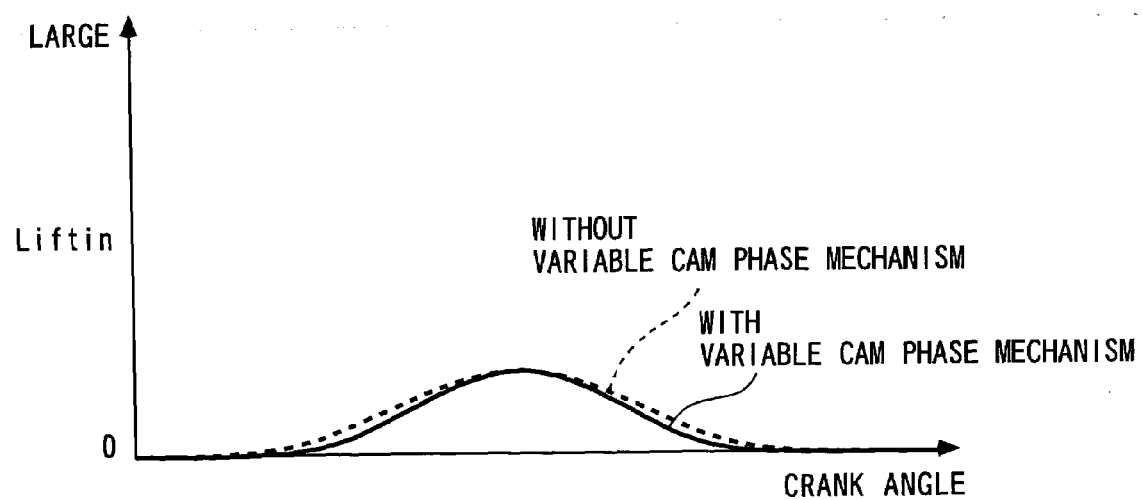
FIG. 15 is a diagram showing valve lift curves which the valve lift of the intake valve assumes when the valve lift is low, which is useful in comparing the case where the variable cam phase mechanism is provided and the case where the variable cam phase mechanism is not provided.

When the above deviations of the cam phase Cain occur, the valve timing of the intake valve 4 is varied compared with the case where the variable cam phase mechanism 70 is not provided. More specifically, as shown in FIGS. 14 and 15, the valve lift curves of the intake valve 4 exhibited when the engine 3 is provided with the variable cam phase mechanism 70 (curves indicated by solid lines in FIGS. 14 and 15) show that the valve-opening time period of the intake valve 4 is shorter than when the engine 3 is not provided with the variable cam phase mechanism 70 (curves indicated by broken lines in the figures), so that the amount of intake air is changed to change torque generated by the engine 3, which can make the combustion state of the engine 3 unstable.

To avoid the above inconveniences, it is contemplated, for example, that the cam profile of the intake cam 6 is modified in advance. However, as is clear from comparison of the valve lift curves in FIGS. 14 and 15, when the engine 3 includes the variable valve lift mechanism 50, the degree of change in the valve timing of the intake valve 4, caused when the valve lift Liftin is controlled to a predetermined value on a high lift side (which is indicated by the valve lift curve in FIG. 14), and the degree of change in the valve timing of the intake valve 4, caused when the valve lift Liftin is controlled to a predetermined value on a low lift side (which is indicated by the valve lift curve in FIG. 15) are different from each other. Therefore, as in the present embodiment, when the engine 3 includes both of the variable cam phase mechanism 70 and the variable valve lift mechanism 50, it is difficult to avoid the influence of the periodic disturbance by changing the cam profile of the intake cam 6.

In the present embodiment, to avoid the above influence of the periodic disturbance on the variable cam phase mechanism 70, the value of the periodic disturbance applied to the variable cam phase mechanism 70 is predicted, and a value corresponding to a value obtained by inverting the sign of the predicted value is calculated as the disturbance compensation value Rcyc_cin for the cam phase control. More specifically, the disturbance compensation value Rcyc_cin for the cam phase control is calculated by searching a disturbance compensation value map according to the valve lift Liftin, the count C_crk of the crank angle counter, and the target cam phase Cain_cmd, to thereby determine a map value Rcyc_bs_cin, and then correcting the map value Rcyc_bs_cin according to the engine speed NE.

Figure 16:
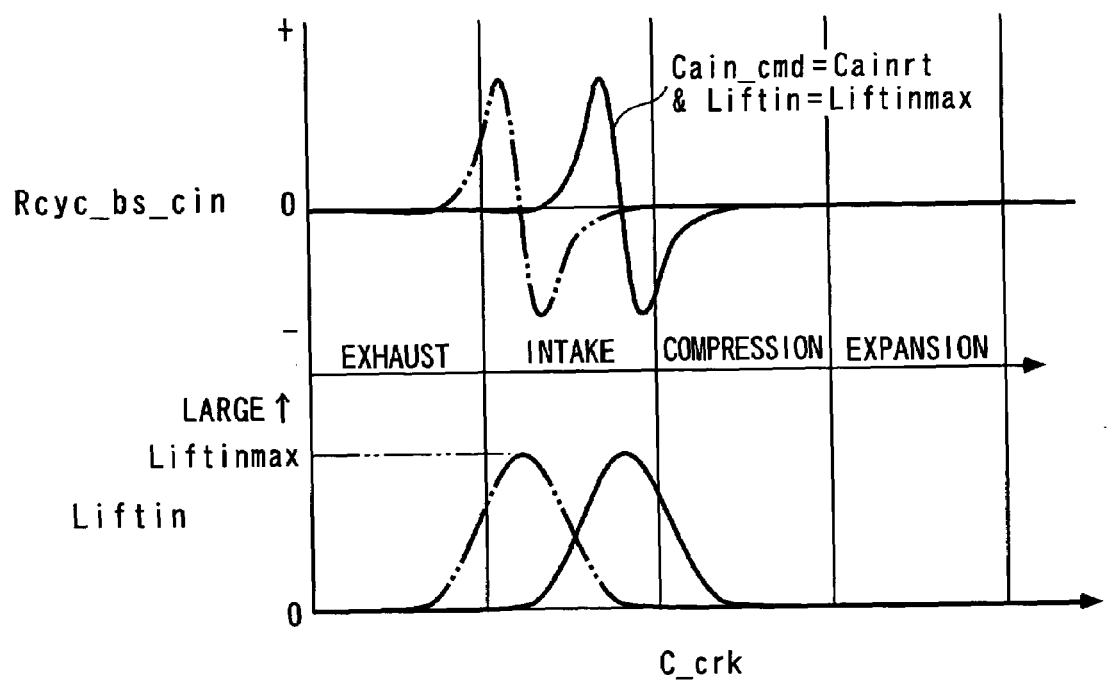
FIG. 16 is a diagram showing an example of a map value of a disturbance compensation value map for use in cam phase control for one cylinder, the map value set for a maximum value of the valve lift.
Figure 17:
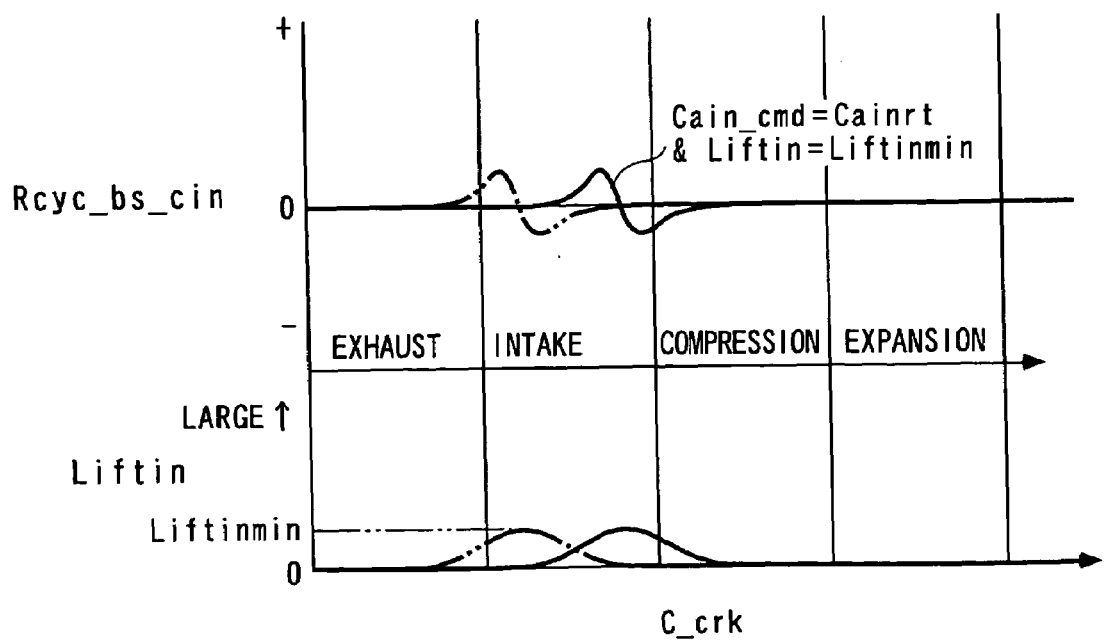
FIG. 17 is a diagram showing an example of a map value of the disturbance compensation value map for use in the cam phase control for the one cylinder, the map value set for a minimum value of the valve lift.

As the disturbance compensation value map is used a map which contains a map value Rcyc_bs_cin for use in Cain_cmd=Cainrt&Liftin=Liftinmax, indicated by a solid line in FIG. 16, a map value Rcyc_bs_cin for use in Cain_cmd=Cainrt&Liftin=Liftinmin, indicated by a solid line in FIG. 17, and a plurality of map values Rcyc_bs_cin (not shown) for use in interpolation in a case where Cain_cmd=Cainrt holds and the valve lift Liftin is between the maximum value Liftinmax and the minimum value Liftinmin, and set in a manner corresponding to values of Liftin at a plurality of stages, respectively.

In searching the above disturbance compensation value map, when the target cam phase Cain_cmd is a value advanced with respect to the most retarded value Cainrt, the repetition period of occurrence of the periodic disturbance deviates toward the advanced side (left-hand side as viewed in FIGS. 16 and 17), so that it is necessary to correct the disturbance compensation value accordingly e.g. to values indicated by two-dot chain lines in FIGS. 16 and 17. Therefore, when the disturbance compensation value map is searched according to the present embodiment, the count C_crk of the crank angle counter is corrected by taking the degree of advance of the target cam phase Cain_cmd with respect to the most retarded value Cainrt into account. Then, two map values Rcyc_bs_cin closer to the present valve lift Liftin are selected from the above described map values Rcyc_bs_cin according to the count C_crk corrected as above and the valve lift Liftin, and the map value Rcyc_bs_cin of the disturbance compensation value for the cam phase control is calculated by interpolation of the two selected values. Furthermore, the map value Rcyc_bs_cin calculated as above is corrected according to the engine speed NE, as will be described in detail hereinafter, to thereby determine the disturbance compensation value Rcyc_cin for the cam phase control.

It can be contemplated to calculate the disturbance compensation value Rcyc_cin for the cam phase control, for compensating for the periodic disturbance generated in the one cylinder 3a, as described above. However, the engine 3 of the present embodiment is a four-cylinder engine, and hence the periodic disturbance occurs four times in total in each of the four cylinders 3a in one control cycle. Moreover, the periodic disturbances occur in an overlapping manner due to the phase difference therebetween. Therefore, in the present embodiment, to compensate for such periodic disturbances, in place of the above disturbance compensation value map, a disturbance compensation value map is used which contains a map value Rcyc_bs_cin for use in Cain_cmd=Cainrt&Liftin=Liftinmax shown in FIG. 18, a map value Rcyc_bs_cin for use in Cain_cmd=Cainrt&Liftin=Liftinmin shown in FIG. 19, and a plurality of map values Rcyc_bs_cin (not shown) for use in interpolation in a case where Cain_cmd=Cainrt holds, and at the same time the valve lift Liftin is between the maximum value Liftinmax and the minimum value Liftinmin, and set in a manner corresponding to values of Liftin at a plurality of stages, respectively.

Figure 18:
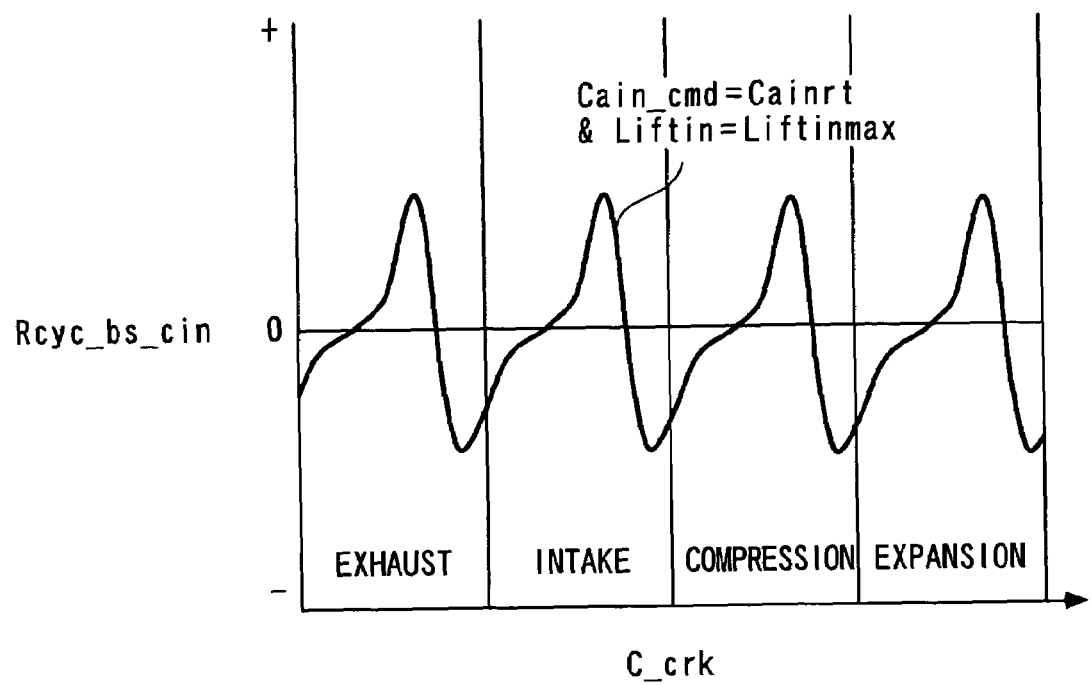
FIG. 18 is a diagram showing an example of a map value of the disturbance compensation value map for use in the cam phase control, which is calculated by a compensation element of the control system according to a first embodiment in association with the maximum value of the valve lift.
Figure 19:
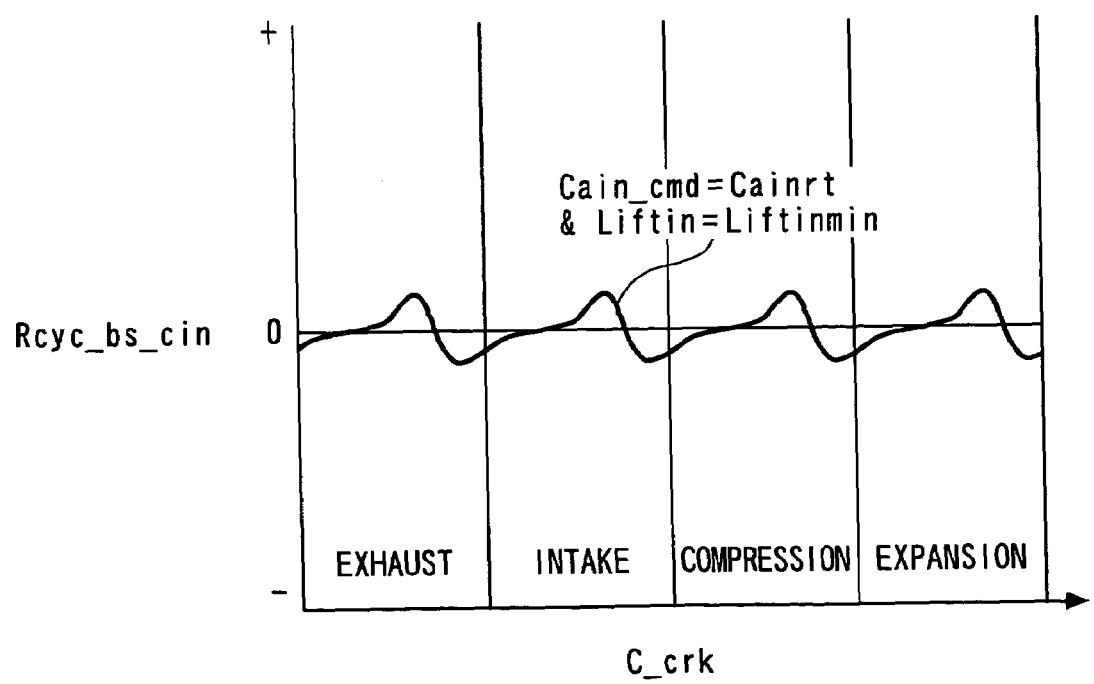
FIG. 19 is a diagram showing an example of a map value of the disturbance compensation value map for use in the cam phase control, which is calculated by the compensation element of the control system according to the first embodiment in association with the minimum value of the valve lift.

As is clear from FIGS. 18 and 19, in this disturbance compensation value map, the map value Rcyc_bs_cin of the disturbance compensation value for the cam phase control is set as a value corresponding to the count C_crk of the crank angle counter, according to the results of prediction of the periodic disturbance. That is, the map value Rcyc_bs_cin is set in time series order according to the results of prediction of the periodic disturbance. Further, the repetition period of calculation of the map value Rcyc_bs_cin is set to a time period over which the crankshaft 3d rotates through 180 degrees. This is because for the aforementioned reason, the repetition period of occurrence of the periodic disturbance applied to the variable cam phase mechanism 70 corresponds to the time period over which the crankshaft 3d rotates through 180 degrees. It should be noted that the above disturbance compensation value map is stored in the ROM 2c in advance.

Further, the disturbance compensation value map is searched by the same method, as described above. More specifically, the count C_crk of the crank angle counter is corrected by taking the degree of advance of the target cam phase Cain_cmd with respect to the most retarded value Cainrt into account. Then, two map values Rcyc_bs_cin closer to the present valve lift Liftin are selected from the above map values Rcyc_bs_cin according to the corrected count C_crk of the crank angle counter and the valve lift Liftin, and the map value Rcyc_bs_cin (disturbance compensation value) of the disturbance compensation value for the cam phase control is calculated by interpolation of the two selected values. Furthermore, the map value Rcyc_bs_ cin calculated as above is corrected according to the engine speed NE, as will be described in detail hereinafter, to thereby calculate the disturbance compensation value Rcyc_cin for the cam phase control. Thus, the disturbance compensation value Rcyc_cin for the cam phase control is calculated as a value corresponding to a value obtained by inverting the sign of a predicted value of the periodic disturbance. It should be noted that as described hereinafter, the calculation of the disturbance compensation value Rcyc_cin for the cam phase control is performed in timing synchronous with generation of each pulse of the CRK signal.

Next, a description will be given of the aforementioned two-degree-of-freedom SLD controller 103. The two-degree-of-freedom SLD controller 103 calculates the SLD control input Rsld for the cam phase control according to the target cam phase Cain_cmd and the cam phase Cain with a target value filter-type two-degree-of-freedom sliding mode control algorithm [equations (1) to (8) shown in FIG. 20].

In the above equations (1) to (8), discrete data with a symbol (k) indicates that it is data sampled (or calculated) in synchronism with a predetermined control period $\Delta T$ (e.g. 5 msec in the present embodiment). The symbol k indicates a position in the sequence of sampling cycles of respective discrete data. For example, the symbol k indicates that discrete data therewith is a value sampled in the current control timing, and a symbol k-1 indicates that discrete data therewith is a value sampled in the immediately preceding control timing. This applies to the following discrete data. It should be noted that in the following description, the symbol k and the like provided for the discrete data are omitted as deemed appropriate.

In the above control algorithm, first, a filtered value Cain_cmd_f of the target cam phase is calculated with a first-order lag filter algorithm expressed by the equation (1). In the equation (1), POLE_f represents a target value filter-setting parameter, and is set to a value which satisfies the relationship of $-1<POLE\_f<0$.

Then, the SLD control input Rsld for the cam phase control is calculated with a sliding mode algorithm expressed by the equations (2) to (8). More specifically, as expressed by the equation (2), the SLD control input Rsld for the cam phase control is calculated as a total sum of an equivalent control input Req, a reaching law input Rrch, an adaptive law input Radp, and a nonlinear input Rnl. The equivalent control input Req is calculated by the equation (3). In the equation (3), a1, a2, b1, and b2 represent model parameters of a model, described hereinafter, and are set to predetermined values. Further, in the equation (3), POLE represents a switching function-setting parameter, and is set to a value which satisfies the relationship of $-1<POLE\_f<POLE<0$.

Further, the reaching law input Rrch is calculated by the equation (4). In the equation (4), Krch represents a predetermined reaching law gain, and $\sigma s$ represents a switching function defined by the equation (7).

Furthermore, the adaptive law input Radp is calculated by the equation (5). In the equation (5), Kadp represents a predetermined adaptive law gain. In the meantime, the nonlinear input Rnl is calculated by the equation (6). In the equation (6), Knl represents a predetermined nonlinear gain, and sgn($\sigma s$) represents a sign function which has a value of sgn($\sigma s$)=1 when $\sigma s \geq 0$ holds, and a value of sgn($\sigma s$)=−1 when $\sigma s<0$ holds (the sign function may be set to a value of sgn($\sigma s$)=0 when $\sigma s=0$ holds).

It should be noted that the above equations (1) to (8) are derived as follows: A controlled object is defined as a system to which is inputted the SLD control input Rsld for the cam phase control and from which is outputted the cam phase Cain, and modeled into a discrete-time system model, whereby an equation (9) shown in FIG. 20 is obtained. When a target value filter-type two-degree-of-freedom sliding mode control theory is applied based on a model expressed by the equation (9) such that the cam phase Cain converges to the target cam phase Cain_cmd, the aforementioned equations (1) to (8) are derived.

On the other hand, the above described addition element 104 calculates the reference input Rsld_f for the cam phase control as the sum of the disturbance compensation value Rcyc_cin for the cam phase control and the SLD control input Rsld for the cam phase control, calculated as above, as expressed by an equation (10) in FIG. 21.

Next, a description will be given of the aforementioned DSM controller 105. The DSM controller 105 calculates the phase control input Ucain with a control algorithm based on a $\Delta\Sigma$ modulation algorithm, expressed by equations (11) to (16) in FIG. 21. It should be noted that to the control algorithm expressed by the equations (11) to (16) is applied a control algorithm which the present assignee has already proposed in Japanese Patent Application No. 2003-293009.

In the equation (11) in FIG. 21, Lim(Rsld_f) represents a limited value obtained by performing a limiting process on the reference input Rsld_f for the cam phase control, and is calculated specifically as a value obtained by limiting the reference input Rsld_f for the cam phase control within a range defined by a predetermined lower limit value Rmin and a predetermined upper limit value Rmax. More specifically, when Rsld_f<Rmin, Lim(Rsld_f)=Rmin holds, when Rmin$\leq$Rsld_f<Rmax, Lim(Rsld_f)=Rsld_f holds, and when Rsld_f>Rmax, Lim(Rsld_f)=Rmax holds. The upper limit value Rmax and the lower limit value Rmin are set to predetermined positive and negative values whose absolute values are equal to each other.

Further, in the equation (12), r2 and udsm_oft represent a limited value deviation and a predetermined offset value, respectively. Further, in the equation (13), $\delta$ represents a difference signal value, and is calculated as the difference between the limited value deviation r2 and the immediately preceding value of a modulation output u, as expressed by the equation (13).

On the other hand, in the equation (14), $\sigma$ represents a difference integral value, which is an integral value of the difference signal value $\delta$, and is calculated as the sum of the immediately preceding value thereof and the difference signal value. Further, in the equation (15), fnl($\sigma$) represents a nonlinear function. The value of fnl($\sigma$) is set such that when $\sigma \geq 0$, fnl($\sigma$)=R holds, and when $\sigma<0$, fnl($\sigma$)=−R holds (fnl($\sigma$) may be set such that when $\sigma=0$, fnl($\sigma$)=0 holds). Further, the value R is set to a value which always satisfies the relationship of R>|r2|.

With the above control algorithm, the DSM controller 105 of the control system according to the present embodiment calculates the phase control input Ucain as a value which is frequently inverted between a predetermined upper limit value and a predetermined lower limit value, whereby it is possible to enhance the control accuracy of the cam phase control.

Next, a description will be given of the aforementioned valve lift controller 110. Referring to FIG. 22, the valve lift controller 110 includes a target valve lift-calculating section 111, a compensation element 112, a two-degree-of-freedom SLD controller 113, an addition element 114, and a DSM controller 115, all of which are implemented by the ECU 2.

As will be described hereinafter, the valve lift controller 110 calculates the lift control input Uliftin, which is inputted to the variable valve lift mechanism 50, whereby the valve lift Liftin is controlled to the target valve lift Liftin_cmd.

First, the target valve lift-calculating section 111 (target value-setting means, target valve lift-setting means) calculates the target valve lift Liftin_cmd (target value, valve lift parameter) by searching a map (see FIG. 34), described hereinafter, according to the engine speed NE and the accelerator pedal opening AP.

Further, the compensation element 112 (disturbance compensation value-storing means, disturbance compensation value-selecting means) calculates a disturbance compensation value Rcyc_lin, as described hereinafter. Similarly to the above described disturbance compensation value Rcyc_cin for the cam phase control, the disturbance compensation value Rcyc_lin is for compensating for the influence of the periodic disturbance occurring along with rotation of the intake cam 6 during operation of the engine 3. More specifically, when such a periodic disturbance is applied to the variable valve lift mechanism 50, the intake air amount is changed due to changes in the valve lift Liftin, so that to avoid such changes in the intake air amount, the value of the periodic disturbance applied to the variable valve lift mechanism 50 is predicted, and a value corresponding to a value obtained by inverting the sign of the predicted value is calculated as the disturbance compensation value Rcyc_lin for the valve lift control.

More specifically, the disturbance compensation value Rcyc_lin for the valve lift control is calculated by the same method as the method of calculating the compensation element 102. First, a map value Rcyc_bs_lin (disturbance compensation value) is calculated by searching a disturbance compensation value map according to the cam phase Cain, the count C_crk, and the target valve lift Liftin_cmd.

Figure 23:
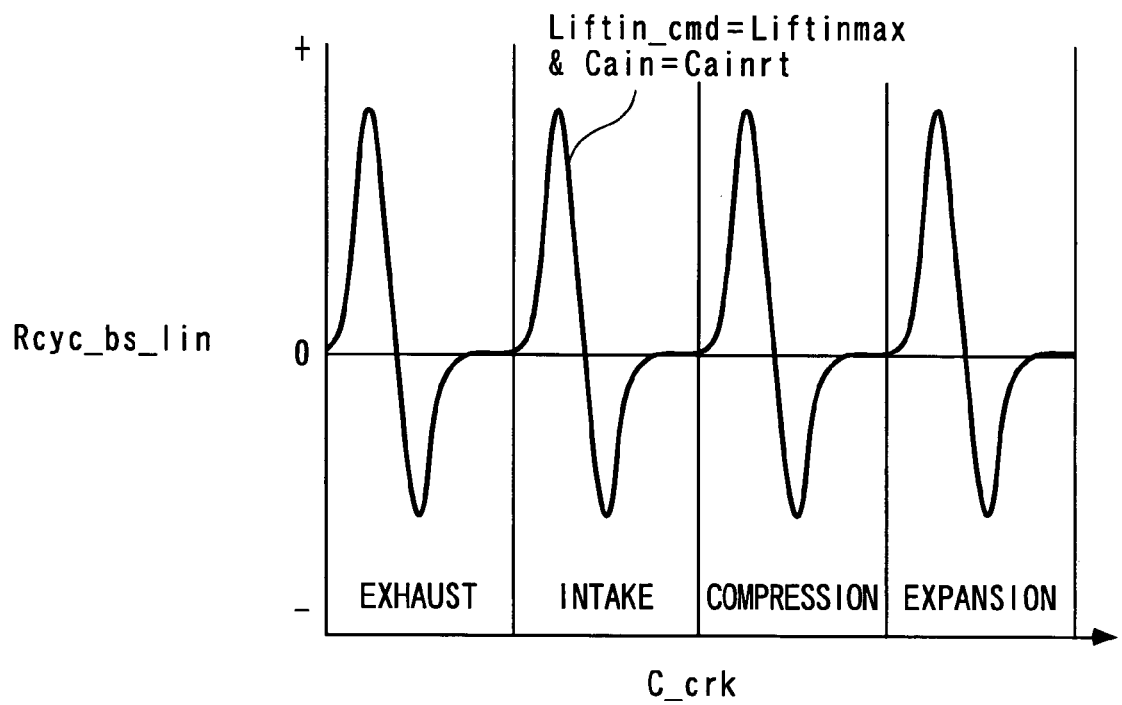
FIG. 23 is a diagram showing an example of a map value of a disturbance compensation value map for use in valve lift control, the map value set for a maximum value of a target valve lift.
Figure 24:
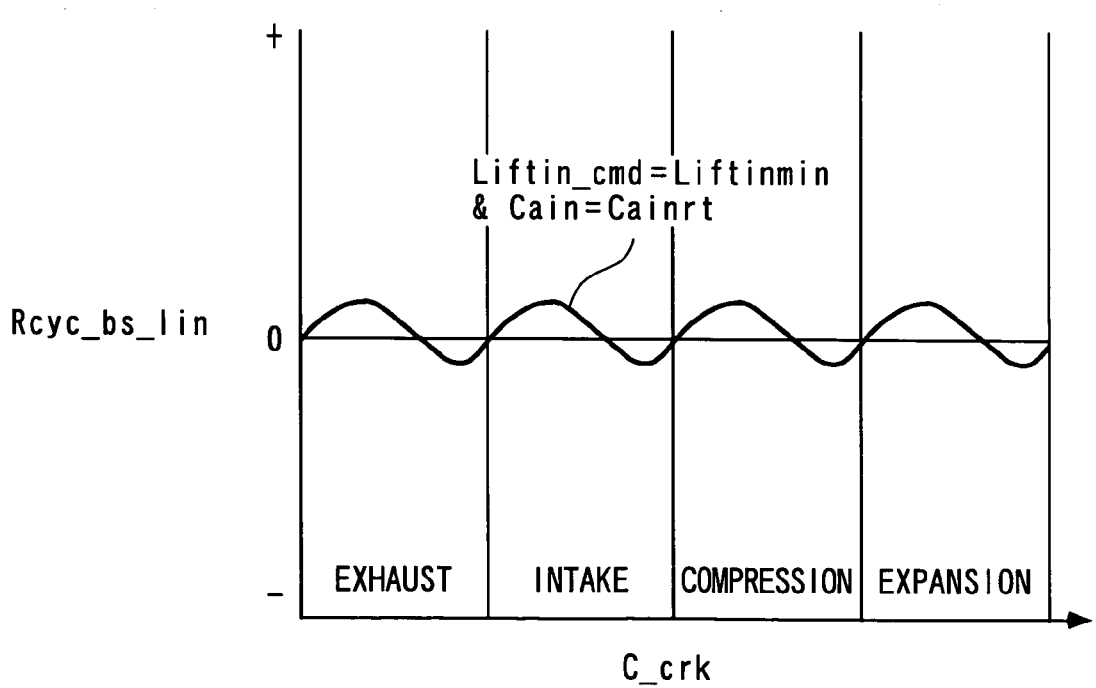
FIG. 24 is a diagram showing an example of a map value of the disturbance compensation value map for use in the valve lift control, the map value set for a minimum value of the target valve lift.

The compensation element 112 uses, as the above disturbance compensation value map, a map which contains a map value Rcyc_bs_lin for use in Liftin_cmd=Liftinmax&Cain=Cainrt shown in FIG. 23, a map value Rcyc_bs_lin for use in Liftin_cmd=Liftinmin&Cain=Cainrt shown in FIG. 24, and a plurality of map values Rcyc_bs_lin (not shown) for use in interpolation in a case where Cain=Cainrt holds and at the same time the target valve lift Liftin_cmd is between the maximum value Liftinmax and the minimum value Liftinmin, and set in a manner corresponding to values of Liftin_cmd at a plurality of stages, respectively. It should be noted that this disturbance compensation value map is stored in the ROM 2c in advance.

When the above disturbance compensation value map is searched, the count C_crk of the crank angle counter is corrected according to the degree of advance of the cam phase Cain with respect to the most retarded value Cainrt, and according to the corrected count C_crk and the target valve lift Liftin_cmd, two map values closer to the present target valve lift Liftin_cmd are selected from the above map values Rcyc_bs_lin, and the map value Rcyc_bs_lin of the disturbance compensation value for the value lift control is calculated by interpolation of the two selected values.

Then, the map value Rcyc_bs_lin calculated as above is corrected according to the engine speed NE, as described hereinafter, whereby the disturbance compensation value Rcyc_lin (corrected disturbance compensation value) for the valve lift control is calculated. It should be noted that as described hereinafter, the calculation of the disturbance compensation value Rcyc_lin for the valve lift control is performed in the timing synchronous with generation of each pulse of the CRK signal.

On the other hand, the two-degree-of-freedom SLD controller 113 (control input-calculating means) calculates an SLD control input Rsld' for the valve lift control according to the target valve lift Liftin_cmd and the valve lift Liftin, with a target value filter-type two-degree-of-freedom sliding mode control algorithm similar to the aforementioned control algorithm [equations (1) to (8)] for the two-degree-of-freedom SLD controller 103.

More specifically, in the two-degree-of-freedom SLD controller 113, the SLD control input Rsld' for the valve lift control is calculated with an algorithm defined such that in the equations (1) to (8) appearing in FIG. 20, the cam phase Cain, the target cam phase Cain_cmd, and the SLD control input Rsld for the cam phase control are replaced by the valve lift Liftin, the target valve lift Liftin_cmd, and the SLD control input Rsld' for the valve lift control, respectively, and the variables, the parameters, and the predetermined set values are replaced by respective corresponding values for the valve lift control.

Further, the aforementioned addition element 114 (control input-calculating means) calculates a reference input Rsld_f' (control input) for the valve lift control as the sum of the disturbance compensation value Rcyc_lin for the valve lift control, calculated by the compensation element 112, and the SLD control input Rsld' for the valve lift control, calculated by the two-degree-of-freedom SLD controller 113.

Furthermore, the aforementioned DSM controller 115 (control input-calculating means) calculates the lift control input Uliftin according to the reference input Rsld_f' for the valve lift control, with a control algorithm similar to the above described control algorithm [equations (11) to (16)] for the DSM controller 105. More specifically, in the DSM controller 115, the lift control input Uliftin is calculated with an algorithm defined such that in the equations (11) to (16) appearing in FIG. 21, the reference input Rsld_f for the cam phase control and the phase control input Ucain are replaced by the reference input Rsld_f' for the valve lift control and the lift control input Uliftin, respectively, and the functions and the predetermined set values are replaced by respective corresponding values for the valve lift control.

Next, a description will be given of the aforementioned compression ratio controller 120. As shown in FIG. 25, the compression ratio controller 120 includes a target compression ratio-calculating section 121, a compensation element 122, a two-degree-of-freedom SLD controller 123, an addition element 124, and a DSM controller 125, all of which are implemented by the ECU 2.

The compression ratio controller 120 calculates, as described hereinafter, the compression ratio control input Ucr, which is inputted to the variable compression ratio mechanism 80, whereby the compression ratio Cr is controlled to a target compression ratio Cr_cmd.

First, the target compression ratio-calculating section 121 (target value-setting means, target compression ratio-setting means) calculates the target compression ratio Cr_cmd (compression ratio parameter) by searching a map, described hereinafter (see FIG. 35), according to the engine speed NE and the accelerator pedal opening AP.

Further, the compensation element 122 (disturbance compensation value-storing means, disturbance compensation value-selecting means) calculates, as described hereinafter, a disturbance compensation value Rcyc_cr for the compression ratio control. The disturbance compensation value Rcyc_cr for the compression ratio control is provided for compensating for the influence of a periodic disturbance caused by combustion pressure during operation of the engine 3. More specifically, when such a periodic disturbance is applied to the variable compression ratio mechanism 80, the compression ratio Cr is changed to thereby degrade compatibility between the same and the ignition timing set by the ignition timing control, which can cause occurrence of knocking and degradation of combustion efficiency. Therefore, in the compensation element 122, to avoid such a change in the compression ratio, the value of the periodic disturbance applied to the variable compression ratio mechanism 80 is predicted, and a value obtained by inverting the sign of the predicted value is calculated as the disturbance compensation value Rcyc_cr for the compression ratio control.

More specifically, the disturbance compensation value Rcyc_cr for the compression ratio control is determined as follows: First, a map value Rcyc_bs cr (disturbance compensation value) is calculated by searching a disturbance compensation value map according to the compression ratio Cr and the count C_crk of the crank angle counter.

Figure 26:
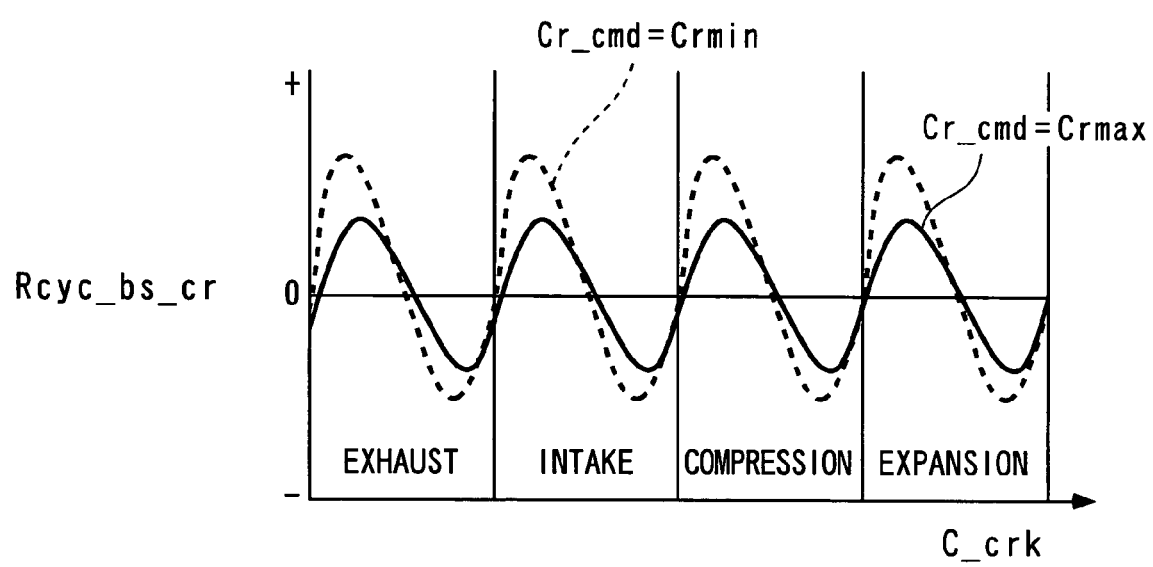
FIG. 26 is a diagram showing an example of a disturbance compensation value map for use in retrieving a map value of a disturbance compensation value for use in compression ratio control.

The compensation element 122 uses, as the disturbance compensation value map, a map which contains a map value Rcyc_bs_cr for use in Cr_cmd=Crmax, indicated by a solid line in FIG. 26, a map value Rcyc_bs_cr for use in Cr_cmd=Crmin, indicated by a broken line in FIG. 26, and a plurality of map values Rcyc_bs_cr (not shown) for use in interpolation in a case where the target compression ratio Cr_cmd is between the maximum value Crmax and the minimum value Crmin, and set in a manner corresponding to values of Cr_cmd at a plurality of stages, respectively. This disturbance compensation value map is stored in the ROM 2c in advance. It should be noted that although in the present embodiment, the above disturbance compensation value map is employed due to the geometry of the variable compression ratio mechanism 80, this is not limitative, but a disturbance compensation value map may be used in which the relationship between a value for Crmax and a value for Crmin is set reversely, depending on the geometry of the variable compression ratio mechanism.

Further, two map values closer to the present target compression ratio Cr_cmd are selected from the above map values, and the map value Rcyc_bs_cr of the disturbance compensation value for the compression ratio control is calculated by interpolation of the two selected values.

Then, the map value Rcyc_bs_cr calculated as above is corrected according to the cam phase Cain, the valve lift Liftin, and the engine speed NE, as described hereinafter, to thereby calculate the disturbance compensation value Rcyc_cr for the compression ratio control. It should be noted that as described hereinafter, the calculation of the disturbance compensation value Rcyc_cr for the compression ratio control is performed in timing synchronous with generation of each pulse of the CRK signal.

On the other hand, the two-degree-of-freedom SLD controller 123 (control input-calculating means) calculates an SLD control input Rsld" for the compression ratio control according to the target compression ratio Cr_cmd and the compression ratio Cr, with a target value filter-type two-degree-of-freedom sliding mode control algorithm similar to the aforementioned control algorithm [equations (1) to (8)] for the two-degree-of-freedom SLD controller 103.

More specifically, in the two-degree-of-freedom SLD controller 123, the SLD control input Rsld" for the compression ratio control is calculated with an algorithm defined such that in the equations (1) to (8) appearing in FIG. 20, the cam phase Cain, the target cam phase Cain_cmd, and the SLD control input Rsld for the cam phase control are replaced by the compression ratio Cr, the target compression ratio Cr_cmd, and the SLD control input Rsld" for the compression ratio control, respectively, and the variables, the parameters, and the predetermined set values are replaced by respective corresponding values for the compression ratio control.

Further, the aforementioned addition element 124 (control input-calculating means) calculates a reference input Rsld_f" (control input) for the compression ratio control as the sum of the disturbance compensation value Rcyc_cr for the compression ratio control, calculated by the compensation element 122, and the SLD control input Rsld" for the compression ratio control, calculated by the two-degree-of-freedom SLD controller 123.

Furthermore, the aforementioned DSM controller (control input-calculating means) 125 calculates the compression ratio control input Ucr according to the reference input Rsld_f" for the compression ratio control, with a control algorithm similar to the above described control algorithm [equations (11) to (16)] for the DSM controller 105. More specifically, in the DSM controller 125, the compression ratio control input Ucr is calculated with an algorithm defined such that in the equations (11) to (16) appearing in FIG. 21, the reference input Rsld_f for the cam phase control and the phase control input Ucain are replaced by the reference input Rsld_f" for the compression ratio control and the compression ratio control input Ucr, respectively, and the functions and the predetermined set values are replaced by respective corresponding values for the compression ratio control.

Next, a description will be given of control processes carried out by the ECU 2. First, a process for calculating the three disturbance compensation values Rcyc_cin, Rcyc_lin, and Rcyc_cr will be described in detail with reference to FIG. 27 to FIG. 31. This processes corresponds to the above described calculation processes by the compensation elements 102, 112, and 122, and is carried out in the timing synchronous with generation of each pulse of the CRK signal, after a time point when the crankshaft 3d has reached a predetermined crank angle position (e.g. crank angle position in which a piston 3b in a predetermined associated cylinder 3a is in the TDC position) after the IG·SW 27 has been turned on. More specifically, the repetition period of execution of the process corresponds to the repetition period of generation of the CRK signal, and as described above, the repetition period of occurrence of the periodic disturbance corresponds to the time period over which the crankshaft 3d rotates through 180 degrees, and hence the repetition period of execution of the process corresponds to one eighteenth of the repetition period of occurrence of the periodic disturbance.

Figure 27:
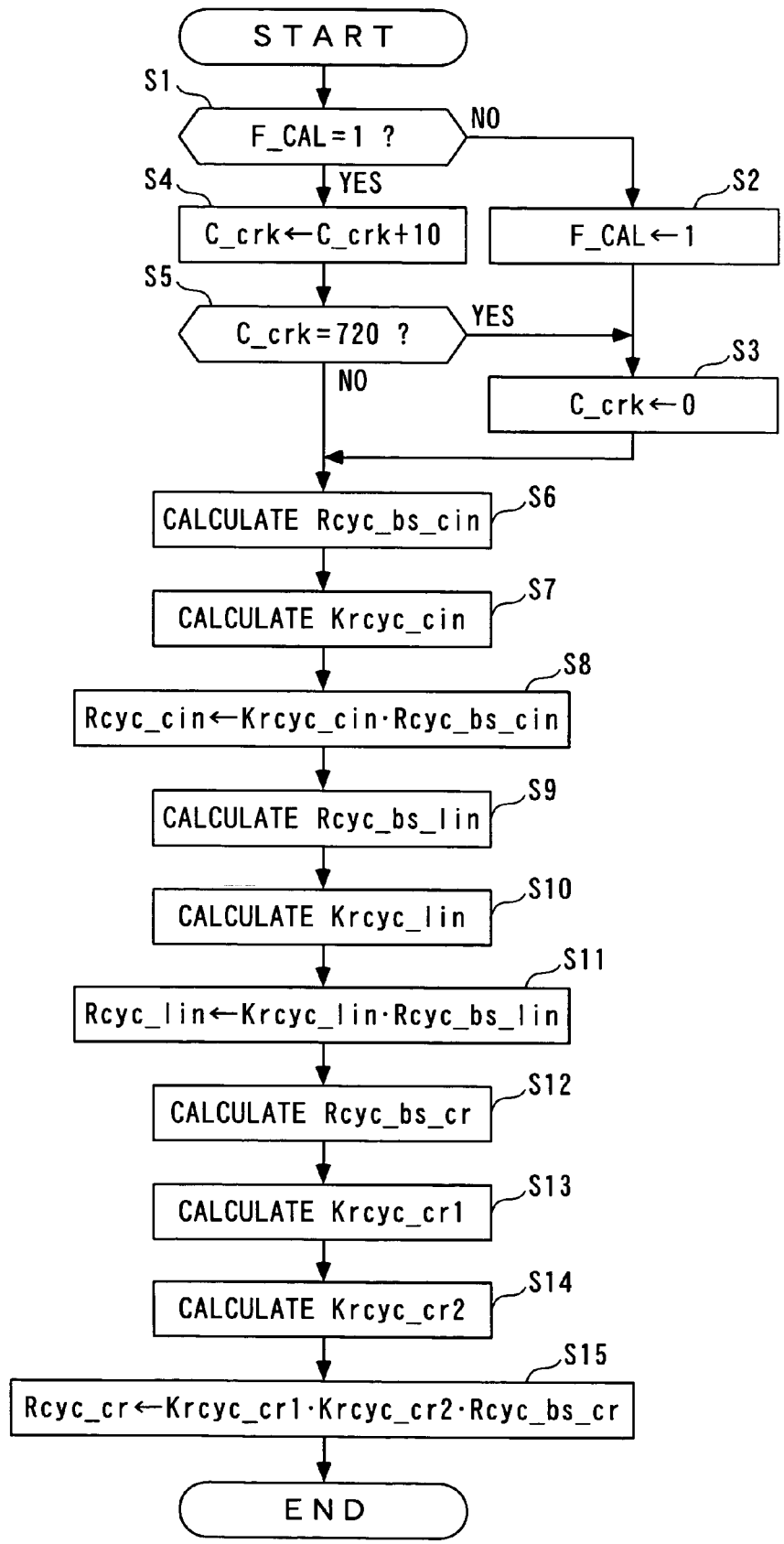
FIG. 27 is a flowchart showing a process for calculation of disturbance compensation values for use in the cam phase control, the valve lift control, and the compression ratio control.

Referring to FIG. 27, in the above process, first, in a step 1 (shown as S1 in abbreviated form in FIG. 27; the following steps are also shown in abbreviated form), it is determined whether or not a calculation flag F_CAL is equal to 1. The calculation flag F_CAL is set to 0 when the IG·SW 27 is turned on. Therefore, when the current loop is a first one, the answer to the question of the step 1 is negative (NO), and the process proceeds to a step 2, wherein calculation flag F_CAL is set to 1. Thus, the answer to the question of the step 1 becomes affirmative (YES) in the following loops.

Then, in a step 3, the count C_crk of the crank angle counter is set to a value of 0, followed by the process proceeding to a step 6, referred to hereinafter.

On the other hand, if the answer to the question of the step 1 is affirmative (YES), the process proceeds to a step 4, wherein the count C_crk of the crank angle counter is incremented by a value of 10. Then, in a step 5, it is determined whether or not the count C_crk of the crank angle counter is equal to 720. If the answer to this question is negative (NO), the process proceeds to the step 6, referred to hereinafter. On the other hand, if the answer to this question is affirmative (YES), the process proceeds to the above described step 3, wherein the count C_crk of the crank angle counter is set to 0, followed by the process proceeding to the step 6.

In the step 6 following the step 3 or the step 5, the map value Rcyc_bs_cin of the disturbance compensation value for the cam phase control is calculated. More specifically, as described hereinbefore, the map value Rcyc_bs_cin of the disturbance compensation value for the cam phase control is calculated by searching the aforementioned disturbance compensation value map (FIGS. 18 and 19) for the cam phase control, according to the target cam phase Cain_cmd, the count C_crk of the crank angle counter, and the valve lift Liftin.

Figure 28:
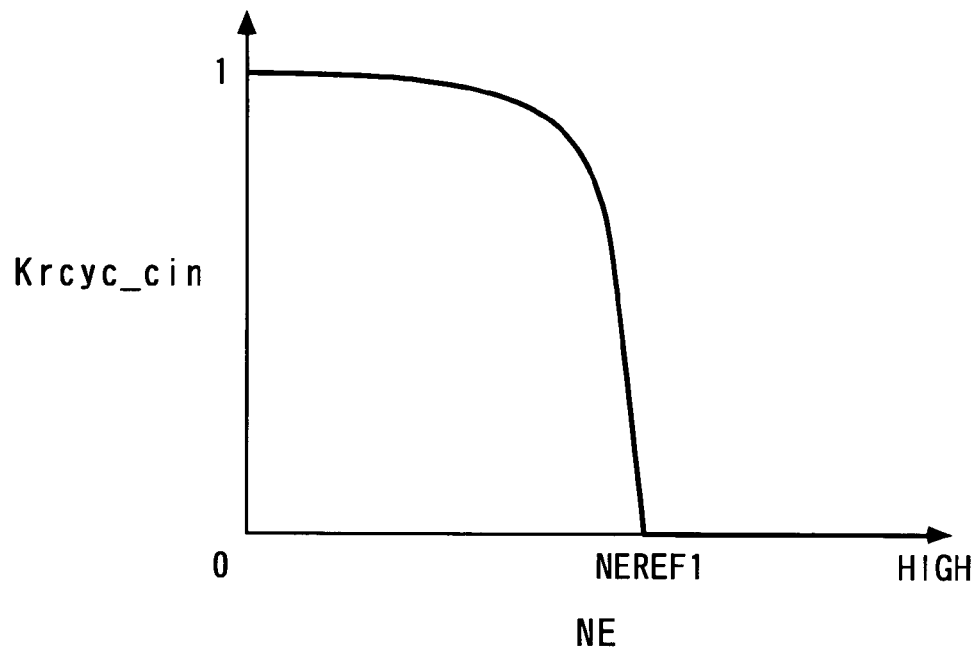
FIG. 28 is a diagram showing an example of a table used for calculation of a correction coefficient for the cam phase control.

Then, the process proceeds to a step 7, wherein a correction coefficient Krcyc_cin for the cam phase control is calculated by searching a table in FIG. 28 according to the engine speed NE. As shown in FIG. 28, in this table, the correction coefficient Krcyc_cin is set to a larger value as the engine speed NE is lower. This is to compensate for an increase in the periodic displacement of the intake cam 6, because the frequency of the periodic disturbance decreases in a low-engine speed region, causing an increase in responding gain of a cam phase control system to an external force and hence causing the increase in the periodic displacement of the intake cam 6.

Further, in the above table, the correction coefficient Krcyc_cin is set to a value of 0 within a range where the engine speed NE is not lower than a predetermined rotational speed NEREF1 (e.g. 4000 rpm). This is because in a high rotational speed region, the solenoid valve mechanism 74 as an actuator does not have sufficient responsiveness, which makes it difficult to accurately compensate for the periodic disturbance, and moreover although the frequency of the periodic disturbance becomes high, the response characteristics (low-pass characteristics) of the variable cam phase mechanism 70 prevents the mechanism 70 from being adversely affected by the periodic disturbance having the high frequency.

In a step 8 following the step 7, the disturbance compensation value Rcyc_cin for the cam phase control is set to the product of the map value Rcyc_bs_cin and the correction coefficient Krcyc_cin calculated in the respective steps 6 and 7, and stored in the RAM 2b.

Then, in a step 9, the map value Rcyc_bs_lin of the disturbance compensation value for the valve lift control is calculated. More specifically, as described above, the map value Rcyc_bs_lin of the disturbance compensation value for the valve lift control is calculated by searching the aforementioned disturbance compensation value map (FIGS. 23 and 24) for the valve lift control, according to the target valve lift Liftin_cmd, the cam phase Cain, and the count C_crk of the crank angle counter.

Figure 29:
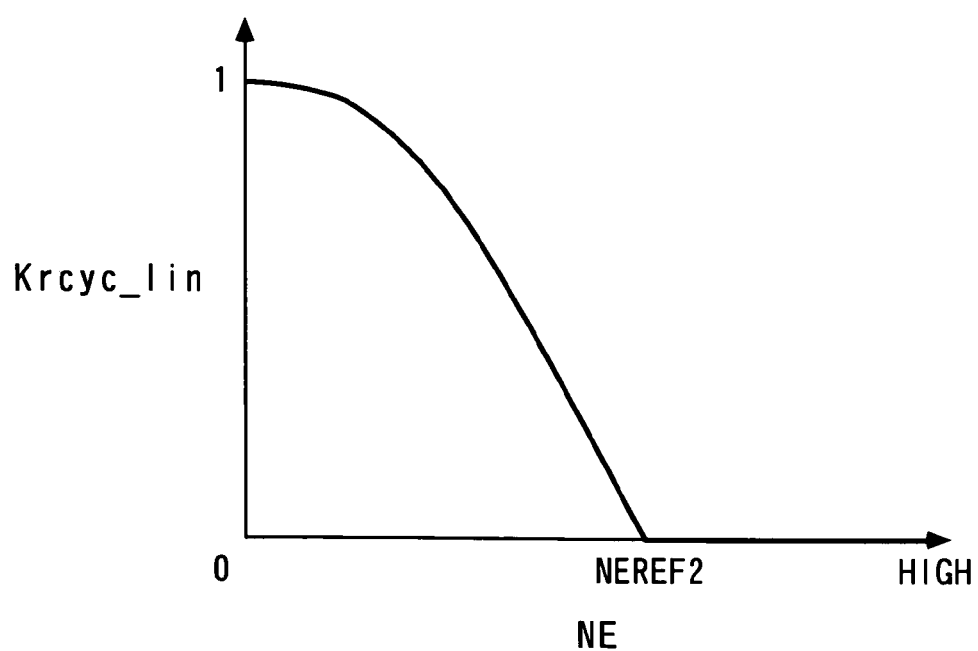
FIG. 29 is a diagram showing an example of a table used for calculation of a correction coefficient for the valve lift control.

Next, the process proceeds to a step 10, wherein a correction coefficient Krcyc_lin for the valve lift control is calculated by searching a table shown in FIG. 29 according to the engine speed NE. As shown in FIG. 29, in this table, the correction coefficient Krcyc_lin is set to a larger value as the engine speed NE is lower. This is to compensate for an increase in the periodic deviation of the valve lift Liftin, because the frequency of the periodic disturbance decreases in the low-engine speed region, causing an increase in responding gain of a valve lift control system to an external force, and hence causing the increase in the periodic deviation of the value lift Liftin.

Further, in the above table, the correction coefficient Krcyc_lin is set to a value of 0 within a range where the engine speed NE is not lower than a predetermined rotational speed NEREF2 (e.g. 5000 rpm). This is because in the high rotational speed region, the lift actuator 60 does not have sufficient responsiveness, which makes it difficult to accurately compensate for the periodic disturbance, and moreover although the frequency of the periodic disturbance becomes high, the response characteristics (low-pass characteristics) of the variable valve lift mechanism 50 prevents the mechanism 50 from being adversely affected by the periodic disturbance having the high frequency.

In a step 11 following the step 10, the disturbance compensation value Rcyc_lin for the valve lift control is set to the product of the map value Rcyc_bs_lin and the correction coefficient Krcyc_lin calculated in the respective steps 9 and 10.

Then, the process proceeds to a step 12, wherein the map value Rcyc_bs_cr of the disturbance compensation value for the compression ratio control is calculated. More specifically, as described above, the map value Rcyc_bs_cr is calculated by searching the aforementioned disturbance compensation value map (FIG. 26) for the compression ratio control, according to the count C_crk of the crank angle counter and the target compression ratio Cr_cmd.

Figure 30:
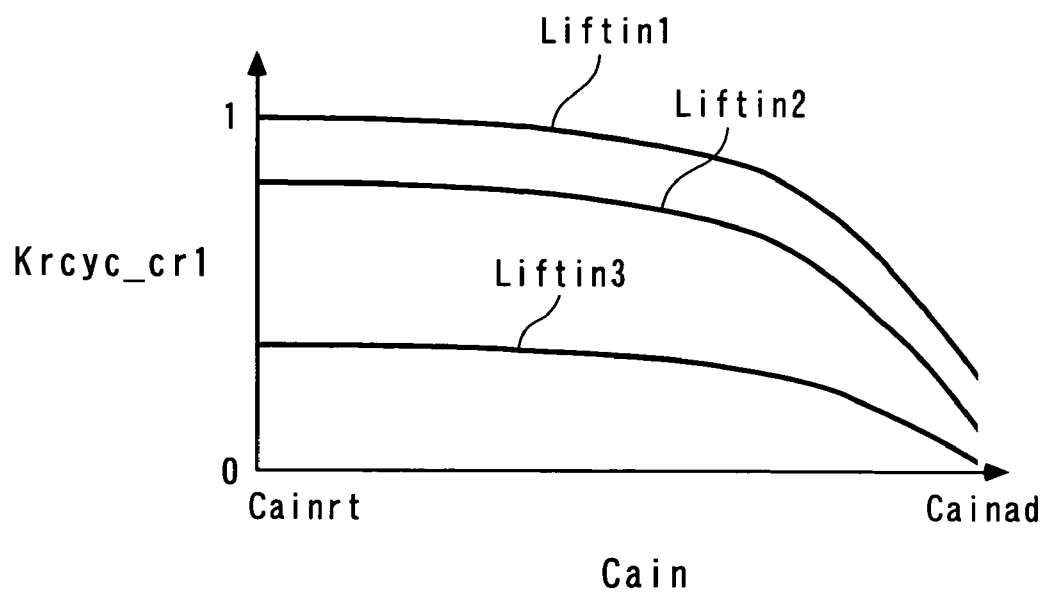
FIG. 30 is a diagram showing an example of a table used for calculation of a first correction coefficient for the compression ratio control.

Next, in a step 13, a first correction coefficient Krcyc_cr1 for the compression ratio control is calculated by searching a map shown in FIG. 30 according to the cam phase Cain and the valve lift Liftin. It should be noted that predetermined values Liftin1 to Liftin3 of the valve lift shown in FIG. 30 are set such that the relationship of Liftin1>Liftin2>Liftin3 holds therebetween.

As shown in FIG. 30, in this map, the first correction coefficient Krcyc_cr1 is set to a smaller value, as the value of the cam phase Cain is more advanced, or as the valve lift Liftin is smaller. This is because as the value of the cam phase Cain is more advanced, the internal EGR amount increases to thereby lower the combustion temperature and the combustion pressure of the mixture, which makes the amplitude of the periodic disturbance smaller, and as the value of the valve lift Liftin is smaller, the intake air amount decreases to lower the combustion pressure, which makes the amplitude of the periodic disturbance smaller.

Figure 31:
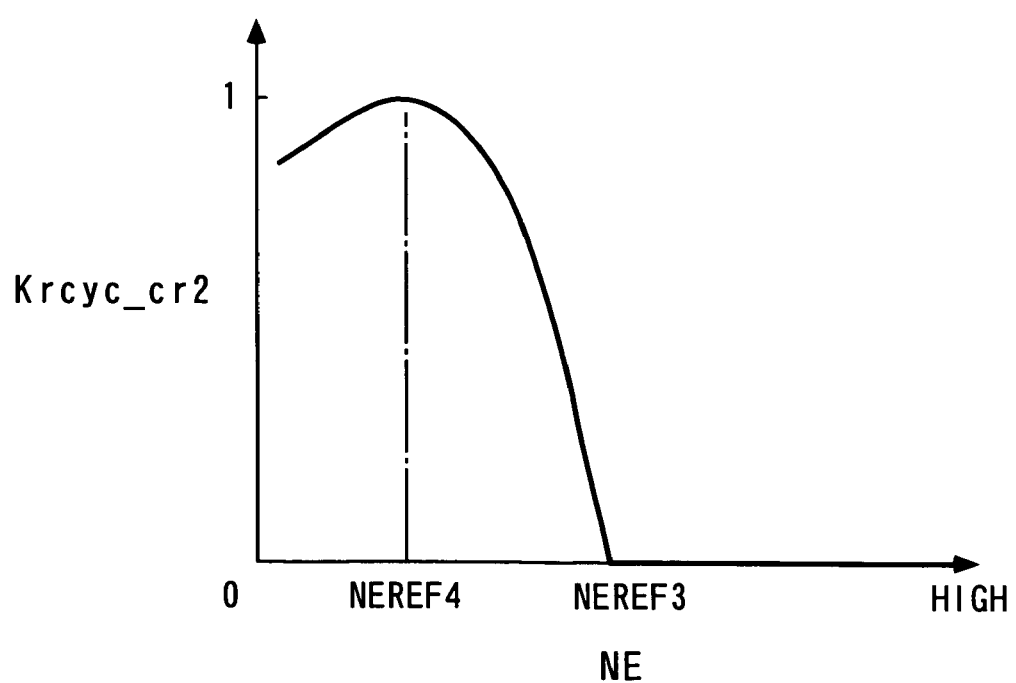
FIG. 31 is a diagram showing an example of a table used for calculation of a second correction coefficient for the compression ratio control.

Then, in a step 14, a second correction coefficient Krcyc_cr2 for the compression ratio control is calculated by searching a table shown in FIG. 31 according to the engine speed NE. As shown in FIG. 31, in this table, the second correction coefficient Krcyc_cr2 is set such that it exhibits a maximum value when NE=NEREF4 (<NEREF3) holds, in a region where the engine speed NE is lower than a predetermined rotational speed NEREF3 (e.g. 3000 rpm). In the low-engine speed region, the amplitude of the periodic disturbance exhibits a maximum value when NE=NEREF4 holds, due to the influence of the inertial mass, and the table is configured as described above, for compensation of this.

Further, in the above table, the second correction coefficient Krcyc_cr2 is set to a value of 0 within a range where NE≧NEREF3 holds. This is because in the high rotational speed region, the compression ratio actuator 87 does not have sufficient responsiveness, which makes it difficult to accurately compensate for the periodic disturbance, and moreover although the frequency of the periodic disturbance caused by the combustion pressure become high, the response characteristics (low-pass characteristics) of the variable compression ratio mechanism 80 prevents the mechanism 80 from being adversely affected by the periodic disturbance having the high frequency.

In a step 15 following the step 14, the disturbance compensation value Rcyc_cr for the compression ratio control is set to the product of the map value Rcyc_bs_lin and the first and second correction coefficients Krcyc_cr1 and Krcyc_cr2 calculated in the respective steps 12 to 14, followed by terminating the present process.

Next, a process for calculating the aforementioned three control inputs Ucain, Uliftin, and Ucr will be described with reference to FIG. 32. This process is executed at the predetermined control period ΔT (5 msec in the present embodiment) according to settings of a program timer.

Figure 32:
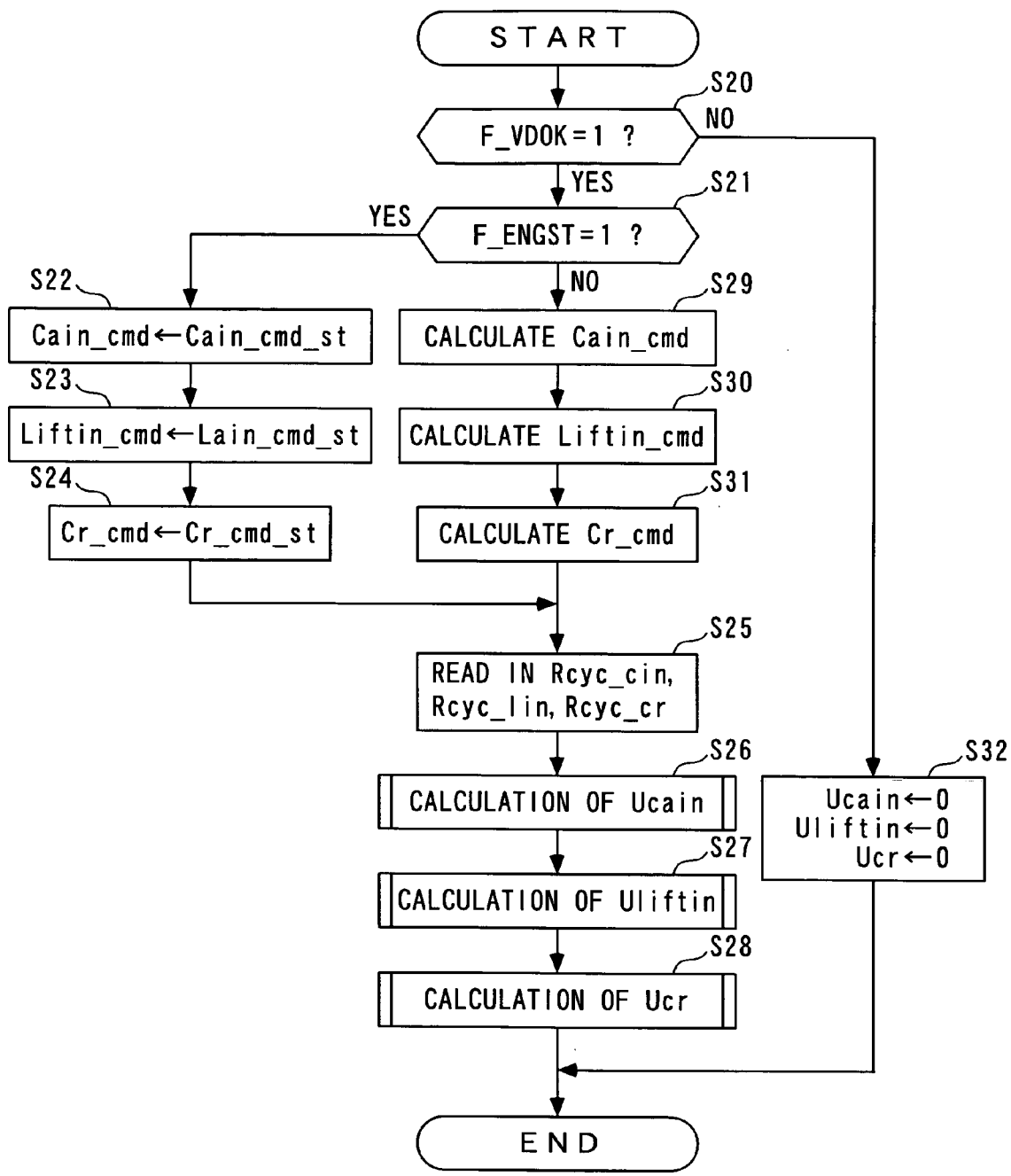
FIG. 32 is a flowchart showing a process for calculation of a cam phase control input, a lift control input, and a compression ratio input.

As shown in FIG. 32, in the above process, first, in a step 20, it is determined whether or not a variable mechanism OK flag F_VDOK is equal to 1. The variable mechanism OK flag F_VDOK is set to 1, when the variable cam phase mechanism 70, the variable valve lift mechanism 50, and the variable compression ratio mechanism 80 are all normal, and otherwise set to 0.

If the answer to the question of the step 20 is negative (NO), i.e. if at least one of the three variable mechanisms 50, 70, and 80 is faulty, the process proceeds to a step 32, wherein the phase control input Ucain, the lift control input Uliftin, and the compression ratio control input Ucr are all set to a value of 0, followed by terminating the present process. It should be noted that when all the three control inputs are set to a value of 0, the cam phase Cain is held at a most retarded value Cainrt by the variable cam phase mechanism 70, the valve lift Liftin is held at a value suitable for idling or starting of the engine 3 by the variable valve lift mechanism 50, and the compression ratio Cr is held at the minimum value Crmin by the variable compression ratio mechanism 80.

On the other hand, if the answer to the question of the step 20 is affirmative (YES), i.e. if all the three variable mechanisms 50, 70, and 80 are normal, the process proceeds to a step 21, wherein it is determined whether or not an engine start flag F_ENGST is equal to 1. The engine start flag F_ENGST is set to 1 when the engine 3 is being started, and set to 0 when the engine 3 has been started. If the answer to the above question is affirmative (YES), i.e. if the engine 3 is being started, the process proceeds to a step 22, wherein the target cam phase Cain_cmd is set to a predetermined start-time value Cain_cmd_st for starting of the engine 3.

Then, in steps 23 and 24, the target valve lift Liftin_cmd and the target compression ratio Cr_cmd are set to predetermined start-time values Liftin_cmd_st and Cr_cmd_st for starting of the engine 3, respectively.

Then, the process proceeds to a step 25, wherein the values of the three disturbance compensation values Rcyc_cin, Rcyc_lin, and Rcyc_cr currently stored in the RAM 2b are read in. That is, these values are sampled.

In a step 26 following the step 25, the phase control input Ucain is calculated, using the calculated target cam phase Cain_cmd, and the read disturbance compensation value Rcyc_cin for the cam phase control, with the control algorithms expressed by the above described equations (1) to (8), and (10) to (16).

Next, in a step 27, the lift control input Uliftin is calculated. As described hereinbefore, the lift control input Uliftin is calculated with control algorithms similar to the control algorithms with which the phase control input Ucain is calculated. More specifically, the lift control input Uliftin is calculated, using the calculated target valve lift Liftin_cmd, and the read disturbance compensation value Rcyc_lin for the valve lift control, with control algorithms similar to the control algorithms expressed by the equations (1) to (8), and (10) to (16).

Then, in a step 28, the compression ratio control input Ucr is calculated. As described hereinbefore, the compression ratio control input Ucr as well is calculated with control algorithms similar to the control algorithms with which the phase control input Ucain is calculated. More specifically, the compression ratio control input Ucr is calculated, using the calculated target compression ratio Cr_cmd, and the read disturbance compensation value Rcyc_cr for the compression ratio control, with control algorithms similar to the control algorithms expressed by the equations (1) to (8), and (10) to (16). After that, the present process is terminated.

Figure 33:
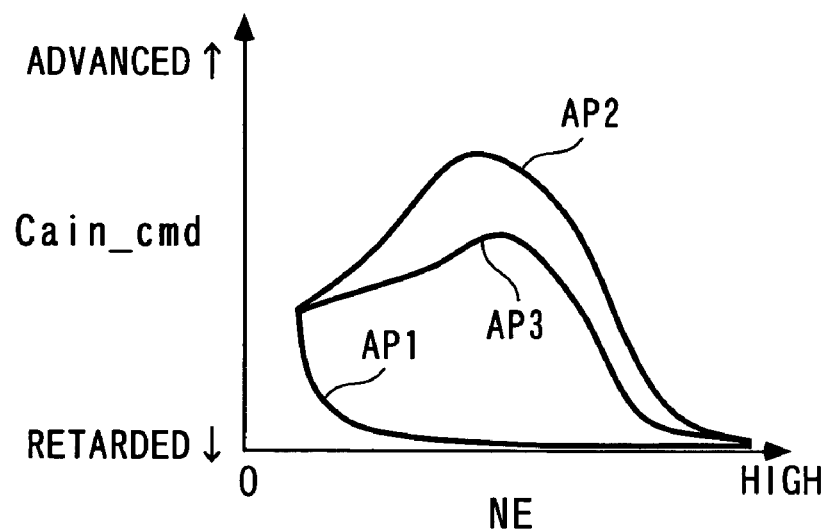
FIG. 33 is a diagram showing an example of a map used for calculation of a target cam phase.

On the other hand, if the answer to the question to the step 21 is negative (NO), i.e. if the engine 3 has been started, the process proceeds to a step 29, wherein the target cam phase Cain_cmd is calculated by searching a map shown in FIG. 33 according to the engine speed NE and the accelerator pedal opening AP. In FIG. 33, predetermined values AP1 to AP3 of the accelerator pedal opening AP are set such that the relationship of AP1>AP2>AP3 holds therebetween, and this relationship also applies to the following descriptions.

In this map, when AP=AP1 holds, i.e. the load on the engine is high, the target cam phase Cain_cmd is set to a more retarded value as the engine speed NE is higher. Further, when AP=AP2 holds, i.e. the load on the engine is medium, in a low-to-medium engine speed region, the target cam phase Cain_cmd is set to a more advanced value as the engine speed NE is higher, and in a medium-to-high engine speed region, it is set to a more retarded value as the engine speed NE is higher. Furthermore, also when AP=AP3 holds, i.e. the load on the engine is low, the target cam phase Cain_cmd is set such that it has the same tendency in value as when the load on the engine is medium. The reason for this will be described hereinafter.

Figure 34:
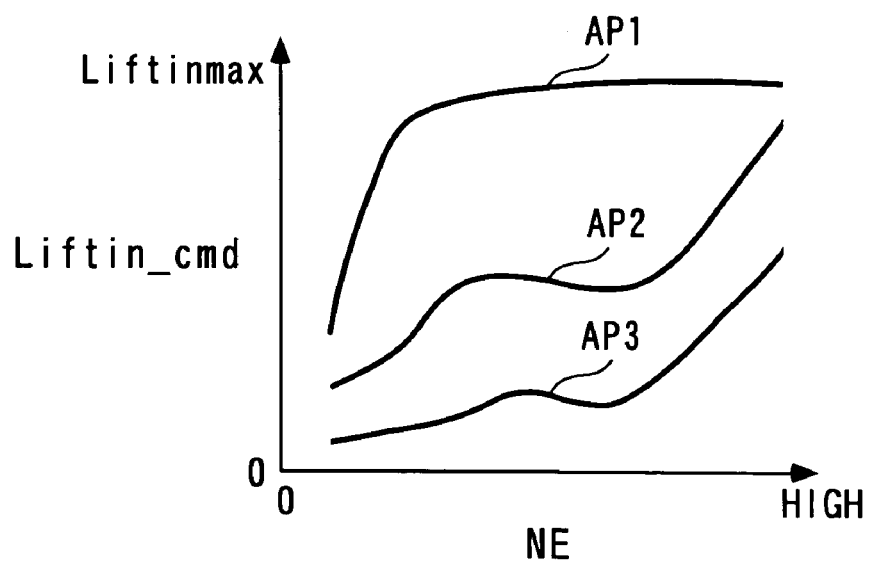
FIG. 34 is a diagram showing an example of a map used for calculation of a target valve lift.

In a step 30 following the step 29, the target valve lift Liftin_cmd is calculated by searching a map shown in FIG. 34 according to the engine speed NE and the accelerator pedal opening AP. In this map, when AP=AP1 holds, i.e. the load on the engine is high, the target valve lift Liftin_cmd is set to a larger value as the engine speed NE is higher. Further, when AP=AP2 holds, i.e. the load on the engine is medium, the target valve lift Liftin_cmd is set to a larger value as the engine speed NE is higher, in a low engine speed region, set to substantially the same value with respect to the engine speed NE, in a medium engine speed region and set to a larger value as the engine speed NE is higher in a high engine speed region. Furthermore, also when AP=AP3 holds i.e. the load on the engine is low, the target valve lift Liftin_cmd is set such that it has the same tendency in value as when the load on the engine is medium.

The reason why the target valve lift Liftin_cmd is set as described above, and the target cam phase Cain_cmd is set as described above is as follows: In the low-load/low-engine speed region, the valve lift Liftin is controlled to the low lift, and at the same time the cam phase Cain is controlled to an advanced value, whereby the Miller cycle is realized in which the intake valve 4 is closed in earlier timing than in the Otto cycle, to thereby reduce the pumping loss and increase the fluidity of the mixture within the cylinders 3a by lowering the valve lift Liftin, which contributes to increased combustion speed and enhanced combustion efficiency.

Further, in the medium-load/medium-engine speed region, the valve lift Liftin is controlled to the medium lift, and at the same time the cam phase Cain is controlled to an advanced value, whereby the valve overlap is increased to increase the internal EGR amount, and the Miller cycle for earlier closing of the intake valve 4 is realized, to thereby reduce the pumping loss and enhance fuel economy.

Furthermore, in the high-load/high-engine speed region, the valve lift Liftin is controlled to the high lift, and at the same time the cam phase Cain is controlled to a retarded value, to thereby increase the intake air amount to increase the engine torque. Additionally, during execution of these control operations, the internal EGR amount decreases, and the intake behavior continues by the inertia force of intake air at an early stage of the compression stroke, and therefore the cam phase Cain is controlled to a retarded value to utilize the decrease in the internal EGR amount and the continuation of the intake behavior, for enhancement of charging efficiency.

Figure 35:
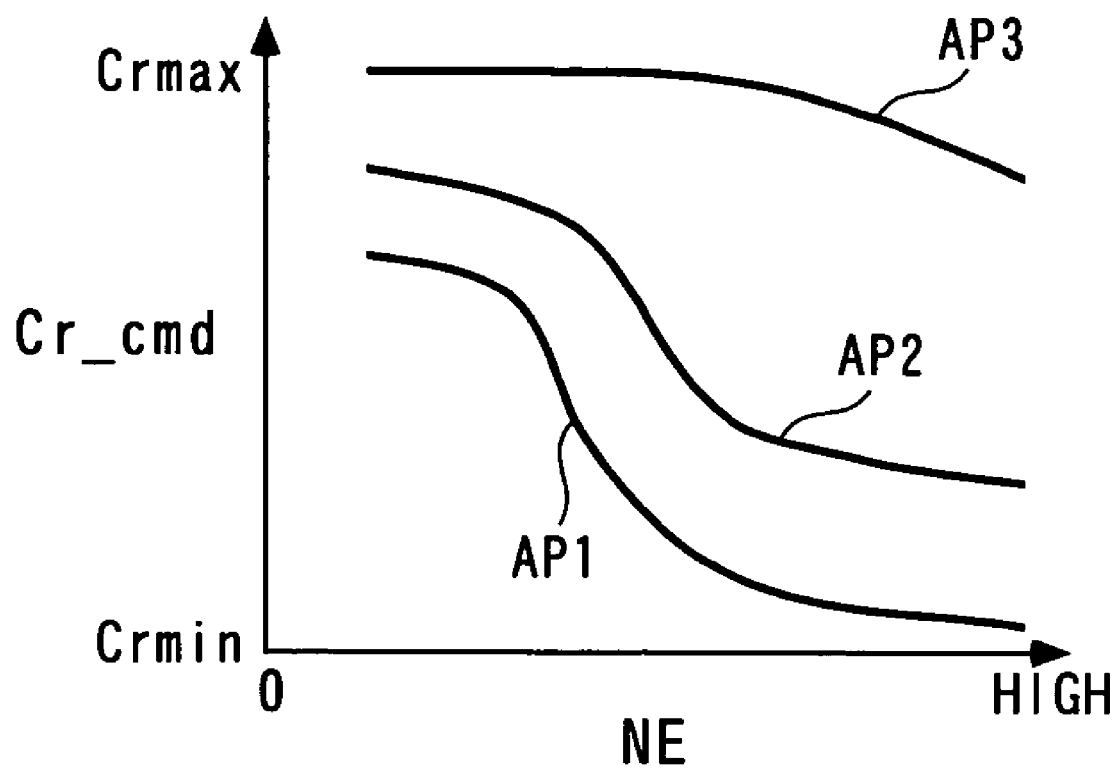
FIG. 35 is a diagram showing an example of a map used for calculation of a target compression ratio.

In a step 31 following the step 30, the target compression ratio Cr_cmd is calculated by searching a map shown in FIG. 35 according to the engine speed NE and the accelerator pedal opening AP. In this map, the target compression ratio Cr_cmd is set to a smaller value as the accelerator pedal opening AP is larger, i.e. the load on the engine is higher or as the engine speed NE is higher. This is because as the engine speed NE is higher, and the accelerator pedal opening AP is larger (i.e. the load on the engine is higher), an optimal value of the compression ratio for the ignition timing becomes smaller. In other words, if the compression ratio Cr is set to a high value when the engine speed NE and the load on the engine are both high, it is necessary to cause the ignition timing to be retarded so as to prevent occurrence of knocking, which can reduce torque generated by the engine 3 (efficiency of the engine 3). To avoid the reduction of the generated torque, the map is configured as described above.

Then, as described above, the steps 28 to 28 are carried out to calculate the three control inputs Ucain, Uliftin, and Ucr, followed by terminating the present process.

As described hereinabove, in the control system 1 according to the present embodiment, the three disturbance compensation values Rcyc_cin, Rcyc_lin, and Rcyc_cr are calculated by searching the maps and tables, in the timing synchronous with generation of each pulse of the CRK signal, as values compensating for a predicted periodic disturbance, obtained by inverting the sign of the periodic disturbance. Further, the three control inputs Ucain, Uliftin, and Ucr are calculated with the above-described control algorithms [equations (1) to (8), and (10) to (16)], and the control algorithms similar thereto, according to the three disturbance compensation values Rcyc_cin, Rcyc_lin, and Rcyc_cr calculated as above, respectively.

Therefore, the cam phase Cain, the valve lift Liftin, and the compression ratio Cr are controlled in a feedforward manner by the control inputs Ucain, Uliftin, and Ucr calculated as above, respectively, whereby it is possible to compensate for and suppress the influence of the periodic disturbance on the cam phase Cain, the valve lift Liftin, and the compression ratio Cr, more quickly than the prior art. As a result, in the cam phase control and the valve lift control, it is possible to avoid a change in the intake air amount, which is caused by periodic disturbance occurring when the intake valve 4 is opened, thereby making it possible to avoid a change in torque generated by the engine 3 and ensure a stable combustion state of the engine 3. Further, in the compression ratio control, it is possible to avoid a change in the compression ratio Cr due to the influence of the periodic disturbance to maintain excellent compatibility between the compression ratio Cr and the ignition timing. This makes it possible to avoid occurrence of knocking and reduction of combustion efficiency. Thus, the stability and accuracy of control can be improved.

Further, since the target value filter-type two-degree-of-freedom control algorithms are employed for calculating the control inputs Ucain, Uliftin, and Ucr, the cam phase Cain, the valve lift Liftin, and the compression ratio Cr can be caused to converge to the target cam phase Cain_cmd, the target valve lift Liftin_cmd, and the target compression ratio Cr_cmd in a quick and stable behavior, respectively. For example, even when there occurs a large difference between the cam phase Cain and the target cam phase Cain_cmd, it is possible to cause the cam phase Cain to converge to the target cam phase Cain_cmd quickly and accurately, while avoiding overshooting which might be caused by the difference.

When the disturbance compensation value Rcyc_cin for the cam phase control is calculated, the map value Rcyc_bs_cin thereof is calculated according to the valve lift Liftin and the target cam phase Cain_cmd, and hence the disturbance compensation value Rcyc_cin can be calculated as a value which is capable of suitably compensating for not only at least one of a change in the amplitude of the periodic disturbance and a change in the behavior thereof, caused by a change in the valve lift Liftin, but also a change in the phase of the periodic disturbance, caused by a change in the cam phase Cain. Further, since the correction coefficient Krcyc_cin is calculated using the FIG. 28 table, according to the engine speed NE, and the map value Rcyc_bs_cin is corrected by the calculated correction coefficient Krcyc_cin to thereby calculate the disturbance compensation value Rcyc_cin, a change in the frequency of the periodic disturbance, caused by a change in the engine speed NE can be properly reflected on the disturbance compensation value Rcyc_cin.

Furthermore, the correction coefficient Krcyc_cin is set to a value of 0 within the range where the engine speed NE is not lower than the predetermined rotational speed NEREF1. Therefore, in the high engine speed region where the variable cam phase mechanism 70 does not have sufficient responsiveness (that is the solenoid valve mechanism 74 as an actuator is low in response), which makes it difficult to accurately compensate for the periodic disturbance, compensation for the periodic disturbance by the disturbance compensation value Rcyc_cin is avoided, whereby it is possible to avoid degradation of controllability.

Further, when the disturbance compensation value Rcyc_lin for the valve lift control is calculated, the map value Rcyc_bs_lin thereof is calculated according to the target valve lift Liftin_cmd and the cam phase Cain, and hence the disturbance compensation value Rcyc_lin can be calculated as a value which is capable of suitably compensating for not only at least one of a change in the amplitude of the periodic disturbance and a change in the behavior thereof, caused by a change in the valve lift Liftin, but also a change in the phase of the periodic disturbance, caused by a change in the cam phase Cain. Further, since the correction coefficient Krcyc_lin is calculated using the FIG. 29 table, according to the engine speed NE, and the map value Rcyc_bs_lin is corrected by the calculated correction coefficient Krcyc_lin to thereby calculate the disturbance compensation value Rcyc_lin, a change in the frequency of the periodic disturbance, caused by a change in the engine speed NE can be properly reflected on the disturbance compensation value Rcyc_lin.

Furthermore, the correction coefficient Krcyc_lin is set to a value of 0 within the range where the engine speed NE is not lower than the predetermined rotational speed NEREF2. Therefore, in the high engine speed region where the variable valve lift mechanism 50 does not have sufficient responsiveness (that is, the lift actuator 60 is low in response), which makes it difficult to accurately compensate for the periodic disturbance, compensation for the periodic disturbance by the disturbance compensation value Rcyc_lin is avoided, whereby it is possible to avoid degradation of the controllability.

Further, when the disturbance compensation value Rcyc_cr for the compression ratio control is calculated, the map value Rcyc_bs_cr thereof is calculated according to the target compression ratio Cr_cmd, and hence the disturbance compensation value Rcyc_cr can be calculated as a value which is capable of suitably compensating for a change in the amplitude of the periodic disturbance, caused by a change in the compression ratio Cr. Furthermore, the first correction coefficient Krcyc_cr1 is calculated using the FIG. 30 map, according to the cam phase Cain and the valve lift Liftin, and the map value Rcyc_bs_cr is corrected by the first correction coefficient Krcyc_cr1 to thereby calculate the disturbance compensation value Rcyc_cr. This makes it possible to calculate the disturbance compensation value Rcyc_cr as a value which is capable of suitably compensating for a change in the amplitude of the periodic disturbance, caused by changes in the valve lift Liftin and the cam phase Cain.

Furthermore, the second correction coefficient Krcyc_cr2 is calculated using the FIG. 31 table, according to the engine speed NE, and the map value Rcyc_bs_cr is corrected by the second correction coefficient Krcyc_cr2 to thereby calculate the disturbance compensation value Rcyc_cr. This makes it possible to cause a change in the frequency of the periodic disturbance, caused by a change in the engine speed NE, to be properly reflected on the disturbance compensation value Rcyc_cr. Further, the second correction coefficient Krcyc_cr2 is set to a value of 0 within the range where the engine speed NE is not lower than the predetermined rotational speed NEREF3. Therefore, in the high rotational speed region where the variable compression ratio mechanism 80 does not have sufficient responsiveness (that is, the compression ratio actuator 87 is low in response), which makes it difficult to accurately compensate for the periodic disturbance, compensation for the periodic disturbance by the disturbance compensation value Rcyc_cr can be avoided, whereby it is possible to avoid degradation of controllability.

As described hereinabove, it is possible to markedly improve the stability and the accuracy of control in all of the cam phase control, the valve lift control, and the compression ratio control.

Figure 36:
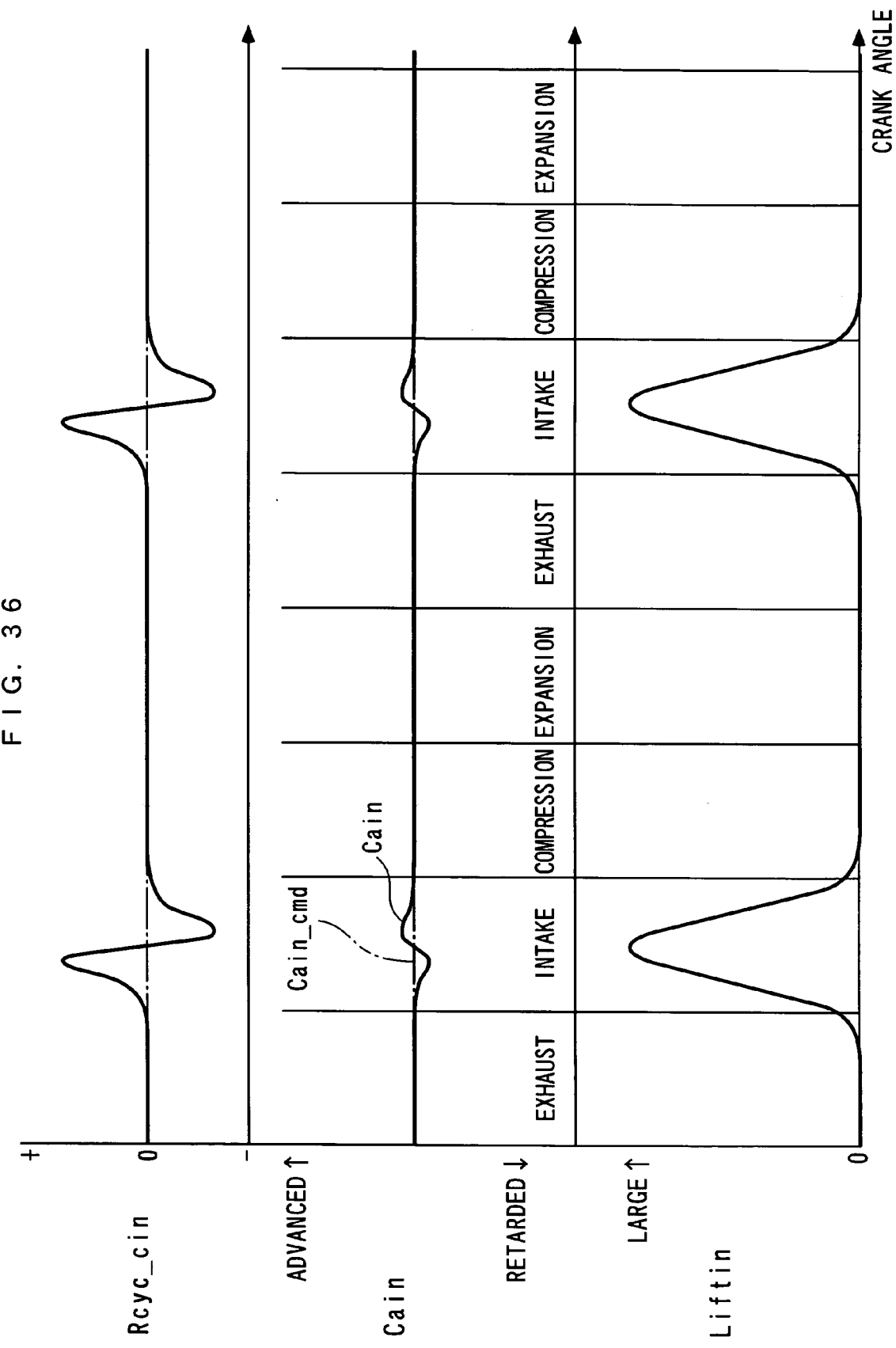
FIG. 36 is a diagram showing an example of a result of a simulation of the cam phase control with respect to one cylinder by the control system according to the first embodiment.

FIG. 36 shows the results of a simulation of cam phase control in which the cam phase Cain is controlled using the phase control input Ucain calculated by the above control method, while holding the target cam phase Cain_cmd at a constant value, by taking the cam phase control in only one cylinder 3a as an example. As is clear from comparison between FIGS. 36 and 13 referred to hereinbefore, according to the control system 1 of the present embodiment, the influence of the periodic disturbance can be effectively suppressed by using the aforementioned disturbance compensation value Rcyc_cin for the cam phase control.

Although in the first embodiment, calculation timing (i.e. execution timing for executing the FIG. 27 process) as selection timing for selecting the three disturbance compensation values Rcyc_cin, Rcyc_lin, and Rcyc_cr is set to timing of generation of each pulse of the CRK signal, this is not limitative, but the selection timing for selecting the three disturbance compensation values may be set to timing corresponding to each rotation of the crankshaft 3d through a predetermined angle. For example, the selection timing may be set to timing synchronous with generation of each pulse of the CAM signal. In this case, in the compensation elements 102, 112, and 122, as the maps used for calculating the disturbance compensation values Rcyc_cin, Rcyc_lin, and Rcyc_cr, there may be used maps set according to the count of a counter which is incremented by a value corresponding to a predetermined cam angle in synchronism with generation of each pulse of the CAM signal in place of the count C_crk of the crank angle counter.

Further, the compensation element 102 may calculate the map value Rcyc_bs_cin of the disturbance compensation value according to the target valve lift Liftin_cmd as the valve lift parameter and the cam phase Cain as the cam phase parameter, in place of the valve lift Liftin and the target cam phase Cain_cmd, respectively. Further, the compensation element 112 may also calculate the map value Rcyc_bs_lin of the disturbance compensation value according to the valve lift Liftin as the valve lift parameter and the target cam phase Cain_cmd as the cam phase parameter, in place of the target valve lift Liftin and the cam phase Cain, respectively.

Similarly, the compensation element 122 may calculate the map value Rcyc_bs_cr of the disturbance compensation value according to the compression ratio Cr as the compression ratio parameter in place of the target compression ratio Cr_cmd, and the first correction coefficient Krcyc_cr1 according to the target valve lift Liftin_cmd as the valve lift parameter and the target cam phase Cain_cmd as the cam phase parameter, in place of the valve lift Liftin and the target cam phase Cain, respectively.

Further, although the first embodiment is an example in which in the calculation of the map value Rcyc_bs_cin, there is employed the method of correcting the count C_crk of the crank angle counter according to the target cam phase Cain_cmd and searching one kind of disturbance compensation value map (FIGS. 18 and 19) according to the count C_crk of the crank angle counter and the valve lift Liftin, this is not limitative, but a plurality of kinds of disturbance compensation value maps set according to a plurality of values of the target cam phase Cain_cmd, respectively, may be used. For example, a disturbance compensation value map for use in Cain_cmd=Cainft, one for use in Cain_cmd=Cainad, and a plurality of ones set for calculating values of the target cam phases Cain_cmd at a plurality of stages therebetween may be prepared, and two disturbance compensation value maps closer to the present target cam phase Cain_cmd may be selected therefrom to calculate the map value Rcyc_bs_cin by interpolation of map values on the two selected maps. Similarly, when the map value Rcyc_bs lin of the disturbance compensation value Rcyc_lin is calculated, a plurality of disturbance compensation value maps set according to a plurality of values of the target valve lift Liftin_cmd, respectively, may be used as the disturbance compensation value maps.

Furthermore, although in the first embodiment, the target value filter-type two-degree-of-freedom sliding mode control algorithms are employed as control algorithms for calculating the reference input Rsld for the cam phase control, this is not limitative, but any control algorithms for calculating the reference input Rsld for the cam phase control may be employed so long as they are control algorithms which are capable of calculating the reference input Rsld for the cam phase control as a value capable of causing the cam phase Cain to converge to the target cam phase Cain_cmd. For example, feedback control algorithms, such as PID control algorithms, and response-specifying control algorithms, such as back-stepping control algorithms, may be employed. Similarly, feedback control algorithms, such as PI control algorithms and the PID control algorithms, and the response-specifying control algorithms, such as the back-stepping control algorithms, may be used as control algorithms for calculating the reference input Rsld_f' for the valve lift control and the reference input Rsld" for the compression ratio control.

Further, although in the first embodiment, the target value filter-type two-degree-of-freedom sliding mode control algorithms are employed as the response-specifying control algorithms, this is not limitative, but any response-specifying control algorithms may be employed so long as they are algorithms, such as the back-stepping control algorithms, which are capable of specifying the convergence rate and the converging behavior of the output of a controlled object to a target value.

Further, although in the first embodiment, the DSM controller 105 is employed for calculating the phase control input Ucain in the cam phase controller 100, the control system 1 may be configured such that the DSM controller 105 is omitted to directly input the reference input Rsld_f for the cam phase control to the variable cam phase mechanism 70 as the phase control input Ucain. Furthermore, the control system 1 may be configured such that when the lift control input Uliftin is calculated in the valve lift controller 110, the DSM controller 115 is omitted to directly input the reference input Rsld_f' for the valve lift control to the variable valve lift mechanism 50 as the lift control input Uliftin. Similarly, the control system 1 may be configured such that also when the compression ratio control input Ucr is calculated in the compression ratio controller 120, the DSM controller 125 is omitted to directly input the reference input Rsld_f" for the compression ratio control to the variable compression ratio mechanism 80 as the compression ratio control input Ucr.

Further, in the compensation element 100, in the calculation of the disturbance compensation value Rcyc_lin, the count C_crk of the crank angle counter may be replaced by the count of a counter incremented by an amount corresponding to a predetermined cam angle in synchronism with generation of each pulse of the CAM signal, and the valve lift Liftin by the target valve lift Liftin_cmd. Further, in the compensation elements 110 and 120 as well, the disturbance compensation values Rcyc_lin and Rcyc_cr may be calculated in the same manner.

Further, when the engine 3 is not provided with the variable valve lift mechanism 50 and the variable cam phase mechanism 70, but is provided with the variable compression ratio mechanism 80 alone, the compensation element 120 may calculated the disturbance compensation value Rcyc_cr according to a parameter (intake pipe absolute pressure and the TH passing intake air amount GTH) indicative of load on the engine 3 in place of the cam phase Cain and the valve lift Liftin.

Still further, although in the first embodiment, the cam phase Cain and the valve lift Liftin are used as load parameters, this is not limitative, but any load parameters may be employed so long as they are indicative of the load on the engine 3. For example, the target cam phase Cain_cmd and the target valve lift Liftin_cmd may be used as the load parameters or the intake pipe absolute pressure PBA, the TH passing intake air amount GTH, and the accelerator pedal opening AP may also be used.

Further, in place of the hydraulic variable cam phase mechanism 70 of the control system according to the present embodiment, an electromagnetic variable cam phase mechanism that the present assignee has already proposed in Japanese Patent Application No. 2003-293009 may be employed as the variable cam phase mechanism. In this case, in the electromagnetic variable cam phase mechanism, since the cam phase Cain is changed depending on the balance between the electromagnetic force of a solenoid and the urging force of a spring, the periodic disturbance acts only on the advanced side or the retarded side. Therefore, to compensate for the periodic disturbance acting as above, when the disturbance compensation value Rcyc_cin for the cam phase control is calculated, the map value Rcyc_bs cin thereof may be calculated using a map indicated by solid lines or broken lines in FIG. 37.

Figure 38:
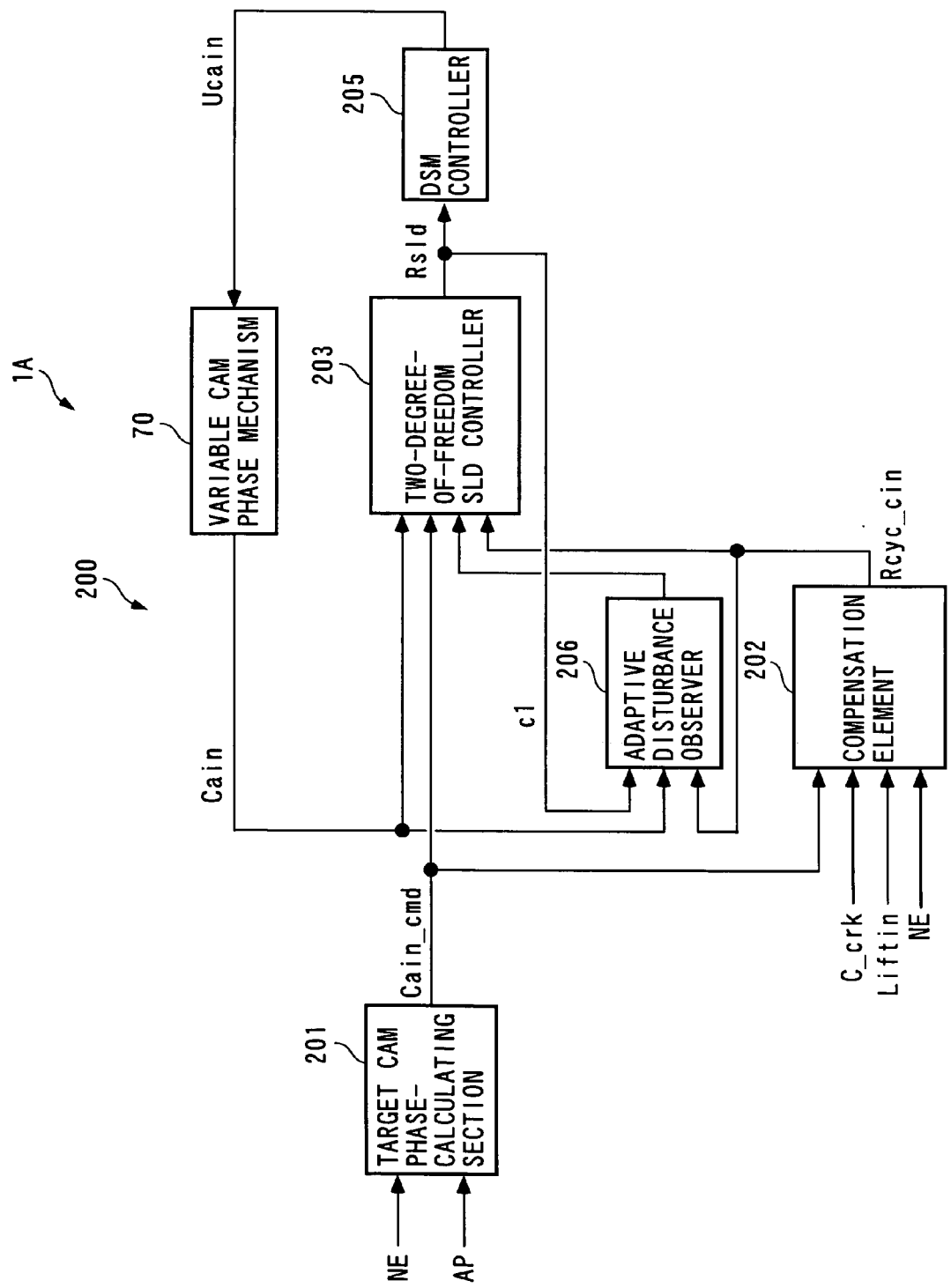
FIG. 38 is a block diagram schematically showing the configuration of a cam phase controller of a control system according to a second embodiment of the invention.
Figure 39:
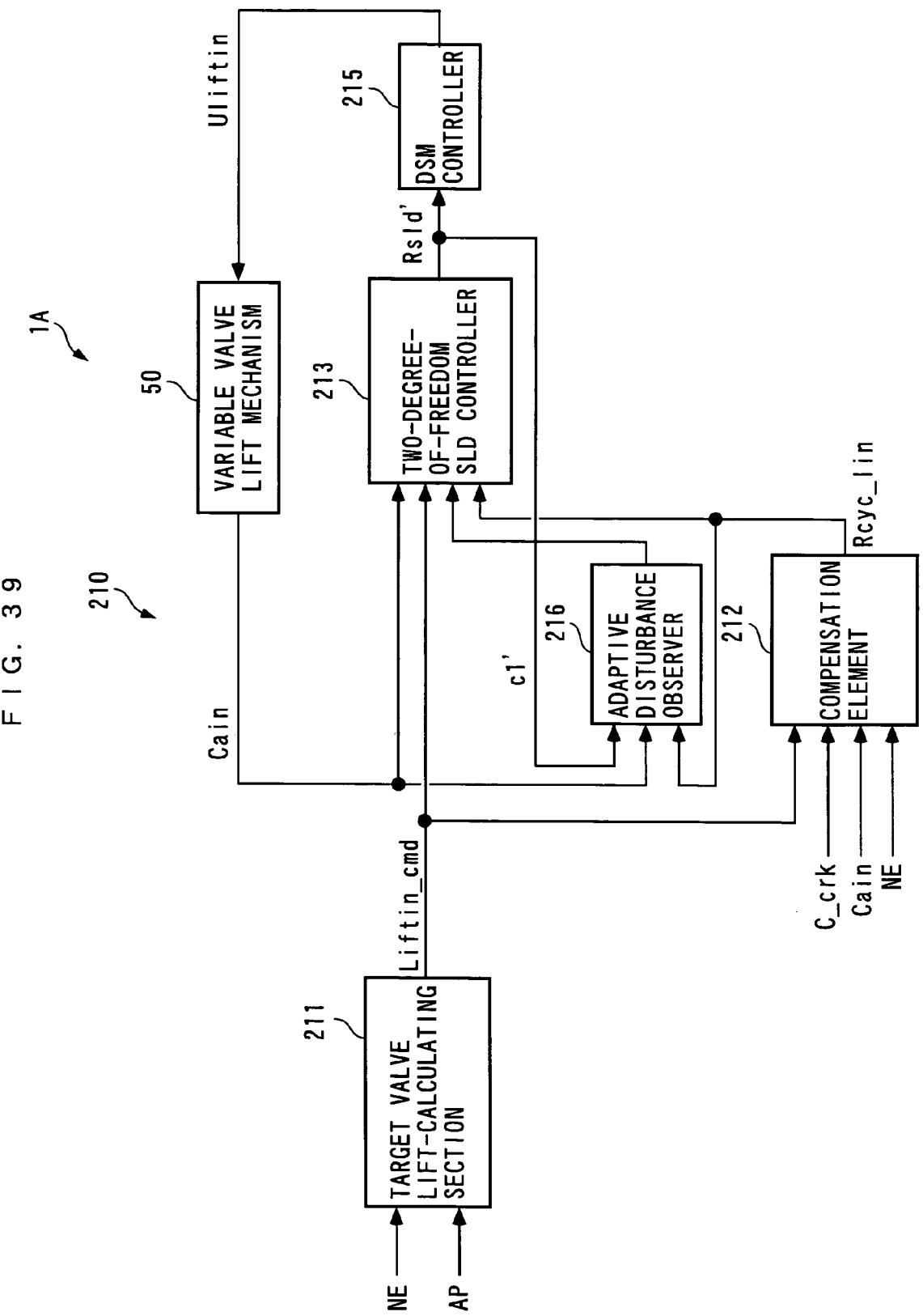
FIG. 39 is a block diagram schematically showing the configuration of a valve lift controller of the control system according to the second embodiment.

Next, a description will be given of a control system 1A according to a second embodiment of the present invention. The control system 1A of the present embodiment is configured similarly to the above-described control system 1 of the first embodiment, except for part thereof. Therefore, the following description will be mainly given of the different points thereof from the control system 1 of the first embodiment. Referring to FIG. 38 to FIG. 40, the control system 1A includes a cam phase controller 200, a valve lift controller 210, and a compression ratio controller 220, all of which are implemented by the ECU 2 (disturbance estimation value-calculating means).

First, a description will be given of the cam phase controller 200. Referring to FIG. 38, the cam phase controller 200 includes a target cam phase-calculating section 201 (target cam phase-setting means, target value-setting means), a compensation element 202 (disturbance compensation value-storing means, disturbance compensation value-selecting means), a two-degree-of-freedom SLD controller 203 (control input-calculating means), a DSM controller 205 (control input-calculating means), and an adaptive disturbance observer 206 (disturbance estimation value-calculating means), all of which are implemented by the ECU 2. In the cam phase controller 200, the target cam phase-calculating section 201 and the compensation element 202 are constructed similarly to those of the cam phase controller 100, described hereinabove, and hence detailed description thereof is omitted.

The adaptive disturbance observer 206 is provided for calculating a disturbance estimation value c1 for the cam phase control, which is used for compensating for modeling errors and disturbance. More specifically, in the adaptive disturbance observer 206, the disturbance estimation value c1 for the cam phase control is calculated with an identification algorithm of a fixed gain method, expressed by equations (17) to (19) in FIG. 41, according to the cam phase Cain, the disturbance compensation value Rcyc_cin for the cam phase control, and the SLD control input Rsld for the cam phase control. Cain_hat in the equation (17) represents an identified value of the cam phase, and e_id in the equation (18) an identification error. Further, P' in the equation (19) represents an identification gain.

It should be noted that the above equations (17) to (19) are derived as follows: When the disturbance estimation value c1 and the disturbance compensation value Rcyc_cin both for the cam phase control are added to the aforementioned model expressed by the equation (9) in FIG. 20 so as to compensate for disturbance, an equation (20) shown in FIG. 41 is obtained. In the equation (20), a right side thereof is substituted with the identified value Cain_hat of the cam phase, and by using a model obtained by the substitution and the identification algorithm of the fixed gain method based on a statistical process, such that the difference between the identified value Cain_hat of the cam phase and the cam phase Cain is minimized, the above described equations (17) to (19) are derived.

In the adaptive disturbance observer 206, with the algorithm expressed by the equations (17) to (19), the disturbance estimation value c1 for the cam phase control is calculated as a value capable of suitably compensating for modeling errors and disturbance.

Further, in the two-degree-of-freedom SLD controller 203, the SLD control input Rsld (control input) for the cam phase control is calculated with a target value filter-type two-degree-of-freedom sliding mode control algorithm expressed by equations (21) to (27) in FIG. 42. As is clear from the equations (21) to (27), the control algorithm for the two-degree-of-freedom SLD controller 203 is different from the control algorithm for the two-degree-of-freedom SLD controller 103 in that the disturbance compensation value Rcyc_cin and the disturbance estimation value c1 for the cam phase control are contained in the equation for calculating the equivalent control input Req, and the adaptive law input Radp is not used in calculation of the SLD control input Rsld.

Further, in the DSM controller 205, the phase control input Ucain is calculated based on the SLD control input Rsld for the cam phase control, calculated as above, with a control algorithm [equations (28) to (33) shown in FIG. 43] similar to the control algorithm for the DSM controller 105.

The cam phase controller 200 is configured as described above, and the valve lift controller 210 is also configured similarly to the cam phase controller 200. More specifically, as shown in FIG. 39, the valve lift controller 210 includes a target valve lift-calculating section 211 (target value-setting means, target valve lift-setting means), a compensation element 212 (disturbance compensation value-storing means, disturbance compensation value-selecting means), a two-degree-of-freedom SLD controller 213 (control input-calculating means), a DSM controller 215 (control input-calculating means), and an adaptive disturbance observer 216 (disturbance estimation value-calculating means). In the valve lift controller 210, the target valve lift-calculating section 211 and the compensation element 212 are configured similarly to those of the above-described valve lift controller 110, and hence detailed description thereof is omitted.

In the adaptive disturbance observer 216, a disturbance estimation value c1' for the valve lift control is calculated with an algorithm similar to the algorithm for the adaptive disturbance observer 206 of the cam phase controller 200. More specifically, the disturbance estimation value c1' for the valve lift control is calculated with an algorithm in which in the above equations (17) to (19) in FIG. 41, Cain is replaced by Liftin, Cain_cmd by Liftin_cmd, Rcyc_cin by Rcyc_lin, c1 by c1', and Rsld by Rsld', respectively, and the coefficients and the like are replaced by respective corresponding values for the valve lift control.

Further, in the two-degree-of-freedom SLD controller 213, the SLD control input Rsld' for the valve lift control is calculated with an algorithm similar to the algorithm for the two-degree-of-freedom SLD controller 203 of the cam phase controller 200. More specifically, the SLD control input Rsld' (control input) for the valve lift control is calculated with an algorithm in which in the equations (21) to (27) in FIG. 42, the parameters, the coefficients and the like are replaced by respective corresponding values for the valve lift control.

Further, in the DSM controller 215, the lift control input Uliftin is calculated based on the SLD control input Rsld' for the valve lift control, calculated as above, with a control algorithm similar to the control algorithm for the DSM controller 205 of the cam phase controller 200. More specifically, the lift control input Uliftin is calculated with an algorithm in which in the equations (28) to (33) in FIG. 43, the parameters, the coefficients and the like are replaced by respective corresponding values for the valve lift control.

On the other hand, the compression ratio controller 220 as well is constructed similarly to the cam phase controller 200. More specifically, as shown in FIG. 40, the compression ratio controller 220 includes a target compression ratio-calculating section 221 (target value-setting means, target compression ratio-setting means), a compensation element 222 (disturbance compensation value-storing means, disturbance compensation value-selecting means), a two-degree-of-freedom SLD controller 223 (control input-calculating means), a DSM controller 225 (control input-calculating means), and an adaptive disturbance observer 226 (disturbance estimation value-calculating means). In the compression ratio controller 220, the target compression ratio-calculating section 221 and the compensation element 222 are configured similarly to those of the above-described compression ratio controller 120, and hence detailed description thereof is omitted.

Further, in the adaptive disturbance observer 226, a disturbance estimation value c1" for the compression ratio control is calculated with an algorithm similar to the algorithm for the adaptive disturbance observer 206 of the cam phase controller 200. More specifically, the disturbance estimation value c" for the compression ratio control is calculated with an algorithm in which in the above equations (17) to (19) in FIG. 41, Cain is replaced by Cr, Cain_cmd by Cr_cmd, Rcyc_cin by Rcyc_cr, c1 by c1", and Rsld by Rsld", and the coefficients and the like are replaced by respective corresponding values for the compression ratio control.

Further, in the two-degree-of-freedom SLD controller 223, the SLD control input Rsld" (control input) for the compression ratio control is calculated with an algorithm similar to the algorithm for the two-degree-of-freedom SLD controller 203 of the cam phase controller 200. More specifically, the SLD control input Rsld" for the compression ratio control is calculated with an algorithm in which in the equations (21) to (27) in FIG. 42, the parameters, the coefficients and the like are replaced by respective corresponding values for the valve lift control.

Further, in the DSM controller 225, the compression ratio control input Ucr is calculated based on the SLD control input Rsld" for the compression ratio control, calculated as above, with a control algorithm similar to the control algorithm for the DSM controller 205 of the cam phase controller 200. More specifically, the compression ratio control input Ucr is calculated with an algorithm in which in the equations (28) to (33) in FIG. 43, the parameters, the coefficients and the like are replaced by respective corresponding values for the compression ratio control.

In the control system 1A, when the phase control inputs Ucain, Uliftin, and Ucr are calculated by the ECU 2, the phase control input Ucain is calculated by the equations (21) to (33) in the aforementioned step 26 in FIG. 32. Further, in the step 27, the lift control input Uliftin is calculated with the algorithm in which the variables and the parameters in the equations (21) to (33) are replaced by the respective corresponding values for the valve lift control, and in the step 28, the compression ratio control input Ucr is calculated by the same method.

According to the control system 1A of the present embodiment, configured as above, similarly to the control system 1 of the first embodiment, the three control inputs Ucain, Uliftin, and Ucr are calculated according to the three disturbance compensation values Rcyc_cin, Rcyc_lin, and Rcyc_cr, respectively. Therefore, by controlling the cam phase Cain, the valve lift Liftin, and the compression ratio Cr in a feedforward manner using the control inputs Ucain, Uliftin, and Ucr calculated as above, respectively, it is possible to quickly compensate for and suppress the influence of the periodic disturbance on the cam phase Cain, the valve lift Liftin, and the compression ratio Cr. As a result, in the cam phase control, the valve lift control, and the compression ratio control, it is possible to obtain the same advantageous effects as provided by the control system 1 described hereinabove.

Moreover, the disturbance estimation values c1, c1', and c1" are calculated as values capable of compensating for modeling errors and disturbance, by the adaptive disturbance observers 206, 216, and 226, and the control inputs Ucain, Uliftin, and Ucr are calculated according to the disturbance estimation values c1, c1', and c1". Therefore, by using the control inputs Ucain, Uliftin, and Ucr, it is possible to control the cam phase Cain, the valve lift Liftin, and the compression ratio Cr, such that a steady-state deviation is prevented from occurring, and compensate for and suppress the influence of the periodic disturbance on the cam phase Cain, the valve lift Liftin, and the compression ratio Cr, more quickly than the control system 1 according to the first embodiment. Thus, it is possible to further enhance the stability and the accuracy of the control compared with the control system 1.

Figure 44:
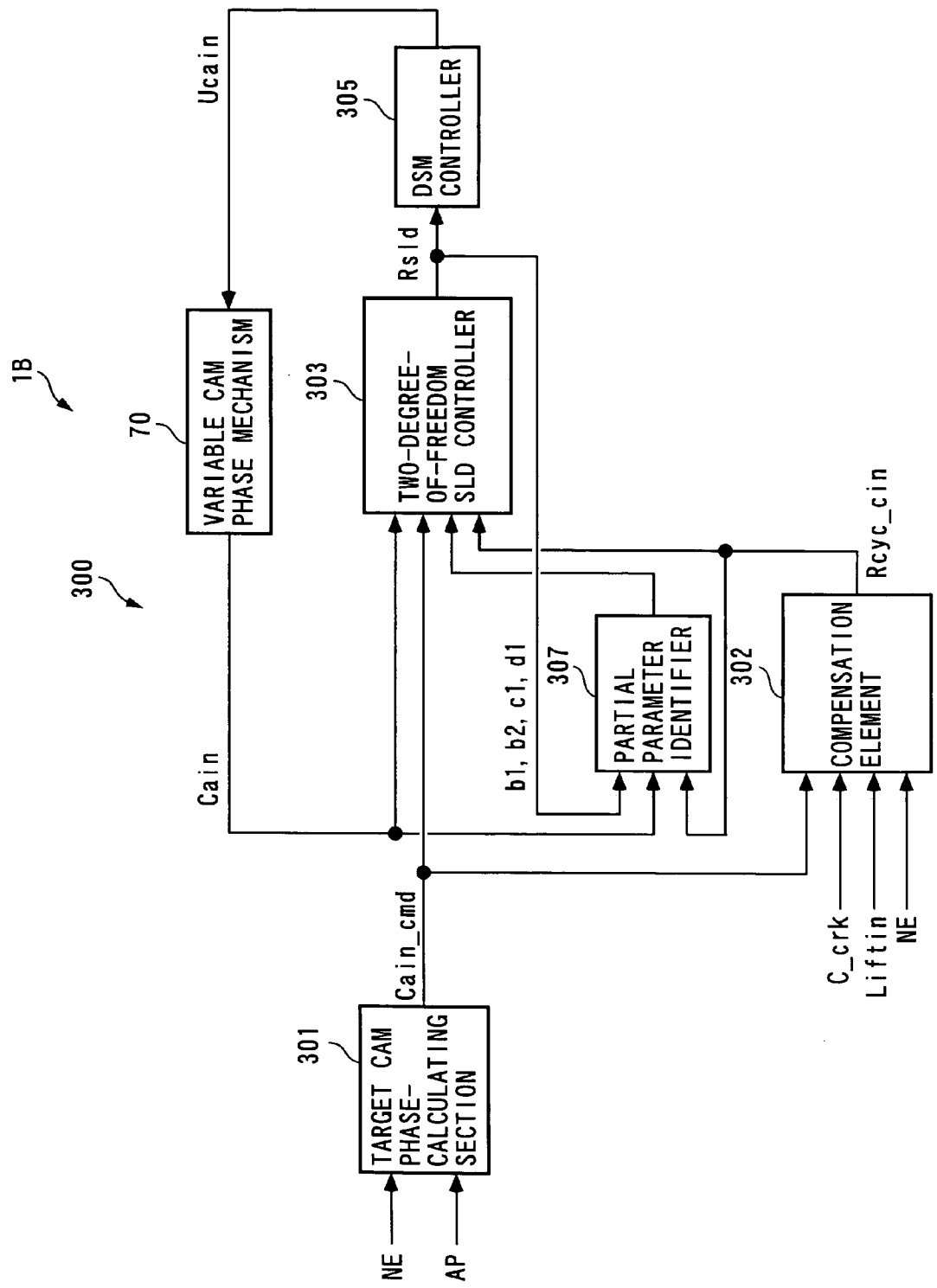
FIG. 44 is a block diagram schematically showing the configuration of a cam phase controller of a control system according to a third embodiment of the present invention.
Figure 45:
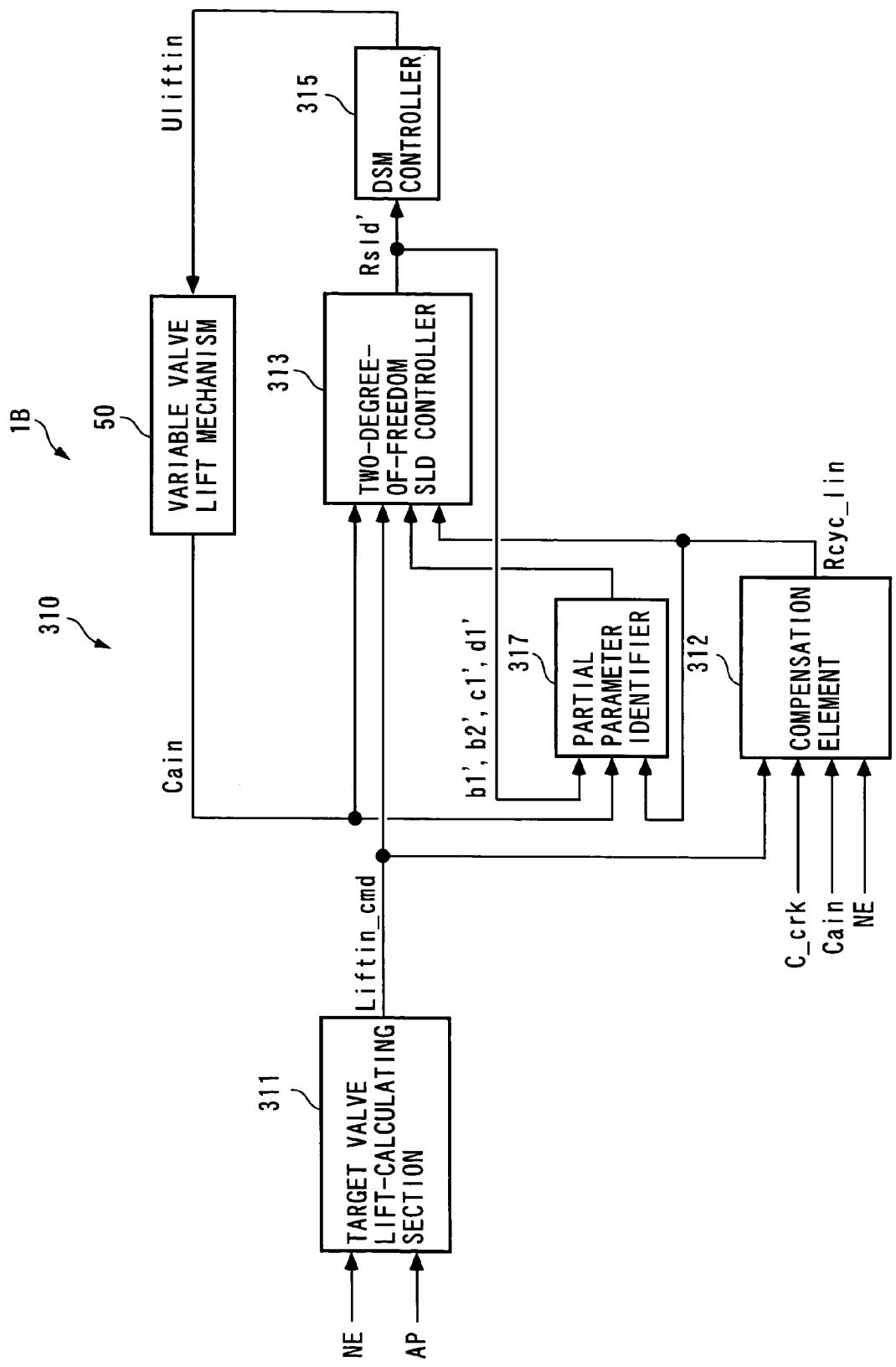
FIG. 45 is a block diagram schematically showing the configuration of a valve lift controller of the control system according to the third embodiment.
Figure 46:
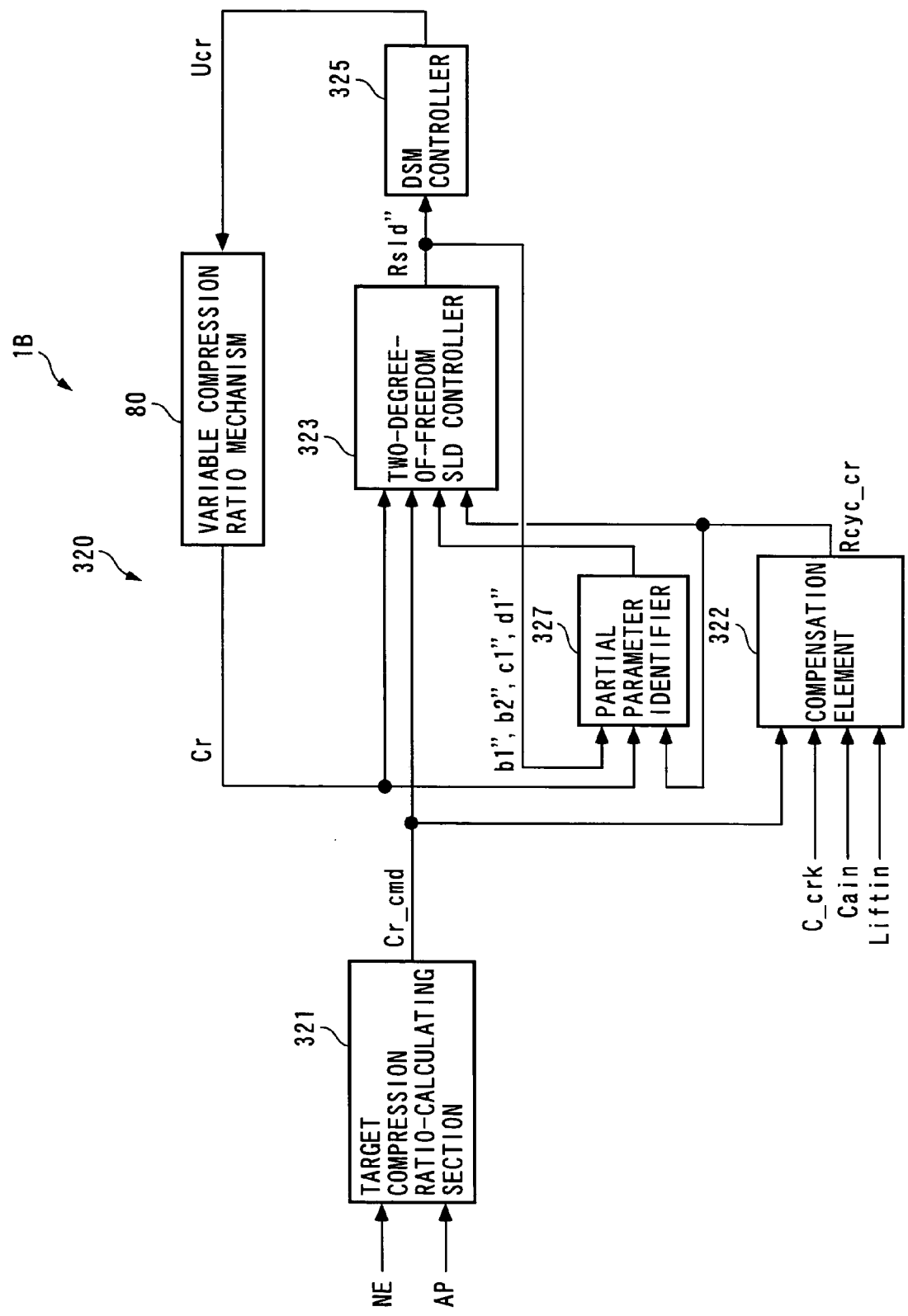
FIG. 46 is a block diagram schematically showing the configuration of a compression ratio controller of the control system according to the third embodiment.

Next, a description will be given of a control system 1B according to a third embodiment of the present invention. The control system 1B of the present embodiment is configured similarly to the above-described control system 1A of the second embodiment, except for part thereof. Therefore, the following description will be mainly given of the different points thereof from the control system 1A of the second embodiment. Referring to FIGS. 44 to 46, the control system 1B includes a cam phase controller 300, a valve lift controller 310, and a compression ratio controller 320, all of which are implemented by the ECU 2 (model parameter-identifying means).

First, a description will be given of the cam phase controller 300. Referring to FIG. 44, the cam phase controller 300 includes a target cam phase-calculating section 301 (target value-calculating means, target cam phase-setting means), a compensation element 302 (disturbance compensation value-storing means, disturbance compensation value-selecting means), a two-degree-of-freedom SLD controller 303 (control input-calculating means), a DSM controller 305 (control input-calculating means), and a partial parameter identifier 307 (amplitude correction value-calculating means, model parameter-identifying means). The cam phase controller 300 is distinguished from the above-described cam phase controller 200 in that it has the partial parameter identifier 307 in place of the above-described disturbance observers 206, and accordingly part of a control algorithm for the two-degree-of-freedom SLD controller 303 is different from the control algorithm for the two-degree-of-freedom SLD controller 203.

In the partial parameter identifier 307, a parameter vector θ is identified with a sequential identification algorithm of the fixed gain method, expressed by equations (34) to (39) in FIG. 47, according to the cam phase Cain, the disturbance compensation value Rcyc_cin for the cam phase control, and the SLD control input Rsld for the cam phase control. The transposed matrix of the parameter vector θ is expressed by the equation (38). In the equation (38), d1 represents a disturbance compensation value gain as an amplitude correction value, and is provided for compensating for a change in the amplitude of the periodic disturbance, caused by the aging of the variable cam phase mechanism 70 and a variation between individual mechanisms 70. Further, in the equation (34), W represents an imaginary output, and in the equation (35), W_hat represents an identified value of the imaginary output. Further, in the equation (37), e_id' represents an identification error defined by the equation (36), P''' a predetermined identification gain, and ζ a vector whose transposed matrix is expressed by the equation (39).

It should be noted that the above equations (34) to (39) are derived as follows: When the disturbance compensation value gain d1 is added to the model expressed by the equation (20) in FIG. 41, an equation (40) shown in FIG. 47 is obtained. In the equation (40), if each variable is shifted by an amount corresponding to one discrete time period, parameters b1 and b2, the disturbance compensation value gain d1, and the disturbance compensation value Rcyc_cin are discretized, and the term of Cain is moved to the left side of the equation (40), then an equation (41) in FIG. 47 is obtained. In the equation (41), if the left side thereof is defined as W, and the right side thereof as W_hat, then the above equations (34) and (35) are obtained. Here, it is possible to consider W as the output of an imaginary controlled object, W_hat as an identified value of the output of the imaginary controlled object, and the equation (35) as a model of the imaginary controlled object. Therefore, by using the sequential identification algorithm of the fixed gain method so as to identify the model parameters of the imaginary controlled object such that the imaginary output W is made closer to the identified value W_hat of the imaginary output, the above equations (34) to (39) are derived.

In the partial parameter identifier 307, the model parameters b1 and b2, the disturbance estimation value c1, and the disturbance compensation value gain d1 are sequentially identified with the identification algorithm expressed by the equations (34) to (39).

Further, in the two-degree-of-freedom SLD controller 303, the SLD control input Rsld for the cam phase control is calculated with a target value filter-type two-degree-of-freedom sliding mode control algorithm expressed by equations (42) to (48) in FIG. 48. As is clear from the reference to the equations (42) to (48), the control algorithm for the two-degree-of-freedom SLD controller 303 is different from the control algorithm for the two-degree-of-freedom SLD controller 203 only in that in the calculation of the equivalent control input Req, the disturbance compensation value Rcyc_cin for the cam phase control is multiplied by the disturbance compensation value gain d1.

Further, in the DSM controller 305, the phase control input Ucain is calculated based on the SLD control input Rsld for the cam phase control, calculated as above, with a control algorithm [equations (49) to (54) shown in FIG. 49] similar to the control algorithm for the DSM controller 205.

Next, a description will be given of the valve lift controller 310. The valve lift controller 310 as well is configured similarly to the cam phase controller 300. More specifically, as shown in FIG. 45, the valve lift controller 310 includes a target valve lift-calculating section 311 (target value-setting means, target valve lift-setting means), a compensation element 312 (disturbance compensation value-storing means, disturbance compensation value-selecting means), a two-degree-of-freedom SLD controller 313 (control input-calculating means), a DSM controller 315 (control input-calculating means), and a partial parameter identifier 317 (model parameter-identifying means, amplitude correction value-calculating means). The valve lift controller 310 is distinguished from the aforementioned valve lift controller 210 in that it has the partial parameter identifier 317 in place of the above-mentioned disturbance observer 216, and accordingly part of a control algorithm for the two-degree-of-freedom SLD controller 313 is different from the control algorithm for the two-degree-of-freedom SLD controller 203.

In the partial parameter identifier 317, model parameters b1' and b2', a disturbance estimation value c1', and a disturbance compensation value gain d1' (amplitude correction value), for the valve lift control, are sequentially identified with an algorithm similar to the algorithm for the partial parameter identifier 307 of the cam phase controller 300. More specifically, the model parameters b1' and b2', the disturbance estimation value c1', and the disturbance compensation value gain d1', for the valve lift control, are sequentially identified with an algorithm in which in the equations (34) to (39) shown in FIG. 47, b1, b2, c1, and d1 are replaced by b1', b2', c1', and d1', respectively, and Cain by Liftin, Rcyc_cin by Rcyc_lin, and Rsld by Rsld', and further the coefficients and the like being replaced by respective corresponding values for the valve lift control.

Further, in the two-degree-of-freedom SLD controller 313, the SLD control input Rsld' for the valve lift control is calculated with an algorithm similar to the algorithm for the two-degree-of-freedom SLD controller 303 of the cam phase controller 300. More specifically, the SLD control input Rsld' for the valve lift control is calculated with an algorithm in which in the equations (42) to (48) in FIG. 48, the parameters, the coefficients and the like are replaced by respective corresponding values for the valve lift control.

Furthermore, in the DSM controller 315, the lift control input Uliftin is calculated based on the SLD control input Rsld' for the valve lift control, calculated as above, with a control algorithm similar to the control algorithm for the DSM controller 305 of the cam phase controller 300. More specifically, the lift control input Uliftin is calculated with an algorithm in which in the equations (49) to (54) in FIG. 49, the parameters, the coefficients and the like are replaced by respective corresponding values for the valve lift control.

On the other hand, the compression ratio controller 320 as well is configured similarly to the cam phase controller 300. More specifically, as shown in FIG. 46, the compression ratio controller 320 includes a target compression ratio-calculating section 321 (target value-setting means, target compression ratio-setting means), a compensation element 322 (disturbance compensation value-storing means, disturbance compensation value-selecting means), a two-degree-of-freedom SLD controller 323 (control input-calculating means), a DSM controller 325 (control input-calculating means), and a partial parameter identifier 327 (model parameter-identifying means, amplitude correction value-calculating means).

In the partial parameter identifier 327, model parameters b1" and b2", a disturbance estimation value c1", and a disturbance compensation value gain d1" (amplitude correction value), for the compression ratio control, are sequentially identified with an algorithm similar to the algorithm for the partial parameter identifier 307 of the cam phase controller 300. More specifically, the model parameters b1" and b2", the disturbance estimation value c1", and the disturbance compensation value gain d1", for the compression ratio control, are sequentially identified with an algorithm in which in the equations (34) to (39) shown in FIG. 47, b1, b2, c1, and d1 are replaced by b1", b2", c1", and d1", respectively, and Cain by Cr, Rcyc_cin by Rcyc_cr, and Rsld by Rsld", and further the coefficients and the like by respective corresponding values for the compression ratio control.

Further, in the two-degree-of-freedom SLD controller 323, the SLD control input Rsld" for the compression ratio control is calculated with an algorithm similar to the algorithm for the two-degree-of-freedom SLD controller 303 of the cam phase controller 300. More specifically, the SLD control input Rsld" for the compression ratio control is calculated with an algorithm in which in the equations (42) to (48) in FIG. 48, the parameters, the coefficients and the like are replaced by respective corresponding values for the compression ratio control.

Furthermore, in the DSM controller 325, the compression ratio control input Ucr is calculated based on the SLD control input Rsld" for the compression ratio control, calculated as above, with a control algorithm similar to the control algorithm for the DSM controller 305 of the cam phase controller 300. More specifically, the compression ratio control input Ucr is calculated with an algorithm in which in the equations (49) to (54) in FIG. 49, the parameters, the coefficients and the like are replaced by respective corresponding values for the compression ratio control.

According to the control system 1B of the present embodiment, configured as above, similarly to the control systems 1 and 1A of the first and second embodiments, the three control inputs Ucain, Uliftin, and Ucr are calculated according to the three disturbance compensation values Rcyc_cin, Rcyc_lin, and Rcyc_cr, respectively. Therefore, by controlling the cam phase Cain, the valve lift Liftin, and the compression ratio Cr in a feedforward manner using the control inputs Ucain, Uliftin, and Ucr calculated as above, respectively, it is possible to quickly compensate for and suppress the influence of the periodic disturbance on the cam phase Cain, the valve lift Liftin, and the compression ratio Cr. As a result, in the cam phase control, the valve lift control, and the compression ratio control, it is possible to obtain the same advantageous effects as provided by the above-described control system 1.

Further, in the cam phase controller 300 of the control system 1B, the model parameters b1 and b2, the disturbance estimation value c1, and the disturbance compensation value gain d1 are sequentially identified, and the SLD control input Rsld for the cam phase control is calculated by the two-degree-of-freedom SLD controller 303, according to the values b1, b2, c1, and d1, identified as above, and the disturbance compensation value Rcyc_cin for the cam phase control. Then, the phase control input Ucain is calculated based on the SLD control input Rsld for the cam phase control. Therefore, even when the amplitude of the periodic disturbance is changed due to the aging of the variable cam phase mechanism 70, and a variation between individual mechanisms 70, the phase control input Ucain makes it possible to cause the cam phase Cain to converge to the target cam phase Cain_cmd quickly and accurately, while properly compensating for the change in the amplitude of the periodic disturbance. That is, the cam phase controller 300 is capable of compensating for and suppress the influence of the periodic disturbance on the cam phase Cain more quickly than the cam phase controller 200 according to the second embodiment. As described above, it is possible to further enhance the stability and the accuracy of the cam phase control compared with the cam phase controller 200 according to the second embodiment.

Moreover, the valve lift controller 310 and the compression ratio controller 320 make it possible to obtain the same advantageous effects as provided by the cam phase controller 300, whereby it possible to further enhance the stability and the accuracy of the valve lift control and the compression ratio control compared with the valve lift controller 210 and the compression ratio controller 220 according to the second embodiment.

Although the cam phase controller 300 according to the present embodiment is configured such that part of the model parameters (b1, b2), the disturbance estimation value c1, and the disturbance compensation value gain d1 are identified by the partial parameter identifier 307, this is not limitative, but a parameter identifier for identifying all the model parameters a1, a2, b1, and b2, the disturbance estimation value c1, and the disturbance compensation value gain d1 may be employed in place of the partial parameter identifier 307, or an identifier for identifying only the disturbance compensation value gain d1 may be employed in place of the partial parameter identifier.

Further, although in the partial parameter identifier 307, the identification algorithm of the fixed gain method is used, another identification algorithm than this may be used. For example, a variable gain method, a δ correcting method or a σ correcting method, each of which is an improved algorithm of the fixed gain method, an identification algorithm in which a model parameter scheduler and the δ correcting method are combined may be employed. Further, it goes without saying that also in the controllers 310 and 320, the partial parameter identifiers 317 and 327 may be configured as above.

Although in the above-described embodiments, the control system according to the present invention is applied to the control of a system including the variable cam phase mechanism 70, the variable valve lift mechanism 50, and the variable compression ratio mechanism 80, as controlled objects (moving part-driving mechanisms), this is not limitative, but it is to be understood that the control system according to the present invention can be applied to control of moving part-driving mechanisms for various kinds of industrial machines, to which the periodic disturbance is applied.

Further, although in the above embodiments, the variable cam phase mechanism 70 is configured to change the phase Cain of the intake camshaft 5 with respect to the crankshaft 3d, this is not limitative, but the variable cam phase mechanism may be configured to change the phase of the exhaust camshaft 8 with respect to the crankshaft 3d. Further, it may be configured to change the phases of both of the intake camshaft 5 and the exhaust camshaft 8 with respect to the crankshaft 3d. When the variable cam phase mechanism is thus configured to be controlled with the above-described control algorithms, it is possible not only to obtain the advantageous effects described above but also to quickly compensate for and suppress the influence of the periodic disturbance on an exhaust valve system. This makes it possible to avoid reduction of the internal EGR amount due to the influence of the periodic disturbance to thereby ensure a stable combustion state.

Furthermore, although in the above-described embodiments, the variable valve lift mechanism 50 is configured to change the lift Liftin of the intake valves 4, this is not limitative, but the variable valve lift mechanism may be configured to change the lift of the exhaust valves 7. Further, it may be configured to change the lifts of both of the intake valves 4 and the exhaust valves 7. When the variable valve lift mechanism is thus configured to be controlled with the aforementioned control algorithms, it is possible not only to obtain the advantageous effects described above but also to quickly compensate for and suppress the influence of the periodic disturbance on the exhaust valve system. This makes it possible to avoid a change in the internal EGR amount due to the influence of the periodic disturbance to thereby ensure a stable combustion state.

It is further understood by those skilled in the art that the foregoing is a preferred embodiment of the invention, and that various changes and modifications may be made without departing from the spirit and scope thereof.

What is claimed is:

1. A control system for controlling an output of a controlled object to which is applied a periodic disturbance an amplitude of which periodically changes, by a control input, comprising:
   disturbance compensation value-storing means for storing a plurality of disturbance compensation values for compensating for the periodic disturbance, the disturbance compensation values having been set in advance in time series according to a result of prediction of a change in the amplitude of the periodic disturbance;
   disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values; and
   control input-calculating means for calculating the control input, with a predetermined control algorithm, according to the selected disturbance compensation value.

2. A control system for controlling an output of a controlled object to which is applied a periodic disturbance an amplitude of which periodically changes, by a control input, comprising:
   disturbance compensation value-storing means for storing a plurality of disturbance compensation values for compensating for the periodic disturbance, the disturbance compensation values having been set in advance in time series according to a result of prediction of a change in the amplitude of the periodic disturbance;
   disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values;
   disturbance estimation value-calculating means for calculating a disturbance estimation value for compensating for a disturbance and modeling errors in the controlled object, with a predetermined estimation algorithm based on a model defining relationships between the disturbance estimation value, the control input, and the output of the controlled object; and control input-calculating means for calculating the control input, with a predetermined control algorithm, according to the selected disturbance compensation value.

3. A control system for controlling an output of a controlled object to which is applied a periodic disturbance an amplitude of which periodically changes, by a control input, comprising:

disturbance compensation value-storing means for storing a plurality of disturbance compensation values for compensating for the periodic disturbance, the disturbance compensation values having been set in advance in time series according to a result of prediction of a change in the amplitude of the periodic disturbance;

disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values;

model parameter-identifying means for identifying model parameters of a model defining relationships between the disturbance compensation value, the control input, and the output of the controlled object, with a predetermined identification algorithm; and control input-calculating means for calculating the control input, with a predetermined algorithm including a predetermined control algorithm based on the model, according to the identified model parameters and the selected disturbance compensation value.

4. A control system for controlling an output of a controlled object to which is applied a periodic disturbance an amplitude of which periodically changes, by a control input, comprising:

disturbance compensation value-storing means for storing a plurality of disturbance compensation values for compensating for the periodic disturbance, the disturbance compensation values having been set in advance in time series according to a result of prediction of a change in the amplitude of the periodic disturbance;

disturbance compensation value-selecting means for selecting, in timing of selection at a repetition period corresponding to 1/n (n is an integer not smaller than 2) of a repetition period of occurrence of the periodic disturbance, one disturbance compensation value corresponding to the timing of selection, from the stored disturbance compensation values;

amplitude correction value-calculating means for calculating an amplitude correction value for correcting an amplitude of the disturbance compensation value, with a predetermined algorithm based on a model defining relationships between the amplitude correction value, the disturbance compensation value, the control input, and the output of the controlled object; and control input-calculating means for calculating the control input, with a predetermined control algorithm, according to the calculated amplitude correction value and the selected disturbance compensation value.

5. A control system as claimed in claim 1, further comprising target value-setting means for setting a target value of the output of the controlled object, and wherein the predetermined control algorithm includes a response-specifying control algorithm for causing the output of the controlled object to converge to the target value.

6. A control system as claimed in claim 1, further comprising target value-setting means for setting a target value of the output of the controlled object, and wherein the predetermined control algorithm includes a two-degree-of-freedom control algorithm for causing the output of the controlled object to converge to the target value.

7. A control system as claimed in claim 1, wherein the controlled object includes a variable cam phase mechanism for changing a cam phase, the cam phase being defined as at least one of a phase of an intake camshaft and a phase of an exhaust camshaft of an internal combustion engine with respect to a crankshaft, and wherein the output of the controlled object is the cam phase changed by the variable cam phase mechanism, and wherein the control input is inputted to the variable cam phase mechanism.

8. A control system as claimed in claim 1, wherein the controlled object includes a variable valve lift mechanism for changing a valve lift, the valve lift being defined as at least one of a lift of intake valves and a lift of exhaust valves of an internal combustion engine, and wherein the output of the controlled object is the valve lift changed by the variable valve lift mechanism, and wherein the control input is inputted to the variable valve lift mechanism.

9. A control system as claimed in claim 1, wherein the controlled object includes a variable compression ratio mechanism for changing a compression ratio of an internal combustion engine, wherein the output of the controlled object is the compression ratio changed by the variable compression ratio mechanism, and wherein the control input is inputted to the variable compression ratio mechanism.

10. A control system for a moving part-driving mechanism which changes at least one of operation timing and an operation amount of a moving part of an internal combustion engine, and to which is applied a periodic disturbance an amplitude of which periodically changes along with rotation of a crankshaft of the engine, comprising:

disturbance compensation value-storing means for storing a plurality of disturbance compensation values for compensating for the periodic disturbance, the disturbance compensation values having been set in advance according to a result of prediction of a change in amplitude of the periodic disturbance caused by the rotation of the crankshaft;

disturbance compensation value-selecting means for selecting, in timing of selection corresponding to each rotation of the crankshaft of the engine through a predetermined angle, a disturbance compensation value corresponding to the timing of selection from the stored disturbance compensation values; and control input-calculating means for calculating a control input for control of the moving part-driving mechanism, with a predetermined control algorithm, according to the selected disturbance compensation value.

11. A control system as claimed in claim 10, wherein the moving part-driving mechanism includes a variable cam phase mechanism for changing a cam phase as the operation timing of the moving part, the camp phase being defined as at least one of a phase of an intake camshaft and a phase of an exhaust camshaft of the engine with respect to the crankshaft.

12. A control system as claimed in claim 11, wherein said disturbance compensation value-selecting means selects the disturbance compensation value further according to a cam phase parameter indicative of the cam phase.

13. A control system as claimed in claim 11, wherein the engine includes a variable valve lift mechanism for changing a valve lift, the valve lift being defined as at least one of a lift of intake valves and a lift of exhaust valves of the engine, and wherein the disturbance compensation values are set further according to results of prediction of at least one of the change in the amplitude and a change in a behavior of the periodic disturbance, caused by a change in the valve lift by the variable valve lift mechanism, and wherein said disturbance compensation value-selecting means selects the disturbance compensation value further according to a valve lift parameter indicative of the valve lift.

14. A control system as claimed in claim 11, wherein said control input-calculating means corrects the disturbance compensation value according to a rotational speed of the engine, and calculates the control input according to the corrected disturbance compensation value.

15. A control system as claimed in claim 11, wherein said control input-calculating means calculates the control input irrespective of the disturbance compensation value, when the rotational speed of the engine is not lower than a predetermined rotational speed.

16. A control system as claimed in claim 11, further comprising target cam phase-setting means for setting a target cam phase as a target of the cam phase, and wherein the predetermined control algorithm includes a predetermined response-specifying control algorithm for causing the cam phase to converge to the target cam phase.

17. A control system as claimed in claim 11, further comprising disturbance estimation value-calculating means for calculating a disturbance estimation value for compensating for a disturbance and modeling errors in the variable cam phase mechanism, with a predetermined estimation algorithm based on a model defining relationships between the disturbance estimation value, the control input, and the cam phase, and wherein said control input-calculating means calculates the control input further according to the calculated disturbance estimation value.

18. A control system as claimed in claim 11, further comprising model parameter-identifying means for identifying model parameters of a model defining relationships between the disturbance compensation value, the control input, and the cam phase, with a predetermined identification algorithm, and wherein said control input-calculating means calculates the control input with the predetermined control algorithm including a predetermined algorithm formed based on the model, according to the identified model parameters.

19. A control system as claimed in claim 10, wherein the moving part-driving mechanism includes a variable valve lift mechanism for changing a valve lift as the operation amount of the moving part, the valve lift being defined as at least one of a lift of intake valves and a lift of exhaust valves of the engine.

20. A control system as claimed in claim 19, wherein said disturbance compensation value-selecting means selects the disturbance compensation value further according to a valve lift parameter indicative of the valve lift.

21. A control system as claimed in claim 19, wherein the engine includes a variable cam phase mechanism for changing a cam phase, the cam phase being defined as at least one of a phase of an intake camshaft and a phase of an exhaust camshaft of the engine with respect to the crankshaft, and wherein said disturbance compensation value-selecting means selects the disturbance compensation value further according to a cam phase parameter indicative of the cam phase.

22. A control system as claimed in claim 19, wherein said control input-calculating means corrects the disturbance compensation value according to a rotational speed of the engine, and calculates the control input according to the corrected disturbance compensation value.

23. A control system as claimed in claim 19, wherein said control input-calculating means calculates the control input irrespective of the disturbance compensation value, when the rotational speed of the engine is not lower than a predetermined rotational speed.

24. A control system as claimed in claim 19, further comprising target valve lift-setting means for setting a target valve lift as a target of the valve lift, and wherein the predetermined control algorithm includes a predetermined response-specifying control algorithm for causing the valve lift to converge to the target valve lift.

25. A control system as claimed in claim 19, further comprising disturbance estimation value-calculating means for calculating a disturbance estimation value for compensating for a disturbance and modeling errors in the variable valve lift mechanism, with a predetermined estimation algorithm based on a model defining relationships between the disturbance estimation value, the control input, and the valve lift, and wherein said control input-calculating means calculates the control input further according to the calculated disturbance estimation value.

26. A control system as claimed in claim 19, further comprising model parameter-identifying means for identifying model parameters of a model defining relationships between the disturbance compensation value, the control input, and the valve lift, with a predetermined identification algorithm, and wherein said control input-calculating means calculates the control input with the predetermined control algorithm including a predetermined algorithm formed based on the model, according to the identified model parameters.

27. A control system as claimed in claim 10, wherein the moving part-driving mechanism includes a variable compression ratio mechanism for changing a compression ratio of the engine by changing a stroke of pistons of the engine as the operation amount of the moving part.

28. A control system as claimed in claim 27, wherein said disturbance compensation value-selecting means selects the disturbance compensation value further according to a compression ratio parameter indicative of the compression ratio.

29. A control system as claimed in claim 27, wherein said control input-calculating means corrects the disturbance compensation value according to a rotational speed of the engine, and calculates the control input according to the corrected disturbance compensation value.

30. A control system as claimed in claim 27, wherein said control input-calculating means corrects the disturbance compensation value according to a load parameter indicative of load on the engine, and calculates the control input according to the corrected disturbance compensation value.

31. A control system as claimed in claim 30, wherein the engine includes a variable cam phase mechanism for changing a cam phase, the cam phase being defined as at least one of a phase of an intake camshaft and a phase of an exhaust camshaft of the engine with respect to the crankshaft, and wherein the load parameter include a cam phase parameter indicative of the cam phase.

32. A control system as claimed in claim 30, wherein the engine includes a variable valve lift mechanism for changing a valve lift, the valve lift being defined as at least one of a lift of intake valves and a lift of exhaust valves of the engine, and wherein the load parameter include a valve lift parameter indicative of the valve lift.

33. A control system as claimed in claim 29, wherein said control input-calculating means calculates the control input irrespective of the disturbance compensation value, when the rotational speed of the engine is not lower than a predetermined rotational speed.

34. A control system as claimed in claim 27, further comprising target compression ratio-setting means for setting a target compression ratio as a target of the compression ratio, and wherein the predetermined control algorithm includes a predetermined response-specifying control algorithm for causing the compression ratio to converge to the target compression ratio.

35. A control system as claimed in claim 27, further comprising disturbance estimation value-calculating means for calculating a disturbance estimation value for compensating for a disturbance and modeling errors in the variable compression ratio mechanism, with a predetermined estimation algorithm based on a model defining relationships between the disturbance estimation value, the control input, and the compression ratio, and wherein said control input-calculating means calculates the control input further according to the calculated disturbance estimation value.

36. A control system as claimed in claim 27, further comprising model parameter-identifying means for identifying model parameters of a model defining relationships between the disturbance compensation value, the control input, and the compression ratio, with a predetermined identification algorithm, and wherein said control input-calculating means calculates the control input with the predetermined control algorithm including the predetermined algorithm based on the model, according to the identified model parameters.

* * * * *

UNITED STATES PATENT AND TRADEMARK OFFICE
CERTIFICATE OF CORRECTION

PATENT NO. : 7,188,020 B2 Page 1 of 1
APPLICATION NO. : 11/087674
DATED : March 6, 2007
INVENTOR(S) : Yuji Yasui et al.

It is certified that error appears in the above-identified patent and that said Letters Patent is hereby corrected as shown below:

IN THE CLAIMS:

Col. 54 and 55
Cancel Claims 2, 3 and 4.

Signed and Sealed this

Eleventh Day of September, 2007

JON W. DUDAS
*Director of the United States Patent and Trademark Office*